United States Patent [19]

Kostinko

[11] Patent Number: 4,539,191

[45] Date of Patent: Sep. 3, 1985

[54] PREPARATION OF SODIUM SILICATE SOLUTIONS

[75] Inventor: John A. Kostinko, Bel Air, Md.

[73] Assignee: J. M. Huber Corporation, Locust, N.J.

[21] Appl. No.: 516,214

[22] Filed: Nov. 7, 1983

Related U.S. Application Data

[60] Division of Ser. No. 203,927, Nov. 4, 1980, Pat. No. 4,416,805, which is a division of Ser. No. 88,243, Oct. 25, 1979, abandoned, which is a continuation-in-part of Ser. No. 971,584, Dec. 20, 1978, Pat. No. 4,235,856.

[51] Int. Cl.$^3$ .................. C01B 33/28; C01B 33/32
[52] U.S. Cl. ................... 423/275; 423/332; 423/334
[58] Field of Search ............ 423/275, 118, 328, 329, 423/332, 334

[56] References Cited

U.S. PATENT DOCUMENTS

| | | | |
|---|---|---|---|
| 3,956,467 | 5/1976 | Bertorelli | 423/334 |
| 4,235,856 | 11/1980 | Kostinko | 423/329 |
| 4,264,562 | 4/1981 | Kostinko | 423/329 |
| 4,416,805 | 11/1983 | Kostinko | 423/329 X |
| 4,443,422 | 4/1984 | Kostinko | 423/329 |

FOREIGN PATENT DOCUMENTS

| | | | |
|---|---|---|---|
| 543907 | 7/1957 | Canada | 423/334 |
| 299763 | 3/1929 | United Kingdom | 423/332 |

*Primary Examiner*—Edward J. Meros
*Attorney, Agent, or Firm*—Harold H. Flanders; Robert L. Price

[57] ABSTRACT

Sodium silicate solutions are prepared by dissolving sand in sodium hydroxide solution at a pressure of at least 100 psig and at a temperature of at least 130° C. to produce a sodium silicate solution having a silica to sodium oxide molar ratio of between 2.4:1 and 2.8:1, and activating said sodium silicate solution by reaction with from about 50 to 200 ppm of alumina.

6 Claims, No Drawings

PREPARATION OF SODIUM SILICATE SOLUTIONS

CROSS REFERENCE TO RELATED APPLICATIONS

This application is a division of U.S. application Ser. No. 203,927, filed Nov. 4, 1980, now U.S. Pat. No. 4,416,805, which is a division of U.S. application Ser. No. 088,243, filed Oct. 25, 1979, now abandoned, which is a continuation-in-part of U.S. application Ser. No. 971,584, filed Dec. 20, 1978, now U.S. Pat. No. 4,235,856.

TABLE OF CONTENTS

CROSS REFERENCE TO RELATED APPLICATION
BACKGROUND OF THE INVENTION
  Nature of Zeolites
    Identifying Zeolites
    Identification by X-Ray Diffraction Patterns
    Effect of Particle Size on X-Ray Diffraction Patterns
    Adsorptive Properties
    Particle Size of Zeolites
  Zeolite Patents
    U.S. Pat. No. 2,882,243
    U.S. Pat. No. 2,882,244
    U.S. Pat. No. 2,979,381
    U.S. Pat. No. 2,982,612
    U.S. Pat. No. 3,058,805
    U.S. Pat. No. 3,101,251
    U.S. Pat. No. 3,119,659
    U.S. Pat. No. 4,041,135
  Water Softening Compositions
  Water Softening Composition Patents
    U.S. Pat. No. 3,985,669
    U.S. Pat. No. 4,000,094
    U.S. Pat. No. 4,019,999
    U.S. Pat. No. 4,094,778
  Detergent Compostions
  Detergent Composition Patents
    U.S. Pat. No. 4,071,377
    U.S. Pat. No. 4,096,081
    Other Patents
  Paper Compositions
  Paper Composition Patents
    U.S. Pat. No. 3,228,784
    U.S. Pat. No. 3,582,379
    U.S. Pat. No. 3,834,921
  Rubber Compositions
  Rubber Composition Patents
    U.S. Pat. No. 3,036,980
  Plastic Compositions
  Non-Settling Flatting Pigment
  Non-Settling Flatting Pigment Patents
    U.S. Pat. No. 4,155,769
SUMMARY OF THE INVENTION
DESCRIPTION OF THE PREFERRED EMBODIMENTS
  Control of Reaction Time
  Effect of Particle Size on Exchange Capacity
  Control of Particle Size
  Description of Process
  Small Particle Size Zeolites
  Reason for Overlap of Ranges
  Combination of Zeolite A and Zeolite X
  Activation of Unreactive Sources of Silica
EXAMPLES
  Procedures Used in Examples
  Preparation of Zeolite A
  Preparation of Zeolite X
  Combination of Zeolites A and X
  Activation with Alumina
  Water Softening Compositions
  Detergent Compositions
  Paper Compositions
  Rubber Compositions
  Plastic Compositions
  Non-Settling Flatting Pigment

LIST OF TABLES

| TABLE | TABLE NAME |
|---|---|
| A | X-Ray Diffraction Pattern for Zeolite A |
| B | Most Significant d Values for Zeolite A |
| C | X-Ray Diffraction Pattern for Zeolite X |
| D | Most Significant d Values for Zeolite X |
| E | Adsorption Data for Zeolite A |
| F | Adsorption Date for Zeolite X |
| G | Oxide Ratios for Making Zeolite A |
| H | Oxide Ratios for Making Zeolite X |
| I | Broad Ranges for Making Zeolites of Small and Uniform Size Having a High Magnesium Exchange Capacity |
| II | Preferred Ranges for Making Zeolites of Small and Uniform Size Having a High Magnesium Exchange Capacity (Unactivated) |
| III | Preferred Ranges for Making Zeolites of Small and Uniform Size Having a High Magnesium Exchange Capacity (Activated) |
| IV | Composition of Reaction Mixture for the Preparation of Zeolite A |
| V | Exchange Capacity for Zeolite A |
| VI | Composition of Reaction Mixture for the Preparation of Zeolite X |
| VII | Exchange Capacity for Zeolite X |
| VIII | Composition of Reaction Mixture for the Preparation of Zeolite A and Zeolite X |
| IX | Exchange Capacity for a Combination of Zeolite A and Zeolite X |
| X | Composition of Reaction Mixture for the Preparation of Zeolites Activate with Alumina |
| XI | Exchange Capacity for Zeolites Activated with Alumina |
| XII | Use of Small Particle Size Zeolite A in Detergents |
| XIII | Use of Small Particle Size Zeolite A as a Filler in Fine Paper |
| XIV | Use of Small Particle Size Zeolite A as an Extender for Titanium Dioxide in Fine Paper |
| XV | Use of Small Particle Size Zeolite A in Newsprint |
| XVI | Use of Small Particle Size Zeolite A as a Titanium Dioxide Extender in Paper Coatings |
| XVII | Use of Small Particle Size Zeolite A as a Non-settling, Flatting Pigment in Nitrocellulose Lacquer |
| XVIII | Use of Small Particle Size Zeolite A as a Prime Pigment Extender in Flat Latex Systems |

BACKGROUND OF THE INVENTION

In general, the present invention relates to the production of zeolites, and more specifically to the production of zeolites of small and uniform size having a high magnesium exchange capacity.

Nature of Zeolites

Naturally occurring hydrated metal aluminum silicates are called zeolites. The synthetic adsorbents of the invention have compositions similar to some of the natural zeolites. The most common of these zeolites are sodium zeolites.

Certain adsorbents, including zeolites A and X, selectively adsorb molecules on the basis of the size and shape of the adsorbate molecule and are called molecular sieves. Molecular have a sorption area available on the inside of a large number of uniformly sized pores of molecular dimensions. With such an arrangement, molecules of a certain size and shape enter the pores and are adsorbed while larger or differently shaped molecules are excluded. Not all adsorbents behave in the manner of molecular sieves. The common adsorbents, charcoal and silica gel, for example, do not exhibit molecular sieve action.

Zeolites consist basically of a three-dimensional framework of $SiO_4$ and $AlO_4$ tetrahedra. The tetrahedra are cross-linked by the sharing of oxygen atoms so that the ratio of oxygen atoms to the total of the aluminum and silicon atoms is equal to two or $O/(Al+Si)=2$. The electrovalence of each tetrahedra containing aluminum is balanced by the inclusion in the crystal of a cation, for example a sodium ion. This balance may be expressed by the formula $Al_2/Na_2=1$. The spaces between the tetrahedra are occupied by water molecules prior to dehydration.

Zeolites may be activated by heating to effect the loss of the water of hydration. The dehydration results in crystals interlaced with channels of molecular dimensions that offer very high surface areas for the adsorption of foreign molecules. The interstitial channels of zeolite X are of a size such that heptacosafluorotributylamine and larger molecules will not enter into the channels. The interstitial channels of zeolite A will not accept molecules larger than 5.5 angstroms.

Factors influencing occlusion by activated zeolite crystals are the size and polarizing power of the interstitial cation, the polarizability and polarity of the occluded molecules, the dimensions and shape of the sorbed molecule relative to those of the channels, the duration and severity of dehydration and desorption, and the presence of foreign molecules in the interstitial channels. It will be understood that the refusal characteristics of zeolites are quite as important as the adsorptive or positive adsorption characteristics. For instance, if benzene and heptacosafluorotributylamine are to be separated, it is as essential that the crystals refuse the heptacosafluorotributylamine as it is that they adsorb the benzene. If water and another material are to be separated, it is as essential that the crystals refuse the other material as it is that they adsorb the water.

Identifying Zeolites

Zeolites A and X may be distinguished from other zeolites and silicates on the basis of their X-ray powder diffraction patterns and certain physical characteristics. The composition and density are among the characteristics which have been found to be important in identifying these zeolites.

The basic formula for all crystalline sodium zeolites may be represented as follows:

$Na_2O:Al_2O_3:xSiO_2:yH_2O$

In general, a particular crystalline zeolite will have values for x and y that fall in a definite range. The value x for a particular zeolite will very somewhat since the aluminum atoms and the silicon atoms occupy essentially equivalent positions in the lattice. Minor variations in the relative numbers of these atoms does not significantly alter the crystal structure or physical properties of the zeolite. For zeolite A, an average value for x is about 1.85 with the x value falling within the range 1.85±0.5. For zeolite X, the x value falls within the range 2.5 ±0.5.

The value of y is not necessarily an invariant for all samples of zeolites. This is true because various exchangeable ions are of different size, and, since there is no major change in the crystal lattice dimensions upon ion exchange, the space available in the pores of the zeolite to accommodate water molecules varies.

The average value for y determined for zeolite A is 5.1. For zeolite X it is 6.2.

In zeolites synthesized according to the preferred procedure, the ratio sodium oxide to alumina should equal one. But if all the excess sodium present in the mother liquor is not washed out of the precipitated product, analysis may show a ratio greater than one, and if the washing is carried too far, some sodium may be ion exchanged by hydrogen, and the ratio will drop below one. It has been found that due to the ease with which hydrogen exchange takes place, the ratio for zeolite A lies in the range of $$\frac{\text{Sodium oxide}}{\text{Alumina}} = 1.0 \pm 0.2$$

The ratio for zeolite X lies in the range of $$\frac{\text{Sodium oxide}}{\text{Alumina}} = 0.9 \pm 0.2$$

Thus the formula for zeolite A may be written as follows:

$1.0\pm0.2Na_2O:Al_2O_3:1.85\pm0.5SiO_2:yH_2O$

The formula for zeolite X may be written as follows:

$0.9\pm0.2Na_2O:Al_2O_3:2.5\pm0.5SiO_2:yh_2O$

"y" may be any value up to 6 for zeolite A and any value up to 8 for zeolite X.

The pores of zeolites normally contain water. The above formulas represent the chemical analysis of zeolites A and X. When other materials as well as water are in the pores, chemical analysis will show a lower value of y and the presence of other adsorbates. The presence in the crystal lattice of materials volatile at temperatures below about 600 degrees Celsius does not significantly alter the usefulness of the zeolite as an adsorbent since the pores are usually freed of such volatile materals during activation.

Identification by X-Ray Diffraction Patterns

Among the ways of identifying zeolites and distinguishing them from other zeolites and other crystalline substances, the X-ray powder diffraction pattern has been found to be a useful tool. In obtaining the X-ray powder diffraction patterns, standard techniques were employed. The radiation was the $K_\alpha$ doublet of copper, and a scintillation counter spectrometer with a strip chart pen recorder was used. The peak heights, I, and the positions as a function of $2\theta$ where $\theta$ is the Bragg angle, were read from the spectrometer chart. From these, the relative intensities, where $I_o$ is the intensity of the strongest line or peak, and d, the interplanar spacing in angstroms, corresponding to the recorded lines were calculated.

X-ray powder diffraction data for sodium zeolite A are given in Table A. The table lists 100 $I/I_o$ and the d values in angstroms for the observed lines. The X-ray patterns indicate a cubic unit cell of dimensions between 12.0 and 12.4 angstroms. In a separate column are listed the sum of the squares of the Miller indices ($h^2+k^2+l^2$) for a cubic unit cell that corresponds to the observed lines in the X-ray diffraction patterns. The $a_o$ value for zeolite A is 12.32 angstroms, where $a_o$ is the unit cell edge.

TABLE A
X-RAY DIFFRACTION PATTERN FOR ZEOLITE A

| $h^2 + k^2 + l^2$ | d | 100 $I/I_o$ |
|---|---|---|
| 1 | 12.29 | 100 |
| 2 | 8.71 | 69 |
| 3 | 7.11 | 35 |
| 4 | — | — |
| 5 | 5.51 | 25 |
| 6 | 5.03 | 2 |
| 8 | 4.36 | 6 |
| 9 | 4.107 | 36 |
| 10 | — | — |
| 11 | 3.714 | 53 |
| 12 | — | — |
| 13 | 3.417 | 16 |
| 14 | 3.293 | 47 |
| 16 | — | — |
| 17 | 2.987 | 55 |
| 18 | 2.904 | 9 |
| 20 | 2.754 | 12 |
| 21 | 2.688 | 4 |
| 22 | 2.626 | 22 |
| 24 | 2.515 | 5 |
| 25 | 2.464 | 4 |
| 26 | — | — |
| 27 | 2.371 | 3 |
| 29 | 2.289 | 1 |
| 30 | 2.249 | 3 |
| 32 | 2.177 | 7 |
| 33 | 2.144 | 10 |
| 34 | 2.113 | 3 |
| 35 | 2.083 | 4 |
| 36 | 2.053 | 9 |
| 37 | — | — |
| 38 | — | — |
| 41 | 1.924 | 7 |
| 42 | 1.901 | 4 |
| 44 | 1.858 | 2 |
| 45 | 1.837 | 3 |
| 49 | 1.759 | 2 |
| 50 | 1.743 | 13 |
| 51 | — | — |
| 53 | 1.692 | 6 |
| 54 | 1.676 | 2 |
| 57 | 1.632 | 4 |
| 59 | 1.604 | 6 |
| 61 | 1.577 | 4 |
| 62 | — | — |
| 65 | 1.528 | 2 |
| 66 | 1.516 | 1 |
| 67 | — | — |
| 68 | — | — |
| 69 | 1.483 | 3 |
| 70 | 1.473 | 2 |
| 72 | — | — |
| 74 | 1.432 | 3 |
| 75 | 1.422 | 2 |
| 77 | 1.404 | 5 |
| 81 | 1.369 | 2 |
| 82 | 1.360 | 8 |

The more significant d values for zeolite A are given in Table B.

TABLE B
MOST SIGNIFICANT d VALUES FOR ZEOLITE A
d Value of Reflection in Angstroms

| |
|---|
| 12.2 ± 0.2 |
| 8.6 ± 0.2 |
| 7.05 ± 0.15 |
| 4.07 ± 0.08 |
| 3.68 ± 0.07 |
| 3.38 ± 0.06 |
| 3.26 ± 0.05 |
| 2.96 ± 0.05 |
| 2.73 ± 0.05 |
| 2.60 ± 0.05 |

X-ray powder diffraction data for sodium zeolite X are given in Table C.

TABLE C
X-RAY DIFFRACTION PATTERN FOR ZEOLITE X

| $h^2 + k^2 + l^2$ | 100 $I/I_o$ | d |
|---|---|---|
| 3 | 100 | 14.47 |
| 8 | 18 | 8.85 |
| 11 | 12 | 7.54 |
| 19 | 18 | 5.73 |
| 27 | 5 | 4.81 |
| 32 | 9 | 4.42 |
| 35 | 1 | 4.23 |
| 40 | 4 | 3.946 |
| 43 | 21 | 3.808 |
| 44 | 3 | 3.765 |
| 48 | 1 | 3.609 |
| 51 | 1 | 3.500 |
| 56 | 18 | 3.338 |
| 59 | 1 | 3.253 |
| 67 | 4 | 3.051 |
| 72 | 9 | 2.944 |
| 75 | 19 | 2.885 |
| 80 | 8 | 2.794 |
| 83 | 2 | 2.743 |
| 88 | 8 | 2.663 |
| 91 | 3 | 2.620 |
| 96 | 1 | 2.550 |
| 104 | — | — |
| 108 | 5 | 2.404 |
| 123 | 1 | 2.254 |
| 128 | 3 | 2.209 |
| 131 | 3 | 2.182 |
| 136 | 2 | 2.141 |
| 139 | 2 | 2.120 |
| 144 | 1 | 2.083 |
| 147 | — | — |
| 155 | — | — |
| 164 | 1 | 1.952 |
| 168 | 1 | 1.928 |
| 179 | — | — |
| 184 | 1 | 1.842 |
| 187 | — | — |
| 195 | 1 | 1.789 |
| 200 | 2 | 1.767 |
| 211 | 3 | 1.721 |
| 236 | — | — |
| 243 | 3 | 1.603 |

$a_o = 24.99 \pm 0.5$

The more significant d values for zeolite X are given in Table D.

TABLE D
MOST SIGNIFICANT d VALUES FOR ZEOLITE X
d Value of Reflection in angstroms

| |
|---|
| 14.42 ± 0.2 |
| 8.82 ± 0.1 |
| 4.41 ± 0.05 |
| 3.80 ± 0.05 |
| 3.33 ± 0.05 |
| 2.88 ± 0.05 |
| 2.79 ± 0.05 |

TABLE D-continued

MOST SIGNIFICANT d VALUES FOR ZEOLITE X
d Value of Reflection in angstroms 2.66 ± 0.05

Occasionally, additional lines not belonging to the pattern for the zeolite appear in a pattern along with the X-ray lines characteristic of that zeolite. This is an indication that one or more additional crystalline materials are mixed with the zeolite in the sample being tested. Frequently these additional materials can be identified as initial reactants in the synthesis of the zeolite, or as other crystalline substances. When the zeolite is heat treated at temperatures of between 100 and 600 degrees Celsius in the presence of water vapor or other gases or vapors, the relative intensities of the lines in the X-ray pattern may be appreciably changed from those existing in the unactivated zeolite patterns. Small changes in line positions may also occur under these conditions. These changes in no way hinder the identification of these X-ray patterns as belonging to the zeolite.

The particular X-ray technique and/or apparatus employed, the humidity, the temperature, the orientation of the powder crystals and other variables, all of which are well known and understood to those skilled in the art of X-ray crystallography or diffraction can cause some variations in the intensities and positions of the lines. These changes, even in those instances where they become large, pose no problem to the skilled X-ray crystallographer in establishing identities. Thus, the X-ray data given herein to identify the lattice for a zeolite, are not to exclude those materials, which, due to some variable mentioned or otherwise known to those skilled in the art, fail to show all of the lines, or show a few extra ones that are permissible in the cubic system of that zeolite, or show a slight shift is position of the lines, so as to give a slightly larger or smaller lattice parameter.

A simple test described in "American Minerologist," vol. 28, page 545, 1943, permits a quick check of the silicon to aluminum ratio of the zeolite. According to the description of the test, zeolite minerals with a three dimensional network that contains aluminum and silicon atoms in an atomic ratio of $Al/Si = 2/3 = 0.67$, or greater, produce a gel when treated with hydrochloric acid. Zeolites having smaller aluminum to silicon ratios disintegrate in the presence of hydrochloric acid and precipitate silica.

Effect of Particle Size on X-Ray Diffraction Patterns

The particle size of a zeolite affects the X-ray diffraction pattern of that zeolite. When the particle size of a zeolite is reduced, the intensities of peak heights in the zeolite's X-ray diffraction pattern is also reduced. The X-ray diffraction pattern does not change, except that the intensity of each peak height is reduced.

The identity of a zeolite of small particle size can be determined by comparison of its X-ray diffraction pattern with that of a standard zeolite. The patterns should match, except that the intensities of the peak heights of the pattern of the small particle size zeolite will be smaller than the intensities of the peak heights of the pattern of the standard zeolite.

Adsorptive Properties

The zeolites contemplated herein exhibit adsorbtive properties that are unique among known adsorbents. The common adsorbents, like charcoal and silica gel, show adsorption selectivities based primarily on the boiling point or critical temperature of the adsorbate. Activated zeolites on the other hand, exhibits a selectivity based on the size and shape of the adsorbate molecule. Among those adsorbate molecules, whose size and shape are such as to permit adsorption by zeolites, a very strong preference is exhibited toward those that are polar, polarizable, and unsaturated. Another property of zeolites that contributed to its unique position among adsorbents is that of adsorbing large quantities of adsorbate at either very low pressures, at very low partial pressures, or at very low concentrations. One or a combination of one or more of these adsorption characteristics or others can make zeolites useful for numerous gas or liquid separation process. The use of zeolites permits more efficient and more economical operation of numerous processes now employing other adsorbents.

Common adsorbents like silica gel and charcoal do not exhibit any appreciable molecular sieve action, whereas the various forms of zeolites do. At about room temperature the sodium zeolite A adsorbs the C1 and C2 members of the straight chain saturated hydrocarbon series but not appreciable amounts of the higher homologs. Typical results are shown below.

TABLE E

ADSORPTION DATA FOR ZEOLITE A

| Adsorbate | Temp. | Pressure (mm. Hg) | Weight Percent Adsorbed |
|---|---|---|---|
| Methane | 25 | 700 | 1.6 |
| Ethane | 25 | 700 | 7.4 |
| Propane | 25 | 700 | 0.7 |
| Butane | 25 | 132 | 0.9 |
| Octane | 25 | 12 | 0.5 |

This data suggests a process of using sodium zeolite A to remove methane and ethane from mixtures with propane and higher homologs of the series and with other larger molecules not appreciably adsorbed or with other gases less strongly adsorbed. The maximum dimension of the minimum projection cross-section for ethane is 4.0 angstroms, and for propane 4.9 angstroms. The sodium zeolite A adsorbs the former but not appreciable amounts of the latter. The sieving action of zeolite X is shown by the following table in which $P_o$ represents the vapor pressure of the adsorbate at 25 degrees Celsius. In this table the term "weight % adsorbed" refers to the percentage increase in the weight of the adsorbent. The adsorbents were activated by heating them at a reduced pressure to remove adsorbed materials. The activation temperature for zeolite X was 350 degrees Celsius, and the pressure at which it was heated was less than about 0.1 millimeter of mercury absolute unless otherwise specified. Likewise, the pressure given for each adsorption is the pressure of the adsorbate under the adsorption conditions unless the contrary is specified.

TABLE F

ADSORPTION DATA FOR ZEOLITE X

| Adsorbate | Temp. | Pressure (mm. Hg) | Weight Percent Adsorbed |
|---|---|---|---|
| Octane | 25 | 11 | 30.0 |
| Benzene | 25 | 45 | 25.0 |
| m-Dichlorobenzene | 25 | $P_o$ | 35.5 |

TABLE F-continued
ADSORPTION DATA FOR ZEOLITE X

| Adsorbate | Temp. | Pressure (mm. Hg) | Weight Percent Adsorbed |
|---|---|---|---|
| Heptacosafluorotributylamine | 23 | $P_o$ | 2.2 |

These data show that the porous structure of sodium zeolite X will permit free access to octane, benzene and dichlorobenzene molecules, so that they are readily adsorbed. But zeolite X is shown not to permit entry of the hepacosafluorotributylamine. This adsorptive behavior permits the separation of mixtures of heptacosafluorotributylamine and larger molecules from benzene, toulene, octane and other molecular species small enough to be adsorbed.

Particle Size of Zeolites

The particle size of zeolites is discussed in Breck, D. W. *Zeolite Molecular Sieves.* N.Y., John Wiley & Sons, 1974, pgs. 384–388. TP159.M6B7. He states that particle sizes of the individual crystals of zeolite range from 1 to 10 microns. He shows the particle size distribution of a typical zeolite sodium A powder having a weight average diameter of 2.78 microns. He shows in a histrogram one other example of the particle size distribution of a zeolite A preparation. From the histrogram it can be seen that less than 35% of the particles have a diameter of less than 2 microns. Thus, Breck teaches away from zeolite A having an average particle size of less than 2 microns.

The particle size of zeolites is also discussed in Meier and Uytterhoeven *Molecular Sieves,* 1973, pgs. 169–178. This book shows a relationship between the crystal diameter and the water to sodium oxide ratio. It also shows the influence of silica source on crystallization time.

Harry Robson, in his article "Synthesizing Zeolites", CHEMTECH, March 1978, discloses that one goal for future work is control of crystallite size, with larger crystals for structure determination and smaller crystals for improved performance.

Zeolite Patents

U.S. Pat. No. 2,882,243

U.S. Pat. No. 2,882,243, entitled "Molecular Sieve Adsorbents," issued to Robert M. Milton on Apr. 14, 1959. This patent discloses a process for producing zeolite A wherein a sodium-aluminum-silicate water mixture is prepared having a water to sodium oxide ratio of from 35:1 to 200:1, a sodium oxide to silica ratio of from 0.8:1 to 3.1, and a silica to alumina ratio of from 0.5:1 to 2.5:1. This mixture is maintained at a temperature of from 20 to 175 degrees Celsius until zeolite A is formed. It teaches away from preparing zeolite A from a reaction mixture having a water to sodium oxide ratio of less than 35:1.

U.S. Pat. No. 2,882,244

U.S. Pat. No. 2,882,244, entitled "Molecular Sieve Adsorbents," issued to Robert M. Milton on Apr. 14, 1959. This patent discloses a process for producing zeolite X wherein a sodium-aluminum-silicate water mixture is prepared having a water to sodium oxide ratio of from 35:1 to 60:1, a sodium oxide to silica ratio of from 1.2:1 to 1.5:1, and a silica to alumina ratio of from 3:1 to 5:1. This mixture is maintained at a temperature of from 20 to 120 degrees Celsius until zeolite X is formed. It teaches away from preparing zeolite X from a reaction mixture having a silica to alumina ratio of greater than 5:1.

U.S. Pat. No. 2,979,381

U.S. Pat. No. 2,979,381, entitled "Process for Producing Zeolite X," issued to Joseph G. Gottstine et al on Apr. 11, 1961. This patent discloses a process for producing zeolite X, wherein a reaction mixture is prepared at ambient temperature having a water to sodium oxide ratio of from 35:1 to 60:1, a sodium oxide to silica ratio of from 1.2:1 to 1.5:1, and a silica to alumina ratio of from 2.5:1 to 5:1. This mixture is maintained at ambient temperature for at least two hours, then heated to an elevated temperature (85 to 121 degrees Celsius) and maintained at that elevated temperature for at least one and a half hours until zeolite X is formed. It teaches away from preparing zeolite X from a reaction mixture having a silica to alumina ratio of greater than 5:1.

U.S. Pat. No. 2,982,612

U.S. Pat. No. 2,982,612, entitled "Process for Producing Sodium Zeolite A," issued to Richard M. Barrer et al. on May 2, 1961. This patent discloses a process for producing zeolite A wherein a mixture is prepared having a water to sodium oxide molar ratio of from 130:1 to 300:1, a sodium oxide to silica molar ratio of from 0.3:1 to 1:1, and a silica to alumina molar ratio of from 4:1 to 6:1. This mixture is reacted at a temperature of from 60 to 110 degrees Celsius until sodium zeolite A is formed. It teaches away from preparing zeolite A from a reaction mixture having a water to sodium oxide ratio of less than 130:1, or from a reaction mixture having a sodium oxide to silica ratio greater than 1:1.

U.S. Pat. No. 3,058,805

U.S. Pat. No. 3,058,805, entitled "Process for the Production of Sodium Zeolite A," isssued to Horst Weber on Oct. 16, 1962. This patent discloses the production of zeolite A from a mixture having a water to sodium oxide molar ratio of either from 25:1 to 200:1 or from 35:1 to 200:1. When the water to sodium oxide molar ratio is from 25:1 to 200:1, the sodium oxide to silica molar ratio is from 1:1 to 3:1 and the silica to alumina molar ratio is from 0.5:1 to 1.3:1. When the water to sodium oxide molar ratio is from 35:'to 200:1, the sodium oxide to silica molar ratio is from 0.8:1 to 3:1 and the silica to alumina molar ratio is from 1.2:1 to 2.5:1. These mixtures are heated to 20 to 175 degrees Celsius. This would appear to teach that if one lowers the water to sodium oxide ratio from 35:1 to 25:1, then one must also lower the maximum permissible silica to alumina molar ratio from 2.5:1 to 1.3:1. Thus, this teaches away from preparing zeolite A from a reaction mixture having a water to sodium oxide ratio of less than 35:1 and a silica to alumina ratio of greater than 2.5:1.

U.S. Pat. No. 3,058,805 claims as novel the production of zeolite A from a reaction mixture having a silica to alumina molar ratio of from 0.5:1 to 4.5:1 which, after the formation of the sodium aluminosilicate, contains free sodium hydroxide solution in a concentration of between 1.5 and 5.0 mole per liter, depending on the silica to alumina molar ratio. The reaction mixture is reacted at a temperature not exceeding about 80 degrees Celsius. The water to sodium oxide and sodium oxide to silica molar ratios were not specified. It teaches away from preparing zeolite A from a reaction mixture comprising a sodium silicate mother liquor and an amorphous sodium alumino silicate pigment. It also teaches away from preparing zeolite A from a reaction mixture reacted at temperatures greater than 80 degrees Celsius.

U.S. Pat. No. 3,101,251

U.S. Pat. No. 3,101,251, entitled 37 Process for Producing Molecular Sieves," issued to Peter A. Howell on Aug. 20, 1963. This patent discloses a process for producing zeolite A wherein a non-kaolinitic alumino silicate in admixture with an alkali metal hydroxide is fused at a temperature of from 330 to 370 degrees Celsius. An aqueous reaction mixture is formed with this fused admixture. This reaction mixture has a water to sodium oxide molar ratio of from 35:1 to 200:1, a sodium oxide to silica molar ratio of from 1.3:1 to 2.5:1, and a silica to alumina molar ratio of from 0.8:1 to 3:1. This reaction mixture is reacted at a temperature of from 20 to 120 degrees Celsius until zeolite A is formed. It teaches away from preparing zeolite A from a reaction mixture having a water to sodium oxide ratio of less than 35:1.

This patent also discloses a process for producing zeolite X wherein a non-kaolinitic alumino silicate in admixture with an alkali metal hydroxide is fused at a temperature of from 330 to 370 degrees Celsius for 8 to 40 hours. An aqueous reaction mixture is formed with this fused admixture. This reaction mixture has a water to sodium oxide molar ratio of from 35:1 to 65:1, a sodium oxide to silica molar ratio of from 1.2:1 to 1.5:1, and a silica to alumina molar ratio of from 3:1 to 5:1. This reaction mixture is reacted at a temperature of from 20 to 120 degrees Celsius until zeolite X is formed. It teaches away from preparing zeolite X from a reaction mixture having a silica to alumina ratio of greater than 5:1.

U.S. Pat. No. 3,119,659

U.S. Pat. No. 3,119,659, entitled "Process for Providing Molecular Sieve Bodies," issued to Le Roy L. Taggart et al on Jan. 28, 1964. This patent discloses both a process for producing zeolite A and a process for producing zeolite X. A kaolin clay and sodium hydroxide are formed into a compact body, dried, and reacted in an aqueous mixture at a temperature of from 20 to 175 degrees Celsius until a zeolite is formed. Zeolite A is formed in a reaction mixture having a water to sodium oxide molar ratio of from 20:1 to 100:1, a sodium oxide to silica molar ratio of from 0.5:1 to 1.5:1, and a silica to alumina molar ratio of from 1.6:1 to 2.4:1. Zeolite X is formed in a reaction mixture having a water to sodium oxide molar ration of from 30:1 to 60:1, a sodium oxide to silica molar ratio of about 1.5:1, and a silica to alumina molar ratio of about 5:1. It teaches away from preparing zeolite X from a reaction mixture having a silica to alumina ratio of greater than 5:1. It also teaches away from preparing zeolite A from a reaction mixture having a silica to alumina ratio of greater than 2.4:1 or a sodium oxide to alumina ratio of greater than 3.6:1.

U.S. Pat. No. 4,041,135

U.S. Pat. No. 4,041,135, entitled "Production of High Capacity Inorganic Crystalline Base Exchange Materials," issued to Lloyd E. Williams et al. on Aug. 9, 1977. This patent discloses a process for the production of Arogen 2000, a registered trademark of the J. M. Huber Corporation. Arogen 2000 is a high capacity inorganic crystalline base exchange material having a chemical formula similar to zeolite A. It is prepared from a reaction mixture having a water to sodium oxide molar ratio of from 35:1 to 200:1, a sodium oxide to silica molar ratio of from 0.8:1 to 3:1, and a silica to alumina molar ratio of from 0.5:1 to 2.5:1 which is reacted at a temperature of from 70 to 180 degrees Celsius. Specific process steps include (a) make-up of the reactants, (b) purification of the reagent supplying the alumina source prior to its use in the reaction, (c) precipitation of an amorphous intermediate material under controlled conditions to prevent gel formation, (d) static and/or dynamic crystallization, (e) decanting and quench, (f) solids separation, and (g) recycle of the mother liquor.

Table G summarized the reaction compositions end reaction temperatures for producing zeolite A.

TABLE G

| | OXIDE RATIOS FOR MAKING ZEOLITE A | | | |
|---|---|---|---|---|
| Patent | Water/ Sodium Oxide | Sodium Oxide/ Silica | Silica/ Alumina | Temperature |
| 2,882,243 | 35–200 | 0.8–3 | 0.5–2.5 | 20–175 |
| 2,982,612 | 130–300 | 0.3–1 | 4–6 | 60–110 |
| 3,058,805 | 25–200 | 1–3 | 0.5–1.3 | 20–175 |
| " | 35–200 | 0.8–3 | 1.2–2.5 | 20–175 |
| " | ? | ? | 0.5–4.5 | <80 |
| 3,101,251 | 35–200 | 1.3–2.5 | 0.8–3 | 20–120 |
| 3,119,659 | 20–100 | 0.5–1.5 | 1.6–2.4 | 20–175 |
| 4,041,135 | 35–200 | 0.8–3 | 0.5–2.5 | 70–180 |

From the above one would assume that zeolite A could not be made from a reaction mixture having a water to sodium oxide molar ratio of less than 35:1 and a silica to alumina molar ratio greater than 2.4:1. None of the above patents teaches a method of forming zeolite A of small and uniform size having a high magnesium carbonate exchange capacity. Table H summarizes the reaction compositions and reaction temperatures for producing zeolite X.

TABLE H

| | OXIDE RATIOS FOR MAKING ZEOLITE X | | | |
|---|---|---|---|---|
| Patent | Water/ Sodium Oxide | Sodium Oxide/ Silica | Silica/ Alumina | Temperature |
| 2,882,244 | 35–60 | 1.2–1.5 | 3–5 | 20–120 |
| 2,979,381 | 35–60 | 1.2–1.5 | 2.5–5 | elevated |
| 3,101,251 | 35–65 | 1.2–1.5 | 3–5 | 20–120 |
| 3,119,659 | 30–60 | 1.5 | 5 | 20–175 |

From the above one would assume that zeolite X could not be made from a reaction mixture having a silica to alumina molar ratio greater than 5:1. None of the above patents teaches a method of forming a zeolite X of small and uniform size having a high magnesium carbonate exchange capacity.

Water Softening Compositions

Hard water is water that contains a high degree of calcium and magnesium ions. This hard water causes scale in power plant boilers, water pipes and domestic cooking utensils. It also causes soap precipitation producing undesirable curd and wasted soap. Water softening involves the exchange of one divalent hard ion (either calcium or magnesium) for two monovalent soft ions (such as sodium) on a resin. Typically, hard water is passed through a bed of sodium cation exchange resin and then is softened by the formula:

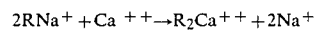

Regeneration of the exchanger usually involves passing a fairly concentrated solution of sodium chloride through the resin causing the reverse reaction of:

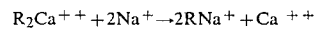

Typically, a gallon of hard water contains greater than 5 grains of calcium carbonate (1 grain per gallon equals 0.017 grams per liter).

Ionic exchange has been used on an industrial basis since around 1910 with the introduction of water softening, using natural and later synthetic silicates. The introduction of synthetic organic ion exchange resins since 1935 resulted from the synthesis of a phenolic concentration product containing sulfonate or amine groups, which could be used for the reversible exchange of cations and anions. The period since 1940 has been marked by a rapidly increased degree of sophistication in the design of ion exchange materials with the porosity and particle size being controlled by conditions of polymerization. Physical and chemical stability have been modified and improved to the extent that the inorganic exchangers (mineral, green sand and zeolites) have been almost completely displaced by the resinous types. Unfortunately, the resin cation ionic exchangers, being organic, cause a greater ecological problem than the inorganic zeolites. Also, their cost is higher.

Water Softening Composition Patents

U.S. Pat. No. 3,985,669

U.S. Pat. No. 3,985,669, entitled "Detergent Compositions," issued to H. Karl Krummel et al on Oct. 12, 1976. It shows a composition comprising a water-insoluble aluminosilicate ion exchange material, an organic surface-active agent, a minor amount of an alkali metal oxide silicate solid and sodium sulfate. The aluminosilicate has the formula:

$$Na_z((AlO_2)_z.(SiO_2)_y)xH_2O$$

where x and y are integers of at least 6; the molar ratio of z to y is 1.0 to 0.5, and x is an integer from 15 to 264. This aluminosilicate can be zeolite A having an average particle size diameter of 2 microns.

U.S. Pat. No. 4,000,094

U.S. Pat. No. 4,000,094, entitled "Water-Insoluble Aluminosilicate-Containing Detergent Composition", issued to Howard P. Fleming et al. on Dec. 28, 1976. It shows a composition containing a water-insoluble aluminosilicate, an organic detergent, process aids, and sodium sulfate. The processing aids are a mixture of a sodium carbonate and sodium sulfo succinate. The aluminosilicate has the formula $$Na_z((AlO_2)_z.(SiO_2)_y).xH_2O$$

where z and y are at least 6, the molar ratio of z to y is from 1.0 to 0.5, and x is from 10 to 264.

U.S. Pat. No. 4,019,999

U.S. Pat. No. 4,019,999, entitled "Spray-Dried Granular Detergent Containing Aluminosilicate, Silicate, and Pyrophosphate," issued to Tom H. Ohren et al. on Apr. 26, 1977. It shows a composition containing an alkali metal silicate, an aluminosilicate, and alkali metal ortho-phosphate or pyrophosphate and sodium sulfate. The aluminosilicate is crystalline and has the formula:

$$Na_{12}(AlO_2.SiO_2)_{12}xH_2O$$

where x is an integer from about 20 to about 30. The aluminosilicate has a particle size range of from 0.2 to 10 microns. This aluminosilicate may be zeolite A.

U.S. Pat. No. 4,094,778

U.S. Pat. No. 4,094,778, entitled "Sequesting of $Ca^{++}$ and $Mg^{++}$ in Aqueous Media Using Zeolite Mixtures" issued to Arthur F. Denny et al. on June 13, 1978. It discloses a process for sequesting calcium and magnesium cations from aqueous solutions wherein the solution is contacted with a mixture of sodium zeolite A and sodium zeolite X. This mixture contains from 30 to 70 weight percent of each zeolite.

Detergent Compositions

The detersive effect of even the best surfactants in detergents is severely decreased by the presence of calcium and magnesium ions. Hard water has very little soil removing power. Therefore, it has been established that good cleaning of cottons by the usual organic surfactants including soap, can only be achieved if the calcium and magnesium ions of the system have been reduced to an insignificant level. To do this, various water softeners have been added to the detergents to sequester the calcium and magnesium ions. Examples of such water softeners have been phosphates and carbonates.

Phosphates and carbonates are good water softeners but, for ecological reasons, they have become undesirable additives in a detergent. Therefore, sodium alumino silicate has been recently used as a water softener. A sodium alumino silicate is added to a slurry of the detergent, which is then spray dried into bead form. While other crystalline sodium alumino silicates have high calcium carbonate exchange capacity, they have limited magnesium exchange capacity.

Detergent Composition Patents

U.S. Pat. No. 4,071,377

U.S. Pat. No. 4,071,377, entitled "Method of Mechanical Dishwashing and Compositions", issued to Milan J. Schwuger et al. on Jan. 31, 1978. It discloses a dishwashing composition containing 44 percent of a finely-dispersed water-insoluble aluminosilicate, 40 percent sodium silicate, 2 percent salt of dichloroisocyanuric acid, 1 percent nonionic block polymer of ethylene oxide to polyoxi-propylene glycol, and 13 percent water. The aluminosilicate has the formula:

$$0.9Na_2O.Al_2O_3.2.05SiO_2.4.3H_2O.$$

U.S. Pat. No. 4,096,081

U.S. Pat. No. 4,096,081, entitled "Detergent Compositions Containing Aluminosilicate Agglomerates", issued to Ronald E. Phenicie et al. on June 20, 1978. It discloses a laundering composition containing from 10 to 30 parts aluminosilicate, from 0.7 to 1.2 parts of an organic agglomerating compound, from 0.8 to 2 parts of an inorganic salt such as sodium sulfate, and a spray-dried detergent granule containing a surfactant. The alumino silicate can be a cubic crystalline compound of the formula $$Na_z((AlO_2)_z.(SiO_2)_j)kH_2O$$

where z and j are integers of at least 6; the molar ratio of z to j is from 1.0 to 0.5 and k is an integer from 15 to 264. This crystalline aluminosilicate compound has a particle size diameter of from 0.1 to 100 microns, a calcium ion exchange capacity of at least 200 mg/g, and a calcium ion exchange rate of at least about 2 grains/gallon/minute gram. As shown in column 4, lines 28–29, the pure crystalline aluminosilicate does not exhibit magnesium ion control.

Other Patents

See U.S. Pat. Nos. 3,985,669; 4,000,094; and 4,019,999 discussed above.

Paper Compositions

Amorphous sodium alumino silicates have been used as a paper filler and in coating applications. It is essentially a whitening agent. It is added to the pulp in the same manner as clay, but requires more alum because of its alkalinity. Its retention is in same order as clay. It contributes to the softness and bulk of the sheet. The effect of increased bulk is to improve opacity through dry hiding effects. It increases ink receptivity but arrests the penetration of the vehicle and, thus, tends to reduce strike-through. In this respect, it has been found useful in groundwood catalog papers. It is used as an extender for titanium dioxide.

Amorphous sodium alumino silicates are also used in coating applications. Coating colors made with amorphous sodium alumino silicates show much higher viscosity than those made with clay, but it is unlikely that the former would be considered as the sole mineral constituent. In common with other bulky pigments, adhesive requirements are high. It offers possibilities as a whitening agent for coatings and as an extender for titanium dioxide.

Paper Composition Patents

U.S. Pat. No. 3,228,784

U.S. Pat. No. 3,228,784, entitled "Amorphous Hydrogen Alumino Silicate Pigments," issued to Robert K. Mays et al. on Jan. 11, 1966. It discloses a finely divided, amorphous, hydrogen alumino silicate pigment containing 0.02 to 0.07 moles of sodium oxide per mole of alumina, 8 to 14 moles of silica per mole of alumina, and having a particle size of less than 0.14 micron in diameter and a BET surface area of 40 to 300 sq. m/g.

U.S. Pat. No. 3,582,379

U.S. Pat. No. 3,582,379, entitled "Alkali Metal Alumino Silicates, Methods for their Production and Compositions Thereof," issued to Lowell E. Hackbarth et al. on June 1, 1971. It discloses a sodium alumino silicate useful as a filler in paper prepared by reacting sodium silicate and aluminum sulfate in an aqueous medium. Sodium sulfate is supplied to the reaction over its course in an amount equal to at least 1% by weight based on the weight of the silicate, with at least 10% of the sulfate being provided in the aqueous reaction medium from the inception of the reaction. The resulting precipitate is washed, filtered, dried and recovered in relatively dry, finely divided state.

U.S. Pat. No. 3,834,921

U.S. Pat. No. 3,834,921, entitled "Low Surface Area Pigments," issued to Robert K. Mays et al. on Sept. 10, 1974. It discloses a finely divided precipitated sodium alumino silicate pigment useful as an extender and functional filler in alkyl ketone dimer and other alkaline sized papers and giving increased sizing and opacity to same. This pigment has a surface area of from 15 to 40 sq. m/g, a mean particle size of about 70 millimicrons, a specific gravity of about 2.37 and an oil absorption of about 65.

Rubber Compositions

The art of incorporating carbon black/silica compositions into curable natural rubber formulations for the purposes of extension and reinforcement of such formulations has been extensively practiced and developed. These formulations are not readily cut or torn to failure, and when they are torn or cut, the extent to which the cut can propagate is minimized. Zeolites have also been used as a carrier for curing compounds.

In conventional practice curable materials such as natural and synthetic rubber are combined with curing agents and heated to effect a curing reaction between the agent and the material. Different combinations of curing agents and curable materials differ considerably in their rates of reaction. Some reactions occur so rapidly as to make proper blending of the curing agent and the curable material a problem. The volatility of some curing agents is such that substantial amounts of the agent are lost during compounding of the agent and curable material and before the curing reaction is initiated. Volatile curing agents which escape from the curable material prior to curing may present problems due to their explosive, inflammable, or toxic nature. Many curing agents including some of the less volatile ones also tend to escape from the curable material during storage. One solution to this problem is to adsorb the curing compound in a zeolitic molecular sieve thereby providing a carrier for the curing compound.

Rubber Composition Patents

U.S. Pat. No. 3,036,980

U.S. Pat. No. 3,036,980, entitled, "Rubber Composition Containing Zeolitic Molecular Sieve and Process for Curing," issued to Milton L. Dunham, Jr., et al. on May 29, 1962. It discloses a crystalline zeolitic molecular sieve containing in the adsorbed state a curing compound for a curable elastomer or curable resin. This zeolitic molecular sieve can be either zeolite A or zeolite X.

Plastic Compositions

Sodium alumino silicates have been used as fillers in plastics. These silicates have good resistance to acids and poor to excellent resistance to alkalies, depending on the disposition of the silica tetrahedra in the crystal lattice.

Non-Settling Flatting Pigments

The high gloss usually associated with clear varnish finishes is not always desirable. In the furniture industry, for example, a high gloss finish is generally characteristic of inexpensive merchandise while expensive furniture, traditionally, presents a rich appearance due to its dull, satin finish. This finish is obtained by a process consisting of hand rubbing the clear finish with some abrasive, such as pumice, mixed with oil or water. The effects of the rubbing treatment are gently abrasive, causing a slight roughness on the surface of the finish which diffuses light reflections and renders the shiny surface dull or flat. This operation is expensive and time-consuming and, although hand rubbing is still practiced to some extent, the same effect may be obtained by incorporating a proper flatting agent in the varnish.

The flatting agent, when formulated in a varnish, produces a surface phenomenon which roughens the film microscopically, thereby diffusing light reflections and reducing the luster of the film. These agents may be natural or synthetic materials. The natural materials are gums, resins and siliceous material such as diatomaceous earth. These materials have certain disadvantages either because they are expensive or fail to perform satisfactorily in the varnish.

Synthetic siliceous materials have gained wide use as flatting agents. However, one of the principal objections to these agents is the tendency of the flatting agent and the varnish base to settle from the liquid vehicle and form a hard cake when the varnish is stored for extended periods. The hard cake must then be redispersed through the varnish before the varnish is suitable for use. The redispersion ordinarily necessitates the removal of some of the liquid from above the settled varnish base and flatting agent, vigorous mixing of the cake, and gradual addition of the liquid vehicle with stirring to form a varnish of the proper consistency. In many instances, satisfactory redispersion of the varnish base and flatting agent through the liquid cannot be obtained even with this difficult and time-consuming operation.

Non-Settling Flatting Pigment Patents

U.S. Pat. No. 4,155,769

U.S. Pat. No. 4,155,769, entitled "Non-settling Coating Composition and Flatting Pigment", issued to Guillermo A. Almagro on May 22, 1979. It discloses a coating composition having a flatting pigment having non-settling properties obtained by grinding a dried precipitated hydrated silica and calcining it at a temperature of between 400 and 600 degrees Celsius.

SUMMARY OF THE INVENTION

The present invention involves the production of zeolites of small and uniform size having a high magnesium carbonate exchange capacity.

Accordingly it is an object of this invention to produce a zeolite which has a very high exchange capacity for both calcium and magnesium ions.

A further object of this invention is to produce a zeolite having a rapid calcium ion depletion rate which is superior to similar existing zeolites.

Still another object of this invention is to control the particle size of zeolites.

It is a further object of this invention to produce a very fine particle size zeolite without the use of mechanical methods such as high shear agitation or grinding of the product.

Still another object of this invention is a method for producing a combination of zeolite X and zeolite A crystals of desirable proportions in the same batch.

It is a further object of this invention to produce a zeolite useful as an ion exchange material in water softening compositions and detergents; as a filler in paper, rubber, and plastics; and as a non-settling flatting pigment.

Other objects and a fuller understanding of the invention may be had by referring to the following description and claims taken in conjunction with the accompanying drawings.

In one embodiment of the present invention for the production of zeolites of small and uniform size having a high magnesium exchange capacity, the present invention achieves its objectives by forming a sodium aluminate solution, forming a sodium silicate solution, adding together the sodium aluminate solution and the sodium silicate solution to form a reaction mixture comprising a sodium silicate mother liquor and an amorphous sodium alumino silicate pigment having a certain composition, heating the mixture, preferably to a temperature of from 40 to 120 degrees Celsius, more preferably from 80 to 120 degrees Celsius, most preferably 80 degrees Celsius, reacting the mixture, preferably at a temperature of from 40 to 120 degrees Celsius, more preferably from 80 to 120 degrees Celsius, most preferably 80 degrees Celsius, until a zeolite is formed, then recovering that zeolite. Both the sodium aluminate solution and the sodium silicate solution are preferably heated to a temperature of between 40 and 120 degrees Celsius prior to the addition of the sodium aluminate and the sodium silicate, more preferably 80 degrees Celsius. Preferably the sodium silicate solution has a silica to sodium oxide molar ratio of about 2.4:1. Preferably the sodium aluminate solution is added to the sodium silicate solution so that all of the sodium aluminate solution is added within 30 seconds. The sodium silicate mother liquor can be recycled as a source of sodium and silica.

Zeolite A of small and uniform size having a high magnesium exchange capacity is formed when the reaction mixture has a water to sodium oxide molar ratio of between 10:1 and 35:1, preferably between 15:1 and 20:1, most preferably about 20:1; a sodium oxide to silica molar ratio of between 1:1 and 4:1, preferably between 1:1 and 2.5:1, more preferably between 1.5:1 and 2:1, most preferably about 2:1; and a silica to alumina molar ratio of between 2:1 and 10:1, preferably between 3:1 and 10:1, more preferably between 3:1 and 8:1, most preferably about 3:1. When the sodium oxide to silica molar ratio is less than 4:3, the silica to alumina molar ratio is at least 3:1. When the sodium oxide to silica molar ratio is at least 4:3, the sodium oxide to alumina molar ratio is at least 4:1.

The particle size of zeolite A may be controlled by adjusting the silica to alumina molar ratio, with the particle size decreasing as the silica to alumina molar ratio is increased and the particle size increasing as the silica to alumina molar ratio is decreased. The particle size can also be controlled by adjusting either the sodium oxide to alumina molar ratio or the alumina concentration, with the particle size decreasing as the sodium oxide to alumina molar ratio is increased or the alumina concentration is decresed, and the particle size increasing as the sodium oxide to alumina molar ratio is decreased or the alumina concentration is increased.

This zeolite A has a calcium carbonate exchange capacity greater than 230 mg calcium carbonate per gram zeolite and a magnesium carbonate exchange capacity greater than 120 mg magnesium carbonate per gram zeolite. The resulting particles exhibit a narrow differential weight percent gaussian distribution with an average particle size of no more than 2.1 microns with at least 90% of the weight between 0.1 and 4.0 microns, wherein the cumulative percent population exhibits at least 35% less than one micron, with no more than 5% greater than 5 microns.

This zeolite A preferably has a calcium carbonate exchange capacity greater than 250 mg calcium carbonate/g zeolite and a magnesium exchange capacity greater than 140 mg magnesium carbonate/g zeolite. It has 90% of the particles less than 2 microns. The resulting zeolite particles preferably exhibit a narrow differential weight percent gaussian distribution with an average particle size of no more than 1.6 microns with at least 90% of the weight between 0.1 and 4.0 microns, wherein the cumulative percent population exhibits at least 64% less than one micron, with no more than 1% greater than 2.0 microns. It is useful as an ion exchange material in water softening compositions and detergents; as a filler in paper, rubber and plastics; and as a non-settling flatting pigment.

Zeolite X of small and uniform size having a high magnesium exchange capacity is formed when the reaction mixture has a water to sodium oxide molar ratio of between 25:1 and 90:1, preferably between 30:1 and 60:1, most preferably about 30:1; a sodium oxide to silica molar ratio of between 1:1 and 3:1, preferably between 1.2:1 and 1.7:1, most preferably about 1.6:1; and a silica to alumina molar ratio of between 5:1 and 10:1, preferably between 6:1 and 8:1, most preferably about 7.3:1.

This zeolite X has a calcium carbonate exchange capacity greater than 205 mg calcium carbonate per gram zeolite and a magnesium exchange capacity greater than 130 mg magnesium carbonate per gram zeolite, with the resulting zeolite particles exhibiting a narrow differential weight percent gaussian distribution with an average particle size of no more than 2.2 microns with at least 90% of the weight between 0.1 and 5.0 microns, wherein the cumulative percent population exhibits at least 41% less than one micron, with no more than 5% greater than 3.2 microns.

This zeolite X preferably has 90% of the particles less than 2 microns. It preferably has a calcium carbonate exchange capacity greater than 230 mg calcium carbonate/g zeolite and a magnesium carbonate exchange capacity greater than 135 mg magnesium carbonate/g zeolite. It is useful as an ion exchange material in water softening compositions and detergents; as a filler in paper, rubber and plastics; and as a non-settling flatting pigment.

A combination of from 20 to 80% zeolite X and from 20 to 80% zeolite A is formed when the reaction mixture has a water to sodium oxide molar ratio of between 10:1 and 60:1, preferably between 20:1 and 50:1, more preferably between 25:1 and 35:1, most preferably about 30:1; a sodium oxide to silica molar ratio of between 0.5:1 and 3:1, preferably between 1.4:1 and 3:1, more preferably between 1.6:1 and 2:1, most preferably about 1.7:1; and a silica to alumina molar ratio of between 2:1 and 15:1, preferably between 2:1 and 10:1, more preferably between 2:1 and 8:1, most preferably about 5.3:1.

This combination of zeolite A and zeolite X has a calcium carbonate exchange capacity greater than 220 mg calcium carbonate per gram zeolite and a magnesium exchange capacity greater than 115 mg magnesium carbonate per gram zeolite, with the resulting zeolite particles exhibiting a narrow differential weight percent gaussian distribution with an average particle size of no more than 5.4 microns with at least 90% of the weight between 0.1 and 10.0 microns, wherein the cumulative percent population exhibits at least 37% less than one micron, with no more than 5% greater than 5 microns.

This combination of zeolite A and zeolite X preferably has 90% of the particles less than 2 microns. It preferably has a calcium carbonate exchange capacity greater than 230 mg calcium carbonate/g zeolite and a magnesium exchange capacity greater than 135 mg magnesium carbonate/g zeolite. It is useful as an ion exchange material in water softening compositions and detergents; as a filler in paper, rubber and plastics; and as a non-settling flatting pigment.

In another embodiment of the present invention for the production of zeolites of small and uniform size having a high magnesium exchange capactity, the present invention achieves its objectives by dissolving sand in a sodium hydroxide solution at a pressure of at least 100 psig heated to a temperature of at least 130 degrees Celsius to produce a sodium silicate solution having a silica to sodium oxide molar ratio of between 2.4:1 and 2.8:1, activating the sodium silicate thus formed with alumina, forming a sodium aluminate solution, adding the sodium aluminate solution to the sodium silicate solution so that all of the sodium aluminate solution is added within 30 seconds to form a reaction mixture comprising a sodium silicate mother liquor and an amorphous sodium alumino silicate pigment having, in total, a certain composition, heating the mixture to a temperature of from 40 to 120 degrees Celsius, reacting the mixture at a temperature of from 40 to 120 degrees Celsius until zeolite is formed, then recovering the zeolite produced. Preferably the sand is dissolved at a pressure of about 140 psig at a temperature of at least 130 degrees Celsius. Preferably the sodium silicate solution has a silica to sodium oxide molar ratio of about 2.4:1. The sodium silicate is activated with from 50 to 2000 ppm alumina at a temperature of from 15 to 100 degrees Celsius for at least 10 minutes, preferably with from 400 to 600 ppm alumina at room temperature, most preferably with about 600 ppm alumina. Both the sodium silicate solution and the sodium aluminate solution are heated to a temperature of between 40 and 120 degrees Celsius, preferably between 80 and 120 degrees Celsius, more preferably 80 degrees Celsius, prior to the addition of the sodium aluminate to the sodium silicate. The reaction mixture is reacted at a temperature of from 40 to 120 degrees Celsius until a zeolite is formed, preferably at a temperature of from 80 to 120 degrees Celsius, most preferably at a temperature of about 80 degrees Celsius. The sodium silicate mother liquor may be recycled as a source of sodium and silica or sodium silicate solution.

A zeolite A of small and uniform size having a high magnesium exchange capacity is formed when the reaction mixture has a water to sodium oxide molar ratio of between 25:1 and 35:1, preferably about 25:1; a sodium oxide to silica molar ratio of between 1.4:1 and 2:1, preferably about 1.8:1; and a silica to alumina molar ratio of between 3:1 and 7:1, preferably about 3:1.

A zeolite X of small and uniform size having a high magnesium exchange capacity is formed when the reaction mixture has a water to sodium oxide molar ratio of between 30:1 and 40:1, preferably about 30:1; a sodium oxide to silica molar ratio of between 1:1 and 1.2:1, preferably 1.2:1; a silica to alumina ratio of between 5:1 and 7:1, preferably 7:1.

A combination of from 20 to 80% zeolite X and from 20 to 80% zeolite A is formed when the reaction mixture has a water to sodium oxide molar ratio of between 10:1 and 60:1, preferably between 15:1 and 60:1, more preferably about 25:1; a sodium oxide to silica molar ratio of between 0.5:1 and 2.5:1, preferably between 0.7:1 and 1.7:1, more preferably about 1.7:1, and a silica to alumina molar ratio 5:1 and 15:1, preferably between 5:1 and 10:1, more preferably about 7:1.

DESCRIPTION OF THE PREFERRED EMBODIMENTS

In its broadest aspect, the present invention is based upon four different discoveries: (1) the discovery that the type of zeolite formed is determined by how long it takes for the zeolite to be formed at a given reaction temperature; (2) the discovery that the reaction time needed to crystallize a zeolite is a function primarily of the water to sodium oxide molar ratio, with the sodium oxide to silica and silica to alumina molar ratios having a smaller effect on reaction time; (3) the discovery that the magnesium exchange capacity of zeolite A is a function of particle size of the zeolite; and (4) the discovery that the particle size of a zeolite is a function of silica to alumina molar ratio, sodium oxide to alumina molar ratio, and alumina concentration.

A zeolite of small and uniform particle size having a high magnesium exchange capacity can be produced by using these four discoveries. This zeolite is produced in a reaction mixture having a high silica to alumina molar ratio, with the other oxide molar ratios adjusted to produce the desired zeolite.

In the known processes for forming zeolites, a reaction mixture of sodium-aluminum-silicate water is prepared having a particular composition. This mixture is maintained at a certain temperature until crystals are formed, then the crystals are separated from the reaction mixture. For silica to alumina molar ratios greater than two, the reaction mixture consists of a sodium silicate mother liquor and an amorphous sodium alumino silicate pigment. When this two phase reaction mixture is reacted at elevated temperatures, nothing visually happens for a certain period of time, but after that period of time the zeolite rapidly crystallizes and can then be separated from the reaction mixture.

Control of Reaction Time

The present invention is based in part upon the discovery that, for any particular source of silica, the type of zeolite formed is determined by the reaction time necessary for the beginning of crystallization to occur at a given reaction temperature. When the reaction time is short, hydroxy-sodalite is formed, but when the reaction time is longer, zeolite A is formed. When the reaction time is still longer, zeolite X is formed. When the reaction time is between that necessary for the formation of zeolite A and that necessary for the formation of zeolite X, then a combination of zeolite A and zeolite X is formed. The reaction time is dependent upon the source of silica and whether or not the silica has been activated. The reaction time can be found readily by experimentation for any particular source of silica.

The reaction time necessary for crystallization at a given reaction temperature can be controlled in a variety of ways, but the major way of controlling reaction time is by adjusting the water to sodium oxide molar ratio of the reaction mixture. The reaction time necessary to form a zeolite is directly proportional to the water to sodium molar ratio used. For instance, when the source of silica is not activated with alumina, the preferred water to sodium oxide molar for making zeolite A is between 15:1 and 20:1; for making zeolite X, it is between 30:1 and 60:1; and for making a combination of zeolite X and zeolite A it is between 25:1 and 35:1. One possible explanation is that a higher water to sodium oxide ratio means the solution is more dilute, which means that it takes longer for the reaction sites to come together, which causes a longer reaction time. Therefore, to get a zeolite A in a reaction mixture having a sodium oxide to silica molar ratio and a silica to alumina molar ratio where normally a zeolite X would be formed, one would decrease the water to sodium oxide ratio. Adjusting the water to sodium oxide molar ratio is the main control for determining which type of zeolite is formed and is analogous to a course control on a proportional feedback controller.

This relationship between the water to sodium oxide molar ratio and the type of zeolite formed was not previously known. For instance, U.S. Pat. Nos. 2,882,243 and 2,882,244, both of which issued to Robert Milton, show a water to sodium oxide molar ratio of from 35 to 200 for the production of zeolite A and a water to sodium oxide molar ratio of from 35 to 60 for the production of zeolite X. If anything, this would imply that the reaction mixture for preparing zeolite A should have a higher water to sodium oxide molar ratio than the reaction mixture for preparing zeolite X, which is not the case. In U.S. Pat. No. 3,119,659, the water to sodium oxide molar ratio for the production of zeolite A is from 20 to 100 while the water to sodium oxide molar ratio for the production of zeolite X is from 30 to 60. None of the above patents show that the water to sodium oxide molar ratio should be higher for making zeolite X than for making zeolite A.

Another way of controlling the reaction time necessary for crystallization at a given reaction temperature is by adjusting the sodium oxide to silica molar ratio of the reaction mixture. The reaction time necessary to form a zeolite is inversely proportional to the sodium oxide to silica molar ratio used. The effect of sodium oxide to silica molar ratio is less pronounced than that of water to sodium oxide molar ratio. It is analogous to a fine control on a proportional feedback controller.

One possible theory as to why increasing the sodium oxide to silica molar ratio would decrease the reaction time necessary to form a zeolite is that increasing the sodium oxide to silica molar ratio for a given water to sodium oxide molar ratio reduces the viscosity of the reaction mixture.

Adjusting the silica to alumina molar ratio of the reaction mixture also affects the reaction time necessary for crystallization at a given reaction temperature, but this effect is much less than the effect of sodium oxide to silica molar ratio, which in turn is much less than the effect of water to sodium oxide molar ratio. For a given water to sodium oxide molar ratio and a given sodium oxide to silica molar ratio, the reaction time necessary to form a zeolite is directly proportional to the silica to alumina molar ratio.

The reaction time at a given temperature can be reduced by adding the sodium aluminate solution to the sodium silicate solution at a fast rate of addition, preferably so that all of the sodium aluminate solution is added within 30 seconds, and more preferably simultaneously. Thus, the reaction time necessary for crystallization at a given reaction temperature can be increased by increasing the water to sodium oxide ratio; decreasing the sodium oxide to silica molar ratio; increasing the silica to alumina molar ratio and adding the two materials at a slow rate of addition.

Effect of Particle Size on Exchange Capacity

The present invention is also based upon the discovery that the magnesium exchange capacity of zeolite A is a function of zeolite particle size. As the particle size decreases, the magnesium exchange capacity increases. For zeolite A, when the average diameter is 2.4 microns the magnesium capacity is only 62 mg/g, when the average diameter is 1.1 microns the magnesium capacity is about 124 mg/g, and when the average diameter is 0.8 microns the magnesium capacity is 159 mg/g.

Control of Particle Size

Much more important than the effect of silica to alumina molar ratio on reaction time is the effect of silica to alumina molar ratio on particle size. The reason for this effect is not known but the particle size of a zeolite increases as the silica to alumina molar ratio of the reaction mixture approaches that of the desired zeolite. The particle size decreases as the silica to alumina molar ratio departs from that of the desired zeolite. For instance, the silica to alumina molar ratio of zeolite A is 1.85±0.5. Therefore, a zeolite A is formed in a reaction mixture having a silica to alumina molar ratio of 10:1 would have a smaller particle size than a zeolite A formed in a reaction mixture having a silica to alumina molar ratio of 2:1. This means that one can control the particle size of a zeolite by adjusting the silica to alumina molar ratio of the reaction mixture. In order to increase particle size one would adjust the silica to alumina molar ratio of the reaction mixture so that it approaches the silica to alumina molar ratio of the desired product. For zeolite A, that ratio is 1.85±0.5. For zeolite X it is 2.5±0.5. In order to decrease particle size one would adjust the silica to alumina molar ratio of the reaction mixture so that it departs from the silica to alumina molar ratio of the desired product.

For both zeolite A and zeolite X, the silica to alumina molar ratios of the reaction mixtures used in the present invention are higher than the silica to alumina molar ratios of the desired product. Therefore, to increase the particle size of either zeolite X or zeolite A or a combination thereof, one would decrease the silica to alumina molar ratio of the reaction mixture. In order to decrease the particle size, one would increase the silica to alumina molar ratio of the reaction mixture.

Other means of controlling the particle size of the final product include adjusting either the sodium oxide to alumina molar ratio or the alumina concentration of the reaction mixture. The particle size is inversely proportional to the sodium oxide to alumina molar ratio, and directly proportional to the alumina concentration. The effects of the sodium oxide to alumina molar ratio and the effects of alumina concentration on particle size are of similar magnitude as the effect of silica to alumina molar ratio.

Since silica to alumina molar ratio, sodium oxide to alumina molar ratio, and alumina concentration are all interrelated, it is unclear, at present, which is the predominant factor, but any of the three variables or a combination thereof can be used to control particle size.

The sodium oxide to silica molar ratio of the reaction mixture also affects the particle size of the final product, but this effect is much smaller in magnitude than the effect of silica to alumina molar ratio. For a constant silica to alumina molar ratio, the particle size is inversely proportional to sodium oxide to silica molar ratio. As the sodium oxide to silica molar ratio increases, the particle size decreases. As the sodium oxide to silica molar ratio decreases, the particle size increases. Thus, the effect of sodium oxide to silica molar ratio of the reaction mixture on particle size can be used in combination with the effect of silica to alumina molar ratio of the reaction mixture on particle size as a means of controlling particle size.

The water to sodium oxide molar ratio of the reaction mixture also affects the particle size of the final product, but this effect is smaller in magnitude than the effect of sodium oxide to silica molar ratio. The reaction temperature also affects the particle size.

Although batch composition and reaction temperature are used to control particle size, there are conditions which agglomeration can occur. Agglomeration will result in a product which does not exhibit the expected particle size or properties. The process as described in the patent examples are directed to optimum conditions under which there is no agglomeration. If the temperature of the reactants at the time of mixing is too low or the concentration of the sodium oxide or water are severely altered in the solutions being used, one can expect agglomeration. At an extreme a bimodal distribution may appear. These effects can be overcome by such techniques as longer rates of addition, reverse sequence of addition, higher agitation speeds, etc. The point is that these techniques are not really controlling the primary particle size, they are merely changing the degree of agglomeration. Only batch compositon and reation temperature control primary particle size, and the type of the product formed.

Description of the Process

In the present invention, a zeolite of small and uniform size having a high magnesium exchange capacity is formed by forming a sodium aluminate solution, forming a sodium silicate solution, adding together the sodium aluminate solution and the sodium silicate solution to produce a reaction mixture comprising a sodium silicate mother liquor and an amorphous sodium alumino silicate pigment, heating the mixture to a temperature of from 40 to 120 degrees Celsius, reacting the mixture at a temperature of from 40 to 120 degrees Celsius until the desired zeolite is formed, and recovering the desired zeolite from the mother liquor.

The sodium silicate solution used in this process can be formed by dissolving sand in a sodium hydroxide solution at a pressure of at least 100 psig and a temperature of at least 130 degrees Celsius to produce a sodium silicate solution having a silica to sodium oxide molar ratio of between 2.4:1 and 2.8:1. The word "sand" is to be given its usual meaning of "a loose material consisting of small but easily distinguishable grains, usually less than two millimeters in diameter, most commonly of quartz resulting from the disintegration of rocks, and commonly used for making mortar and glass, as an abrasive, or for molds in founding." A temperature of at least 130 degrees Celsius is used to dissolve the sand because it is more difficult to dissolve sand at lower temperatures.

This sodium silicate solution is activated with from 50 to 2000 ppm alumina and heated to a temperature between 40 and 120 degrees Celsius. Alumina concentrations of less than 50 ppm alumina do not activate the silica. Alumina concentrations of more than 2000 ppm cause the alumina to precipitate out of the solution as an amorphous sodium alumino silicate. Preferably the silica to sodium oxide molar ratio of the sodium silicate solution is about 2.4:1, since this sodium silicate solution is usually less expensive to make than solutions having higher silica to sodium oxide molar ratios, such as waterglass.

After a sodium silicate solution is formed, and is either activated or not activated, a sodium aluminate solution is added to the sodium silicate solution to form a reaction mixture. The reaction mixture can also be formed by adding the sodium silicate solution to the sodium aluminate solution. Preferably both the sodium aluminate solution and the sodium silicate solution are heated to a temperature of between 40 and 120 degrees Celsius prior to the addition of the sodium aluminate to the sodium silicate to avoid agglomeration. More preferably, the solutions are heated to a temperature of 80 degrees Celsius. Preferably the two solutions are added simultaneously, or at least within thirty seconds, since fast addition times require less reaction time than longer addition times. Also there is the possibility of forming undesired zeolites if the addition time is too long.

Zeolite A of small and uniform size having a high magnesium exchange capacity can be formed in a reaction mixture having a water to sodium oxide molar ratio of between 10:1 and 35:1; a sodium oxide to silica molar ratio of between 1:1 and 4:1; and a silica to alumina molar ratio of between 2:1 and 10:1 wherein, when the sodium oxide to silica molar ratio is less than 4:3; the silica to alumina molar ratio is between 3:1 and 10:1, and when the sodium oxide to silica molar ratio is more than 4:3, the sodium oxide to alumina molar ratio is greater than 4:1.

As the water to sodium oxide molar ratio falls below 10:1, for the sodium oxide to silica and silica to alumina molar ratios of the present invention, there is an increased probability of forming hydroxy sodalite instead of zeolite A. As the water to sodium oxide molar ratio approaches 35:1, for the sodium oxide to silica and silica to alumina molar ratios of the present invention, there is an increased probability of producing either zeolite X or a combination of zeolite A and zeolite X instead of zeolite A.

As the sodium oxide to silica molar ratio approaches 1:1 the solution becomes extremely rich in silica, which has a dampening effect on the reaction. At sodium oxide to silica molar ratios of below 1:1, the reaction time needed to produce zeolite is prohibitively long. As the sodium oxide to silica molar ratio approaches 4:1, there is an increased probability of making hydroxy sodalite instead of zeolite A because of the sodium acting as an activator in the system.

As the silica to alumina molar ratio approaches 10:1 the yield decreases very rapidly. A silica to alumina molar ratio of at least 2:1 is required to supply enough silica to satisfy the stoichiometric formula for zeolite A and produce a sodium silicate mother liquor. Either a silica to alumina molar ratio of at least 3:1 or a sodium oxide to alumina molar ratio of at least 4:1 is required to achieve the small and uniform particle size of the present invention.

When the sodium silicate source has been activated with alumina, the preferred reaction mixture has a water to sodium oxide molar ratio of between 25:1 and 35:1, a sodium oxide to silica molar ratio of between 1.4:1 and 2:1; and a silica to alumina molar ratio of between 3:1 and 7:1. When the sodium silicate source has not been activated with alumina, the preferred reaction mixture has a water to sodium oxide molar ratio of between 15:1 and 20:1; a sodium oxide to silica molar ratio of between 1.5:1 and 2:1; and a silica to alumina molar ratio of between 2:1 and 4:1.

Zeolite X of small and uniform size having a high magnesium exchange capacity can be formed in a reaction medium having a water to sodium oxide molar ratio of between 25:1 and 90:1; a sodium oxide to silica molar ratio of between 1:1 and 3:1; and a silica to alumina molar ratio of between 5:1 and 10:1.

As the water to sodium oxide molar ratio falls below 25:1, there is an increased probability of making zeolite A instead of zeolite X. As the water to sodium oxide molar ratio rises above 90:1 the increased dilution causes the yield to fall rapidly.

As the sodium oxide to silica molar ratio approaches 1:1 the solution becomes extremely rich in silica, which has a dampening effect on the reaction. At sodium oxide to silica molar ratios of below 1:1, the reaction time needed to produce zeolite is prohibitively long. A low sodium oxide to silica ratio is also conducive to agglomeration, which would destroy uniformity of particle size. As the sodium oxide to silica molar ratio approaches 3:1, there is an increased probability of making zeolite A or a combination of zeolite A and zeolite X instead of zeolite X because of the sodium acting as an activator in the system.

As the silica to alumina molar ratio approaches 10:1 the reaction time becomes longer and the yield decreases very rapidly. A silica to sodium oxide molar ratio of at least 5:1 is required to achieve the small and uniform particle size of the present invention.

When the sodium silicate source has been activated with alumina, the preferred reaction mixture has a water to sodium oxide molar ratio of between 30:1 and 40:1; a sodium oxide to silica molar ratio of between 1:1 and 1.2:1 and a silica to alumina molar ratio of between 5:1 and 7:1. When the sodium silicate source has not been activated with alumina, the preferred reaction mixture has a water to sodium oxide molar ratio of between 30:1 and 60:1; a sodium oxide to silica molar ratio of between 1.2:1 and 1.7:1 and a silica to alumina molar ratio of between 6:1 and 8:1.

A combination of zeolite X and zeolite A can be formed in a reaction mixture having a water to sodium oxide molar ratio of between 10:1 and 60:1; a sodium oxide to silica molar ratio of between 0.5:1 and 3:1; and a silica to alumina molar ratio of between 2:1 and 15:1. When the sodium silicate source has been activated with alumina, the preferred reaction mixture has a water to sodium oxide molar ratio of between 15:1 and 60:1; a sodium oxide to silica molar ratio of between 0.7:1 and 1.7:1; and a silica to alumina molar ratio of between 5:1 and 10:1. When the sodium silicate source has not been activated with alumina, the preferred reaction has a water to sodium oxide molar ratio of between 20:1 and 50:1; a sodium oxide to silica molar ratio of between 1.4:1 and 3:1; and a silica to alumina molar ratio of between 2:1 and 10:1.

As the water to sodium oxide molar ratio falls below 10:1, for the sodium oxide to silica and silica to alumina molar ratios of the present invention, there is an increased probability of forming zeolite A instead of a combination of zeolite A and zeolite X. As the water to sodium oxide molar ratio approaches 60:1, for the sodium oxide to silica and silica to alumina molar ratios of the present invention, there is an increased probability of forming zeolite X instead of a combination of zeolite A and zeolite X.

As the sodium oxide to silica molar ratio approaches 0.5:1, the solution becomes so rich in silica that the reaction is completely dampened, with no reaction taking place. As the sodium oxide to silica molar ratio approaches 3:1, there is an increased probability of making zeolite A instead of a combination of zeolite A and zeolite X because of the sodium acting as an activator in the system.

As the silica to alumina molar ratio approaches 15:1 the yield decreases rapidly. If the silica to alumina molar ratio is below 2:1, there is not enough silica in the process to fill the stoichiometric formula for zeolite X.

The broad oxide mole ratio ranges for making each zeolite are shown in Table I.

TABLE I
BROAD RANGES FOR MAKING ZEOLITES OF SMALL AND UNIFORM SIZE HAVING A HIGH MAGNESIUM EXCHANGE CAPACITY

| Zeolite | Water/Sodium Oxide | Sodium Oxide/Silica | Silica/Alumina |
|---|---|---|---|
| A | 10–35 | 1–4 | 2–10 |
| X | 25–90 | 1–3 | 5–10 |
| X & A | 10–60 | 0.5–3 | 2–15 |

The preferred oxide mole ratio ranges for making each zeolite using a source of sodium silicate that has not been activated with alumina are shown in Table II.

TABLE II
PREFERRED RANGES FOR MAKING ZEOLITES OF SMALL AND UNIFORM SIZE HAVING A HIGH MAGNESIUM EXCHANGE CAPACITY
(Unactivated)

| Zeolite | Water/Sodium Oxide | Sodium Oxide/Silica | Silica/Alumina |
|---|---|---|---|
| A | 15–20 | 1.4–2 | 2–4 |
| X | 30–60 | 1.2–1.7 | 6–8 |
| X & A | 20–50 | 1.6–3 | 2–10 |

The preferred oxide mole ratio ranges for making each zeolite using a source of sodium silicate that has been activated with alumina are shown in Table III.

TABLE III
PREFERRED RANGES FOR MAKING ZEOLITES OF SMALL AND UNIFORM SIZE HAVING A HIGH MAGNESIUM EXCHANGE CAPACITY
(Activated)

| Zeolite | Water/Sodium Oxide | Sodium Oxide/Silica | Silica/Alumina |
|---|---|---|---|
| A | 25–35 | 1.4–2 | 3–7 |
| X | 30–40 | 1–1.2 | 5–7 |
| X & A | 15–60 | 0.7–1.7 | 5–10 |

The reaction mixtures used in the present invention for producing zeolite X or zeolite A have higher silica to alumina molar ratios than the reaction mixtures used in the prior processes for producing the same zeolite. For instance, in the present invention the silica to alumina molar ratio of the reaction mixture used to make zeolite X is between 5:1 and 10:1. In U.S. Pat. No. 2,882,244 zeolite X is made from a reaction mixture having a silica to alumina molar ratio of from 3:1 to 5:1. In the present invention, zeolite A is preferably formed in a reaction mixture having a silica to alumina molar ratio of between 3:1 and 10:1. In the U.S. Pat. No. 2,882,243 zeolite A is made from a reaction mixture having a silica to alumina molar ratio of from 0.5:1 to 2.5:1. Nothing in the prior art teaches that either zeolite X or zeolite A could be formed in a reaction mixture having such a high silica to alumina molar ratio as that of the present invention.

The reaction mixture is heated to a temperature of from 40 to 120 degrees Celsius and reacted at a temperature of from 40 to 120 degrees Celsius until a zeolite is formed, preferably at a temperature of from 80 to 100 degrees Celsius, most preferably at a temperature of about 80 degrees Celsius. Temperatures should be above 40 degrees Celsius to prevent agglomeration which would destroy the uniform size of the zeolite. This agglomeration occurs because of the higher viscosities of the solution at lower temperatures. Temperatures of above 120 degrees would require the use of high pressure, which would produce a different environment for the reaction, causing the formation of undesired products.

To ensure a good yield of the desired zeolite product, it is necessary to react the zeolite mixture beyond a certain minimum time. If, however, the reaction is continued too long, the product starts to lose silica, that is the silica to alumina ratio starts to fall, and if the reaction is continued even further, then the product may recrystallize to an undesirable zeolitic material. There is an optimum reaction time which is, in part, determined by the ratios and concentrations of the original reaction mixture, by the size of the batch, the time required to mix the ingredients and the rate of heating. The optimum reaction time can readily be determined by experiment.

Once the zeolite has been separated from the sodium silicate mother liquor, the mother liquor may be recycled as a source of sodium and silica. Recycling of the mother liquor eliminates the problem of how to dispose of the mother liquor. Although it is possible to use the process of the present invention without recycling the mother liquor, failure to recycle the mother liquor could make the process cost prohibitive.

Small Particle Size Zeolites

The silica to alumina molar ratio of zeolite X is about 2.5:1 and the silica to alumina molar ratio of zeolite A is about 1.85:1. Thus, the silica to alumina molar ratios of the reaction mixtures of the present invention are farther away from that of zeolite X or zeolite A than the silica to alumina molar ratios of the reaction mixtures of the prior art. As stated above, the particle size of the zeolite is smaller when the silica to alumina molar ratio of the reaction mixture is farther away from the silica to alumina molar ratio of the desired zeolite. Because of this, the zeolite X and the zeolite A of the present invention has a smaller particle size than that of the prior art.

Because of its small particle size, the zeolite X and the zeolite A of the present invention are both useful in a variety of uses such as an ion-exchange material in water softening compositions and detergents; as a filler in paper, rubber and plastics; and as a non-settling flatting pigment.

This zeolite A, having a smaller particle size, has a higher magnesium ion exchange capacity than zeolite A having larger particle sizes. This increased magnesium ion exchange capacity makes this zeolite A especially useful as an ion exchange material in water softening compositions and detergents.

Another factor that makes zeolites especially useful as ion exchange materials is their fast calcium carbonate depletion rate. These zeolites remove calcium ions faster than zeolites having larger particle sizes. The zeolite A having the smaller particle size exchanges the calcium ions at a faster rate than the zeolite A having the larger particle size.

Reason for overlap of ranges

As can be seen in Tables I, II and III, the ranges of water to sodium oxide molar ratios needed to produce zeolite X, zeolite A, or a combination of zeolite X and zeolite A overlap each other. The water to sodium oxide molar ratio is the major controlling factor which determines the reaction time necessary for crystallization at a given reaction temperature, which in turn determines the type of zeolite formed. But, as stated above, there are other factors that have a smaller effect on reaction time, such as sodium oxide to silica molar ratio, silica to alumina molar ratio, degree of agitation and rate of addition of the sodium aluminate solution to the sodium silicate solution. These additional factors can either add to or subtract from the effect of water to sodium oxide molar ratio.

For instance, either zeolite X or zeolite A can be formed from a reaction mixture having a water to sodium oxide molar ratio of 30:1. In that case, the additional factors would determine which type of zeolite would be produced. If the sodium oxide to silica molar ratio is 1.2:1 and the silica to alumina molar ratio is 8:1, then zeolite X will be produced. But if the sodium oxide to silica molar ratio is 2:1 and the silica to alumina molar ratio is 3:1, then zeolite A will be produced. The type of zeolite formed depends on the total effect of the water to sodium oxide molar ratio and all of the additional factors mentioned above.

Combination of zeolite A and zeolite X

One of the results of using the principles of the present invention is the ability for the first time in history to make a controlled combination of zeolite X and zeolite A in the same reaction. A combination of from 20 to 80% zeolite X and from 20 to 80% zeolite A can be formed by adjusting the reaction time necessary for crystallization to a time between that required to make zeolite X and that required to make zeolite A. The composition of the combination depends on the reaction time. If the reaction time is close to that required to make zeolite X, much more zeolite X will be formed than zeolite A. If, on the other hand, the reaction time is close to that of zeolite A, much more zeolite A will be formed than zeolite X. By adjusting the reaction time, one can make any desired combination of zeolite X and zeolite A.

A combination of zeolite X and zeolite A can be formed in a reaction mixture having a water to sodium oxide molar ratio of between 10:1 and 60:1; a sodium oxide to silica molar ratio of between 0.5:1 and 3:1; and a silica to alumina molar ratio of between 2:1 and 15:1.

When the source of sodium silicate is not activated with alumina, the preferred reaction mixture for forming a combination of zeolite X and zeolite A has a water to sodium oxide molar ratio of between 20:1 and 50:1; a sodium oxide to silica molar ratio of between 1.4:1 and 3:1; and a silica to alumina molar ratio of between 2:1 and 10:1. More preferably, the reaction mixture should have a water to sodium oxide molar ratio of between 25:1 and 35:1; a sodium oxide to silica molar ratio of between 1.6:1 and 2:1; and a silica to alumina molar ratio of between 2:1 and 8:1.

When the source of sodium silicate has been activated with alumina, the preferred reaction mixture for forming a combination of zeolite X and zeolite A has a water to sodium oxide molar ratio of between 10:1 and 60:1; a sodium oxide to silica molar ratio of between 0.5:1 and 2.5:1; and a silica to alumina molar ratio of between 5:1 and 15:1. More preferably, the reaction mixture should have a water to sodium oxide molar ratio of between 15:1 and 60:1; a sodium oxide to silica molar ratio of between 0.7:1 and 1.7:1; and a silica to alumina molar ratio of between 5:1 and 10:1.

The combination of zeolite X and zeolite A has an average particle size less than 2 microns in diameter. It is useful, because of its small particle size, as an ion exchange material in water softening compositions and detergents; as a filler in paper, rubber and plastics; and as a non-settling flatting pigment. Sand can be used as a source of silica in the production of zeolite Y by activating the sand with from 50 to 2000 ppm alumina.

Activation of Unreactive Sources of Silica

Any source of sodium silicate can be used in the present invention, but one particularly desirable source of sodium silicate is sand dissolved in caustic. The advantage of this source is its low cost. The sand is dissolved in a sodium hydroxide solution at a pressure of at least 100 psig and a temperature of at least 130 degrees Celsius to produce a sodium silicate solution having a silica to sodium oxide molar ratio of between 2.4:1 and 2.8:1. Preferably the pressure is about 140 psig, producing a sodium silicate solution having a silica to sodium oxide molar ratio of about 2.4:1.

The time required to produce a given product from batches of identical chemical composition will be dependent of the source of silicon dioxide. Each different type of silica source has its own time table specifying the reaction times needed to form each type of zeolite. One of the discoveries upon which this invention is based is the fact this time table can be changed by activating the silica source with alumina.

The silica source can be activated with from 50 to 2000 ppm alumina at a temperature of from 15 to 100 degrees Celsius for at least 10 minutes. The alumina concentration limits of 50 to 2000 ppm alumina are critical values. For some reason, alumina concentrations below 50 ppm fail to activate the sodium silicate solution. Preferably, the alumina concentration is between 400 and 600 ppm, most preferably 600 ppm. Preferably the activation occurs at room temperature.

The alumina used to activate the sodium silicate solution may suitably be provided by a soluble aluminum compound such as sodium aluminate or a water soluble aluminum salt, such as aluminum sulphate. Sodium aluminate is, however, the preferred reagent since it limits the tendency to introduce foreign ions into the zeolite lattice.

There is an important difference between the effect of activation and the effect of reaction time controlling factors such as water to sodium oxide molar ratio, sodium oxide to silica molar ratio, silica to alumina molar ratio and rate of addition. The reaction time controlling factors are used to adjust the reaction time necessary for crystallization so that it will match with the reaction time in a time table to produce a particular zeolite. Activation changes the time table. For that reason, the preferred oxide mole ratios for producing a desired zeolite are different when a source of silica is either activated or not activated (See Tables II and III above).

EXAMPLES

The invention will be further illustrated by the following examples which set forth particularly advantageous method and composition embodiments. While the examples illustrate the present invention, they are not intended to limit it.

Procedures Used in Examples

Calcium carbonate exchange capacity was determined by placing the zeolite in an exchange solution, agitating for fifteen minutes, filtering off the zeolite and titrating the filtrate with EDTA (ethylenediaminetetraacetic acid) solution to determine how many calcium ions had been removed. The exchange solution was made from calcium chloride to obtain a concentration equivalent to 122 g calcium carbonate per liter. The filtrate was buffered to pH 10, then Erichrome Black T indicator (3-hydroxy-4-((1-hydroxy-2-naphthyl)azo)-7-nitrolnaphthalenesulfonic acid sodium salt) was added to the filtrate prior to EDTA titration.

Magnesium carbonate exchange capacity was determined by placing the zeolite in an exchange solution, agitating for fifteen minutes, filtering off the zeolite and titrating the filtrate with EDTA solution to determine how many magnesium ions have been removed. The exchange solution was made from magnesium chloride to obtain a concentration equivalent to 1000 ppm magnesium carbonate. The filtrate was buffered to pH 10, then Erichrome Black T indicator was added to the filtrate prior to EDTA filtration.

Particle size measurements were made by Coulter Counter (Model TAII). Particle size analysis by Coulter Counter measures both sample volume and number of particles in specific size ranges. Since volume % and weight % are synonymous when all particles have the same density, weight % is used since it is the most conventional way to express particle size data.

The following terms have been used in describing the particle size of the present invention:

Gaussian distribution: The frequency curves of a gaussian distribution, also known as symmetrical or bell-shaped frequency curves, are characterized by the fact that observations equidistant from the central maximum have the same frequency.

Average particle size: The average particle size is the size at which 50% of the total weight is accounted for. Results were confirmed by Scanning Electron Microscope.

Cumulative % population: The cumulative % population is the percentage of all the counted particles.

Commercial zeolite A, as used in this specification, refers to Arogen 2000, a registered trademark of the J. M. Huber Corporation. Arogen 2000 is prepared according to the teachings of U.S. Pat. No. 4,041,135, which is incorporated by reference to show how to produce a commercial zeolite A, Arogen 2000.

PREPARATION OF ZEOLITE A

EXAMPLE ONE

A sodium silicate solution of composition 1.9% sodium oxide and 4.6% silica was heated to 90 degrees Celsius. Sodium aluminate solution, also at 90 degrees Celsius, of composition 26.8% sodium oxide and 6.8% alumina was added to the sodium silicate so that all of the sodium aluminate solution was added within thirty seconds. The resulting gel was broken down by agitation until a homogeneous slurry was obtained. The batch was then reacted at 100 degrees Celsius for four hours. The total batch composition had a water to sodium oxide molar ratio of about 30:1, a sodium oxide to silica molar ratio of about 3.0:1 and a silica to alumina molar ratio of about 2.5:1. The resulting product was zeolite A which exhibited a calcium ion exchange capacity of 292 mg calcium carbonate/g zeolite and a magnesium ion exchange capacity of 62 mg magnesium carbonate/g zeolite. The resulting zeolite particles exhibit a narrow differential weight percent gaussian distribution with an average particle size of 2.4 microns with at least 90% of the weight between 0.1 and 4.0 microns. The cumulative percent population exhibits 19% less than one micron, with no more than 5 percent greater than 3.2 microns.

EXAMPLE TWO

A sodium silicate solution of composition 2.9% sodium oxide and 7.1% silica was heated to 50 degrees Celsius. Sodium aluminate solution, also at 50 degrees Celsius, of composition 26.2% sodium oxide and 7.2% alumina was added to the sodium silicate so that all of the sodium aluminate solution was added within thirty seconds. The resulting gel was broken down by agitation until a homogeneous slurry was obtained. The batch was then reacted at 60 degrees Celsius for eight hours. The total batch composition had a water to sodium oxide molar ratio of about 25:1, a sodium oxide to silica molar ratio of about 2.4:1 and a silica to alumina molar ratio of about 3.0:1. The resulting product was zeolite A which exhibited a calcium ion exchange capacity of 300 mg calcium carbonate/g zeolite and a magnesium ion exchange capacity of 134 mg magnesium carbonate/g zeolite. The resulting zeolite particles exhibit a narrow differential weight percent gaussian distribution with an average particle size of 0.9 microns with at least 90% of the weight between 0.1 and 2.0 microns. The cumulative percent population exhibits 96% less than one micron, with no more than 1 percent greater than 1.25 microns.

EXAMPLE THREE

A sodium silicate solution of composition 2.9% sodium oxide and 7.1% silica was heated to 70 degrees Celcius. Sodium aluminate solution, also at 70 degrees Celsius, of composition 26.2% sodium oxide and 7.2% alumina was added to the sodium silicate so that all of the sodium aluminate solution was added within thirty seconds. The resulting gel was broken down by agitation until a homogeneous slurry was obtained. The batch was then reacted at 80 degrees Celsius for two hours. The total batch composition had a water to sodium oxide molar ratio of about 25:1, a sodium oxide to silica molar ratio of about 2.4:1 and a silica to alumina molar ratio of about 3.0:1. The resulting product was zeolite A which exhibited a calcium ion exchange capacity of 274 mg calcium carbonate/g zeolite and a magnesium ion exchange capacity of 136 mg magnesium carbonate/g zeolite. The resulting zeolite particles exhibit a narrow differential weight percent gaussian distribution with an average particle size of 1.25 microns with at least 90% of the weight between 0.1 and 2.5 microns. The cumulative percent population exhibits 67% less than one micron, with no more than 1 percent greater than 2.0 microns.

EXAMPLE FOUR

A sodium silicate solution of composition 3.0% sodium oxide and 7.2% silica was heated to 50 degrees Celsius. Sodium aluminate solution, also at 50 degrees Celsius, of composition 24.6% sodium oxide and 8.1% alumina was added to the sodium silicate so that all of the sodium aluminate solution was added within thirty seconds. The resulting gel was broken down by agitation until a homogeneous slurry was obtained. The batch was then reacted at 60 degees Celsius for seven and one half hours. The total batch composition had a water to sodium oxide molar ratio of about 25:1, a sodium oxide to silica molar ratio of about 2.4:1 and a silica to alumina molar ratio of about 2.5:1. The resulting product was zeolite A which exhibited a calcium ion exchange capacity of 283 mg calcium carbonate/g zeolite and a magnesium ion exchange capacity of 145 mg magnesium carbonate/g zeolite. The resulting zeolite particles exhibit a narrow differential weight percent gaussian distribution with an average particle size of 0.86 microns with at least 90% of the weight between 0.1 and 1.6 microns. The cumulative percent population exhibits 92% less than one micron, with no more than 1 percent greater than 2.0 microns.

EXAMPLE FIVE

A sodium silicate solution of composition 3.1% sodium oxide and 7.6% silica was heated to 50 degrees Celsius. Sodium aluminate solution, also at 50 degrees Celsius, of composition 22.5% sodium oxide and 9.3% alumina was added to the sodium silicate so that all of the sodium aluminate solution was added with thirty seconds. The resulting gel was broken down by agitation until a homogeneous slurry was obtained. The batch was then reacted at 60 degrees Celsius for six hours. The total batch composition had a water to sodium oxide molar ratio of about 25:1, a sodium oxide to silica molar ratio of about 2.4:1 and a silica to alumina molar ratio of about 2.0:1. The resulting product was zeolite A which exhibited a calcium ion exchange capacity of 300 mg calcium carbonate/g zeolite and a magnesium ion exchange capacity of 141 mg magnesium carbonate/g zeolite. The resulting zeolite particles exhibit a narrow differential weight percent gaussian distribution with an average particle size of 1.4 microns with at least 90% of the weight between 0.1 and 2.5 microns. The cumulative percent population exhibits 58% less than one micron, with no more than 2 percent greater than 2.5 microns.

EXAMPLE SIX

A sodium silicate solution of composition 3.1% sodium oxide and 7.6% silica was heated to 70 degrees Celsius. Sodium aluminate solution, also at 70 degrees Celsius, of composition 22.5% sodium oxide and 9.3% alumina was added to the sodium silicate so that all of the sodium aluminate solution was added within thirty seconds. The resulting gel was broken down by agitation until a homogeneous slurry was obtained. The batch was then reacted at 80 degrees Celsius for two and one half hours. The total batch composition had a water to sodium oxide molar ratio of about 25:1, a sodium oxide to silica molar ratio of about 2.4:1 and a silica to alumina molar ratio of about 2.0:1. The resulting product was zeolite A which exhibited a calcium ion exchange capacity of 273 mg calcium carbonate/g zeolite and a magnesium ion exchange capacity of 124 mg magnesium carbonate/g zeolite. The resulting zeolite particles exhibit a narrow differential weight percent gaussian distribution with an average particle size of 2.1 microns with at least 90% of the weight between 0.1 and 4.0 microns. The cumulative percent population exhibits 35% less than one micron, with no more than 5 percent greater than 2.5 microns.

EXAMPLE SEVEN

A sodium silicate solution of composition 3.6% sodium oxide and 8.8% silica was heated to 50 degrees Celsius. Sodium aluminate solution, also at 50 degrees Celsius, of composition 22.5% sodium oxide and 9.3% alumina was added to the sodium silicate so that all of the sodium aluminate solution was added within thirty seconds. The resulting gel was broken down by agitation until a homogeneous slurry was obtained. The batch was then reacted at 60 degrees Celsius for six and one half hours. The total batch composition had a water to sodium oxide molar ratio of about 25:1, a sodium oxide to silica molar ratio of about 2.0:1 and a silica to alumina molar ratio of about 2.5:1. The resulting product was zeolite A which exhibited a calcium ion exchange capacity of 322 mg calcium carbonate/g zeolite and a magnesium ion exchange capacity of 133 mg magnesium carbonate/g zeolite. The resulting zeolite particles exhibit a narrow differential weight percent gaussian distribution with an average particle size of 1.1 microns with at least 90% of the weight between 0.1 and 2.5 microns. The cumulative percent population exhibits 86% less than one micron, with no more than 1 percent greater than 1.6 microns.

EXAMPLE EIGHT

A sodium silicate solution of composition 3.8% sodium oxide and 9.2% silica was heated to 50 degrees Celsius. Sodium aluminate solution, also at 50 degrees Celsius, of composition 20.4% sodium oxide and 10.5% alumina was added to the sodium silicate so that all of the sodium aluminate solution was added within thirty seconds. The resulting gel was broken down by agitation until a homogeneous slurry was obtained. The batch was then reacted at 60 degrees Celsius for six and one half hours. The total batch composition had a water to sodium oxide molar ratio of about 25:1, a sodium oxide to silica molar ratio of about 2.0:1 and a silica to alumina molar ratio of about 2.0:1. The resulting product was zeolite A which exhibited a calcium ion exchange capacity of 304 mg calcium carbonate/g zeolite and a magnesium ion exchange capacity of 136 mg magnesium carbonate/g zeolite. The resulting zeolite particles exhibit a narrow differential weight percent gaussian distribution with an average particle size of 1.5 microns with at least 90% of the weight between 0.1 and 2.5 microns. The cumulative percent population exhibits 58% less than one micron, with no more than 1 percent greater than 2.5 microns.

EXAMPLE NINE

A sodium silicate solution of composition 3.8% sodium oxide and 9.2% silica was heated to 70 degrees Celsius. Sodium aluminate solution, also at 70 degrees Celsius, of composition 20.4% sodium oxide and 10.5% alumina was added to the sodium silicate so that all of the sodium aluminate solution was added within thirty seconds. The resulting gel was broken down by agitation until a homogeneous slurry was obtained. The batch was then reacted at 80 degrees Celcsius for two and one half hours. The total batch composition had a water to sodium oxide molar ratio of about 25:1, a sodium oxide to silica molar ratio of about 2.0:1 and a silica to alumina molar ratio of about 2.0:1. The resulting product was zeolite A which exhibited a calcium ion exchange capacity of 278 mg calcium carbonate/g zeolite and a magnesium ion exchange capacity of 105 mg magnesium carbonate/g zeolite. The resulting zeolite particles exhibit a narrow differential weight percent gaussian distribution with an average particle size of 2.4 microns with at least 90% of the weight between 0.1 and 5.0 microns. The cumulative percent population exhibits 61% less than one micron, with no more than 1 percent greater than 3.2 microns.

EXAMPLE TEN

A sodium silicate solution of composition 3.2% sodium oxide and 7.8% silica was heated to 50 degrees Celsius. Sodium aluminate solution, also at 50 degrees Celsius, of composition 26.9% sodium oxide and 6.8% alumina was added to the sodium silicate so that all of the sodium aluminate solution was added within thirty seconds. The resulting gel was broken down by agitation until a homogeneous slurry was obtained. The batch was then reacted at 60 degrees Celsius for four hours. The total batch composition had a water to sodium oxide molar ratio of about 20:1, a sodium oxide to silica molar ratio of about 3.0:1 and a silica to alumina molar ratio of about 2.5:1. The resulting product was zeolite A which exhibited a calcium ion exchange capacity of 295 mg calcium carbonate/g zeolite and a magnesium ion exchange capacity of 162 mg magnesium carbonate/g zeolite. The resulting zeolite particles exhibit a narrow differential weight percent gaussian distribution with an average particle size of 0.90 microns with at least 90% of the weight between 0.1 and 2.0 microns. The cumulative percent population exhibits 92% less than one micron, with no more than 1 percent greater than 1.6 microns.

EXAMPLE ELEVEN

A sodium silicate solution of composition 3.2% sodium oxide and 7.8% silica was heated to 70 degrees Celsius. Sodium aluminate solution, also at 70 degrees Celsius, of composition 26.9% sodium oxide and 6.8% alumina was added to the sodium silicate so that all of the sodium aluminate solution was added within thirty seconds. The resulting gel was broken down by agitation until a homogeneous slurry was obtained. The batch was then reacted at 80 degrees Celsius for one and one half hours. The total batch composition had a water to sodium oxide molar ratio of about 20:1, a sodium oxide to silica molar ratio of about 3.0:1 and a silica to alumina molar ratio of about 2.5:1. The resulting product was zeolite A which exhibited a calcium ion exchange capacity of 293 mg calcium carbonate/g zeolite and a magnesium ion exchange capacity of 163 mg magnesium carbonate/g zeolite. The resulting zeolite particles exhibit a narrow differential weight percent gaussian distribution with an average particle size of 1.3 microns with at least 90% of the weight between 0.1 and 3.2 microns. The cumulative percent population exhibits 68% less than one micron, with no more than 1 percent greater than 2.0 microns.

EXAMPLE TWELVE

A sodium silicate solution of composition 3.2% sodium oxide and 7.8% silica was heated to 90 degrees Celsius. Sodium aluminate solution, also at 90 degrees Celsius, of composition 26.9% sodium oxide and 6.8% alumina was added to the sodium silicate so that all of the sodium aluminate solution was added within thirty seconds. The resulting gel was broken down by agitation until a homogeneous slurry was obtained. The batch was then reacted at 100 degrees Celsius for one half hour. The total batch composition had a water to sodium oxide molar ratio of about 20:1, a sodium oxide to silica molar ratio of about 3.0:1 and a silica to alumina molar ratio of about 2.5:1. The resulting product was zeolite A which exhibited a calcium ion exchange capacity of 295 mg calcium carbonate/g zeolite and a magnesium ion exchange capacity of 107 mg magnesium carbonate/g zeolite. The resulting zeolite particles exhibit a narrow differential weight percent gaussian distribution with an average particle size of 1.4 microns with at least 90% of the weight between 0.1 and 2.5 microns. The cumulative percent population exhibits 56% less than one micron, with no more than 1 percent greater than 2.5 microns.

EXAMPLE THIRTEEN

A sodium silicate solution of composition 3.5% sodium oxide and 8.4% silica was heated to 50 degrees Celsius. Sodium aluminate solution, also at 50 degrees Celsius, of composition 26.2% sodium oxide and 7.2% alumina was added to the sodium silicate so that all of the sodium aluminate solution was added within thirty seconds. The resulting gel was broken down by agitation until a homogeneous slurry was obtained. The batch was then reacted at 60 degrees Celsius for four hours. The total batch composition had a water to sodium oxide molar ratio of about 20:1, a sodium oxide to silica molar ratio of about 2.8:1 and a silica to alumina molar ratio of about 2.5:1. The resulting product was zeolite A which exhibited a calcium ion exchange capacity of 291 mg calcium carbonate/g zeolite and a magnesium ion exchange capacity of 158 mg magnesium carbonate/g zeolite. The resulting zeolite particles exhibit a narrow differential weight percent gaussian distribution with an average particle size of 0.93 microns with at least 90% of the weight between 0.1 and 2.5 microns. The cumulative percent population exhibits 92% less than one micron, with no more than 1 percent greater than 1.6 microns.

EXAMPLE FOURTEEN

A sodium silicate solution of composition 3.5% sodium oxide and 8.4% silica was heated to 70 degrees Celsius. Sodium aluminate solution, also at 70 degrees Celsius, of composition 26.2% sodium oxide and 7.2% alumina was added to the sodium silicate so that all of the sodium aluminate solution was added within thirty seconds. The resulting gel was broken down by agitation until a homogeneous slurry was obtained. The batch was then reacted at 80 degrees Celsius for two hours. The total batch composition had a water to sodium oxide molar ratio of about 20:1, a sodium oxide to silica molar ratio of about 2.8:1 and a silica to alumina molar ratio of about 2.5:1. The resulting product was zeolite A which exhibited a calcium ion exchange capacity of 293 mg calcium carbonate/g zeolite and a magnesium ion exchange capacity of 156 mg magnesium carbonate/g zeolite. The resulting zeolite particles exhibit a narrow differential weight percent gaussian distribution with an average particle size of 1.2 microns with at least 90% of the weight between 0.1 and 2.5 microns. The cumulative percent population exhibits 73% less than one micron, with no more than 1 percent greater than 2.0 microns.

EXAMPLE FIFTEEN

A sodium silicate solution of composition 3.5% sodium oxide and 8.4% silica was heated to 90 degrees Celsius. Sodium aluminate solution, also at 90 degrees Celsius, of composition 26.2% sodium oxide and 7.2% alumina was added to the sodium silicate so that all of the sodium aluminate solution was added within thirty seconds. The resulting gel was broken down by agitation until a homogeneous slurry was obtained. The batch was then reacted at 100 degrees Celsius for one half hour. The total batch composition had a water to sodium oxide molar ratio of about 20:1, a sodium oxide to silica molar ratio of about 2.8:1 and a silica to alumina molar ratio of about 2.5:1. The resulting product was zeolite A which exhibited a calcium ion exchange capacity of 287 mg calcium carbonate/g zeolite and a magnesium ion exchange capacity of 117 mg magnesium carbonate/g zeolite. The resulting zeolite particles exhibit a narrow differential weight percent gaussian distribution with an average particle size of 1.5 microns with at least 90% of the weight between 0.1 and 3.2 microns. The cumulative percent population exhibits 55% less than one micron, with no more than 1 percent greater than 2.5 microns.

EXAMPLE SIXTEEN

A sodium silicate solution of composition 3.7% sodium oxide and 9.1% silica was heated to 50 degrees Celsius. Sodium aluminate solution, also at 50 degrees Celsius, of composition 25.4% sodium oxide and 7.6% alumina was added to the sodium silicate so that all of the sodium aluminate solution was added within thirty seconds. The resulting gel was broken down by agitation until a homogeneous slurry was obtained. The batch was then reacted at 60 degrees Celsius for three hours. The total batch composition had a water to sodium oxide molar ratio of about 20:1, a sodium oxide to silica molar ratio of about 2.6:1 and a silica to alumina molar ratio of about 2.5:1. The resulting product was zeolite A which exhibited a calcium ion exchange capacity of 288 mg calcium carbonate/g zeolite and a magnesium ion exchange capacity of 154 mg magnesium carbonate/g zeolite. The resulting zeolite particles exhibit a narrow differential weight percent gaussian distribution with an average particle size of 0.90 microns with at least 90% of the weight between 0.1 and 2.5 microns. The cumulative percent population exhibits 93% less than one micron, with no more than 1 percent greater than 1.6 microns.

EXAMPLE SEVENTEEN

A sodium silicate solution of composition 3.7% sodium oxide and 9.1% silica was heated to 70 degrees Celsius. Sodium aluminate solution, also at 70 degrees Celsius, of composition 25.4% sodium oxide and 7.6% alumina was added to the sodium silicate so that all of the sodium aluminate solution was added within thirty seconds. The resulting gel was broken down by agitation until a homogeneous slurry was obtained. The batch was then reacted at 80 degrees Celsius for two hours. The total batch composition had a water to sodium oxide molar ratio of about 20:1, a sodium oxide to silica molar ratio of about 2.6:1 and a silica to alumina molar ratio of about 2.5:1. The resulting product was zeolite A which exhibited a calcium ion exchange capacity of 300 mg calcium carbonate/g zeolite and a magnesium ion exchange capacity of 154 mg magnesium carbonate/g zeolite. The resulting zeolite particles exhibit a narrow differential weight percent gaussian distribution with an average particle size of 1.4 microns with at least 90% of the weight between 0.1 and 3.2 microns. The cumulative percent population exhibits 64% less than one micron, with no more than 1 percent greater than 2.0 microns.

EXAMPLE EIGHTEEN

A sodium silicate solution of composition 3.7% sodium oxide and 9.1% silica was heated to 90 degrees Celsius. Sodium aluminate solution, also at 90 degrees Celsius, of composition 25.4% sodium oxide and 7.6% alumina was added to the sodium silicate so that all of the sodium aluminate solution was added within thirty seconds. The resulting gel was broken down by agitation until a homogeneous slurry was obtained. The batch was then reacted at 100 degrees Celsius for one half hour. The total batch composition had a water to sodium oxide molar ratio of about 20:1, a sodium oxide to silica molar ratio of about 2.6:1 and a silica to alumina molar ratio of about 2.5:1. The resulting product was zeolite A which exhibited a calcium ion exchange capacity of 278 mg calcium carbonate/g zeolite and a magnesium ion exchange capacity of 118 mg magnesium carbonate/g zeolite. The resulting zeolite particles exhibit a narrow differential weight percent gaussian distribution with an average particle size of 1.5 microns with at least 90% of the weight between 0.1 and 3.2 microns. The cumulative percent population exhibits 53% less than one micron, with no more than 1 percent greater than 2.5 microns.

EXAMPLE NINETEEN

A sodium silicate solution of composition 3.9% sodium oxide and 9.5% silica was heated to 90 degrees Celsius. Sodium aluminate solution, also at 90 degrees Celsius, of composition 29.8% sodium oxide and 5.1% alumina was added to the sodium silicate so that all of the sodium aluminate solution was added within thirty seconds. The resulting gel was broken down by agitation until a homogeneous slurry was obtained. The batch was then reacted at 100 degrees Celsius for one half hour. The total batch composition had a water to sodium oxide molar ratio of about 20:1, a sodium oxide to silica molar ratio of about 2.2:1 and a silica to alumina molar ratio of about 5.3:1. The resulting product was zeolite A which exhibited a calcium ion exchange capacity of 270 mg calcium carbonate/g zeolite and a magnesium ion exchange capacity of 163 mg magnesium carbonate/g zeolite. The resulting zeolite particles exhibit a narrow differential weight percent gaussian distribution with an average particle size of 0.7 microns with at least 90% of the weight between 0.1 and 1.6 microns. The cumulative percent population exhibits 98% less than one micron, with no more than 1 percent greater than 1.3 microns.

EXAMPLE TWENTY

A sodium silicate solution of composition 4.9% sodium oxide and 11.8% silica was heated to 50 degrees Celsius. Sodium aluminate solution, also at 50 degrees Celsius, of composition 17.6% sodium oxide and 12.1% alumina was added to the sodium silicate so that all of the sodium aluminate solution was added within thirty seconds. The resulting gel was broken down by agitation until a homogeneous slurry was obtained. The batch was then reacted at 60 degrees Celsius for eight hours. The total batch composition had a water to sodium oxide molar ratio of about 25:1, a sodium oxide to silica molar ratio of about 1.6:1 and a silica to alumina molar ratio of about 2.0:1. The resulting product was zeolite A which exhibited a calcium ion exchange capacity of 283 mg calcium carbonate/g zeolite and a magnesium ion exchange capacity of 127 mg magnesium carbonate/g zeolite. The resulting zeolite particles exhibit a narrow differential weight percent gaussian distribution with an average particle size of 2.0 microns with at least 90% of the weight between 0.1 and 4.0 microns. The cumulative percent population exhibits 39% less than one micron, with no more than 1 percent greater than 3.2 microns.

EXAMPLE TWENTY ONE

A sodium silicate solution of composition 3.9% sodium oxide and 9.5% silica was heated to 50 degrees Celsius. Sodium aluminate solution, also at 50 degrees Celsius, of composition 26.2% sodium oxide and 7.2% alumina was added to the sodium silicate so that all of the sodium aluminate solution was added within thirty seconds. The resulting gel was broken down by agitation until a homogeneous slurry was obtained. The batch was then reacted at 60 degrees Celsius for three and one half hours. The total batch composition had a water to sodium oxide molar ratio of about 20:1, a sodium oxide to silica molar ratio of about 2.4:1 and a silica to alumina molar ratio of about 3.0:1. The resulting product was zeolite A which exhibited a calcium ion exchange capacity of 280 mg calcium carbonate/g zeolite and a magnesium ion exchange capacity of 137 mg magnesium carbonate/g zeolite. The resulting zeolite particles exhibit a narrow differential weight percent gaussian distribution with an average particle size of 1.1 microns with at least 90% of the weight between 0.1 and 2.5 microns. The cumulative percent population exhibits 97% less than one micron, with no more than 1 percent greater than 1.6 microns.

EXAMPLE TWENTY TWO

A sodium silicate solution of composition 3.9% sodium oxide and 9.5% silica was heated to 70 degrees Celsius. Sodium aluminate solution, also at 70 degrees Celsius, of composition 26.2% sodium oxide and 7.2% alumina was added to the sodium silicate so that all of the sodium aluminate solution was added within thirty seconds. The resulting gel was broken down by agitation until a homogeneous slurry was obtained. The batch was then reacted at 80 degrees Celsius for two hours. The total batch composition had a water to sodium oxide molar ratio of about 20:1, a sodium oxide to silica molar ratio of about 2.4:1 and a silica to alumina molar ratio of about 3.0:1. The resulting product was zeolite A which exhibited a calcium ion exchange capacity of 335 mg calcium carbonate/g zeolite and a magnesium ion exchange capacity of 131 mg magnesium carbonate/g zeolite. The resulting zeolite particles exhibit a narrow differential weight percent gaussian distribution with an average particle size of 0.8 microns with at least 90% of the weight between 0.1 and 1.6 microns. The cumulative percent population exhibits 95% less than one micron, with no more than 1 percent greater than 1.6 microns.

EXAMPLE TWENTY THREE

A sodium silicate solution of composition 4.0% sodium oxide and 9.7% silica was heated to 90 degrees Celsius. Sodium aluminate solution, also at 90 degrees Celsius, of composition 28.2% sodium oxide and 6.0% alumina was added to the sodium silicate so that all of the sodium aluminate solution was added within thirty seconds. The resulting gel was broken down by agitation until a homogeneous slurry was obtained. The batch was then reacted at 100 degrees Celsius for one hour. The total batch composition had a water to sodium oxide molar ratio of about 20:1, a sodium oxide to silica molar ratio of about 2.2:1 and a silica to alumina molar ratio of about 4.3:1. The resulting product was zeolite A which exhibited a calcium ion exchange capacity of 249 mg calcium carbonate/g zeolite and a magnesium ion exchange capacity of 159 mg magnesium carbonate/g zeolite. The resulting zeolite particles exhibit a narrow differential weight percent gaussian distribution with an average particle size of 0.84 microns with at least 90% of the weight between 0.1 and 2.0 microns. The cumulative percent population exhibits 94% less than one micron, with no more than 1 percent greater than 1.3 microns.

EXAMPLE TWENTY FOUR

A sodium silicate solution of composition 4.1% sodium oxide and 10.0% silica was heated to 90 degrees Celsius. Sodium aluminate solution, also at 90 degrees Celsius, of composition 31.1% sodium oxide and 4.4% alumina was added to the sodium silicate so that all of the sodium aluminate solution was added within thirty seconds. The resulting gel was broken down by agitation until a homogeneous slurry was obtained. The batch was then reacted at 100 degrees Celsius for two hours. The total batch composition had a water to sodium oxide molar ratio of about 20:1, a sodium oxide to silica molar ratio of about 2.0:1 and a silica to alumina molar ratio of about 7.3:1. The resulting product was zeolite A which exhibited a calcium ion exchange capacity of 273 mg calcium carbonate/g zeolite and a magnesium ion exchange capacity of 148 mg magnesium carbonate/g zeolite. The resulting zeolite particles exhibit a narrow differential weight percent gaussian distribution with an average particle size of 0.95 microns with at least 90% of the weight between 0.1 and 2.0 microns. The cumulative percent population exhibits 96% less than one micron, with no more than 1 percent greater than 1.3 microns.

EXAMPLE TWENTY FIVE

A sodium silicate solution of composition 4.1% sodium oxide and 10.0% silica was heated to 90 degrees Celsius. Sodium aluminate solution, also at 90 degrees Celsius, of composition 31.1% sodium oxide and 4.4% alumina was added to the sodium silicate so that all of the sodium aluminate solution was added within thirty seconds. The resulting gel was broken down by agitation until a homogeneous slurry was obtained. The batch was then reacted at 100 degrees Celsius for one hour. The total batch composition had a water to sodium oxide molar ratio of about 20:1, a sodium oxide to silica molar ratio of about 2.0:1 and a silica to alumina molar ratio of about 7.3:1. The resulting product was zeolite A which exhibited a calcium ion exchange capacity of 262 mg calcium carbonate/g zeolite and a magnesium ion exchange capacity of 147 mg magnesium carbonate/g zeolite. The resulting zeolite particles exhibit a narrow differential weight percent gaussian distribution with an average particle size of 1.0 microns with at least 90% of the weight between 0.1 and 2.0 microns. The cumulative percent population exhibits 96% less than one micron, with no more than 1 percent greater than 1.3 microns.

EXAMPLE TWENTY SIX

A sodium silicate solution of composition 4.1% sodium oxide and 10.0% silica was heated to 90 degrees Celsius. Sodium aluminate solution, also at 90 degrees Celsius, of composition 30.2% sodium oxide and 4.9% alumina was added to the sodium silicate so that all of the sodium aluminate solution was added within thirty seconds. The resulting gel was broken down by agitation until a homogeneous slurry was obtained. The batch was then reacted at 100 degrees Celsius for one hour. The total batch composition had a water to sodium oxide molar ratio of about 20.1, a sodium oxide to silica molar ratio of about 2.0:1 and a silica to alumina molar ratio of about 6.3:1. The resulting product was zeolite A which exhibited a calcium ion exchange capacity of 252 mg calcium carbonate/g zeolite and a magnesium ion exchange capacity of 147 mg magnesium carbonate/g zeolite. The resulting zeolite particles exhibit a narrow differential weight percent gaussian distribution with an average particle size of 0.7 microns with at least 90% of the weight between 0.1 and 2.0 microns. The cumulative percent population exhibits 98% less than one micron, with no more than 1 percent greater than 1.3 microns.

EXAMPLE TWENTY SEVEN

A sodium silicate solution of composition 4.1% sodium oxide and 9.8% silica was heated to 50 degrees Celsius. Sodium aluminate solution, also at 50 degrees Celsius, of composition 24.6% sodium oxide and 8.1% alumina was added to the sodium silicate so that all of the sodium aluminate solution was added within thirty seconds. The resulting gel was broken down by agitation until a homogeneous slurry was obtained. The batch was then reacted at 60 degrees Celsius for four hours. The total batch composition had a water to sodium oxide molar ratio of about 20:1, a sodium oxide to silica molar ratio of about 2.4:1 and a silica to alumina molar ratio of about 2.5:1. The resulting product was zeolite A which exhibited a calcium ion exchange capacity of 282 mg calcium carbonate/g zeolite and a magnesium ion exchange capacity of 153 mg magnesium carbonate/g zeolite. The resulting zeolite particles exhibit a narrow differential weight percent gaussian distribution with an average particle size of 0.80 microns with at least 90% of the weight between 0.1 and 2.0 microns. The cumulative percent population exhibits 96% less than one micron, with no more than 1 percent greater than 1.25 microns.

EXAMPLE TWENTY EIGHT

A sodium silicate solution of composition 4.1% sodium oxide and 9.8% silica was heated to 70 degrees Celsius. Sodium aluminate solution, also at 70 degrees Celsius, of composition 24.6% sodium oxide and 8.1% alumina was added to the sodium silicate so that all of the sodium aluminate solution was added within thirty seconds. The resulting gel was broken down by agitation until a homogeneous slurry was obtained. The batch was then reacted at 80 degrees Celsius for one and one half hours. The total batch composition had a water to sodium oxide molar ratio of about 20:1, a sodium oxide to silica molar ratio of about 2.4:1 and a silica to alumina molar ratio of about 2.5:1. The resulting product was zeolite A which exhibited a calcium ion exchange capacity of 295 mg calcium carbonate/g zeolite and a magnesium ion exchange capacity of 150 mg magnesium carbonate/g zeolite. The resulting zeolite particles exhibit a narrow differential weight percent gaussian distribution with an average particle size of 1.3 microns with at least 90% of the weight between 0.1 and 2.5 microns. The cumulative percent population exhibits 71% less than one micron, with no more than 1 percent greater than 2.0 microns.

EXAMPLE TWENTY NINE

A sodium silicate solution of composition 4.1% sodium oxide and 9.8% silica was heated to 90 degrees Celsius. Sodium aluminate solution, also at 90 degrees Celsius, of composition 24.6% sodium oxide and 8.1% alumina was added to the sodium silicate so that all of the sodium aluminate solution was added within thirty seconds. The resulting gel was broken down by agitation until a homogeneous slurry was obtained. The batch was then reacted at 60 degrees Celsius for two and one half hours. The total batch composition had a water to sodium oxide molar ratio of about 20:1, a sodium oxide to silica molar ratio of about 2.4:1 and a silica to alumina molar ratio of about 2.5:1. The resulting product was zeolite A which exhibited a calcium ion exchange capacity of 299 mg calcium carbonate/g zeolite and a magnesium ion exchange capacity of 145 mg magnesium carbonate/g zeolite. The resulting zeolite particles exhibit a narrow differential weight percent gaussian distribution with an average particle size of 1.0 microns with at least 90% of the weight between 0.1 and 2.5 microns. The cumulative percent population exhibits 88% less than one micron, with no more than 1 percent greater than 1.6 microns.

EXAMPLE THIRTY

A sodium silicate solution of composition 4.1% sodium oxide and 9.8% silica was heated to 90 degrees Celsius. Sodium aluminate solution, also at 90 degrees Celsius, of composition 24.6% sodium oxide and 8.1% alumina was added to the sodium silicate so that all of the sodium aluminate solution was added within thirty seconds. The resulting gel was broken down by agitation until a homogeneous slurry was obtained. The batch was then reacted at 100 degrees Celsius for one half hour. The total batch composition had a water to sodium oxide molar ratio of about 20:1, a sodium oxide to silica molar ratio of about 2.4:1 and a silica to alumina molar ratio of about 2.5:1. The resulting product was zeolite A which exhibited a calcium ion exchange capacity of 284 mg calcium carbonate/g zeolite and a magnesium ion exchange capacity of 123 mg magnesium carbonate/g zeolite. The resulting zeolite particles exhibit a narrow differential weight percent gaussian distribution with an average particle size of 1.5 microns with at least 90% of the weight between 0.1 and 3.2 microns. The cumulative percent population exhibits 55% less than one micron, with no more than 1 percent greater than 2.5 microns.

EXAMPLE THIRTY ONE

A sodium silicate solution of composition 4.3% sodium oxide and 10.3% silica was heated to 90 degrees Celsius. Sodium aluminate solution, also at 90 degrees Celsius, of composition 28.9% sodium oxide and 5.6% alumina was added to the sodium silicate so that all of the sodium aluminate solution was added within thirty seconds. The resulting gel was broken down by agitation until a homogeneous slurry was obtained. The batch was then reacted at 100 degrees Celsius for one hour. The total batch composition had a water to sodium oxide molar ratio of about 20:1, a sodium oxide to silica molar ratio of about 2.0:1 and a silica to alumina molar ratio of about 5.3:1. The resulting product was zeolite A which exhibited a calcium ion exchange capacity of 249 mg calcium carbonate/g zeolite and a magnesium ion exchange capacity of 145 mg magnesium carbonate/g zeolite. The resulting zeolite particles exhibit a narrow differential weight percent gaussian distribution with an average particle size of 0.75 microns with at least 90% of the weight between 0.1 and 2.0 microns. The cumulative percent population exhibits 97% less than one micron, with no more than 1 percent greater than 1.3 microns.

EXAMPLE THIRTY TWO

A sodium silicate solution of composition 4.3% sodium oxide and 10.5% silica was heated to 90 degrees Celsius. Sodium aluminate solution, also at 90 degrees Celsius, of composition 30.7% sodium oxide and 4.6% alumina was added to the sodium silicate so that all of the sodium aluminate solution was added within thirty seconds. The resulting gel was broken down by agitation until a homogeneous slurry was obtained. The batch was then reacted at 100 degrees Celsius for one hour. The total batch composition had a water to sodium oxide molar ratio of about 20:1, a sodium oxide to silica molar ratio of about 1.9:1 and a silica to alumina molar ratio of about 7.3:1. The resulting product was zeolite A which exhibited a calcium ion exchange capacity of 260 mg calcium carbonate/g zeolite and a magnesium ion exchange capacity of 149 mg magnesium carbonate/g zeolite. The resulting zeolite particles exhibit a narrow differential weight percent gaussian distribution with an average particle size of 0.86 microns with at least 90% of the weight between 0.1 and 2.0 microns. The cumulative percent population exhibits 96% less than one micron, with no more than 1 percent greater than 1.3 microns.

EXAMPLE THIRTY THREE

A sodium silicate solution of composition 4.4% sodium oxide and 10.6% silica was heated to 90 degrees Celsius. Sodium aluminate solution, also at 90 degrees Celsius, of composition 27.3% sodium oxide and 6.5% alumina was added to the sodium silicate so that all of the sodium aluminate solution was added within thirty seconds. The resulting gel was broken down by agitation until a homogeneous slurry was obtained. The batch was then reacted at 100 degrees Celsius for one hour. The total batch composition had a water to sodium oxide molar ratio of about 20:1, a sodium oxide to silica molar ratio of about 2.0:1 and a silica to alumina molar ratio of about 4.3:1. The resulting product was zeolite A which exhibited a calcium ion exchange capacity of 290 mg calcium carbonate/g zeolite and a magnesium ion exchange capacity of 142 mg magnesium carbonate/g zeolite. The resulting zeolite particles exhibit a narrow differential weight percent gaussian distribution with an average particle size of 0.93 microns with at least 90% of the weight between 0.1 and 2.0 microns. The cumulative percent population exhibits 97% less than one micron, with no more than 1 percent greater than 1.25 microns.

EXAMPLE THIRTY FOUR

A sodium silicate solution of composition 4.3% sodium oxide and 10.4% silica was heated to 50 degrees Celsius. Sodium aluminate solution, also at 50 degrees Celsius, of composition 22.5% sodium oxide and 9.3% alumina was added to the sodium silicate so that all of the sodium aluminate solution was added within thirty seconds. The resulting gel was broken down by agitation until a homogeneous slurry was obtained. The batch was then reacted at 60 degrees Celsius for three and one half hours. The total batch composition had a water to sodium oxide molar ratio of about 20:1, a sodium oxide to silica molar ratio of about 2.4:1 and a silica to alumina molar ratio of about 2.0:1. The resulting product was zeolite A which exhibited a calcium ion exchange capacity of 327 mg calcium carbonate/g zeolite and a magnesium ion exchange capacity of 155 mg magnesium carbonate/g zeolite. The resulting zeolite particles exhibit a narrow differential weight percent gaussian distribution with an average particle size of 1.1 microns with at least 90% of the weight between 0.1 and 2.0 microns. The cumulative percent population exhibits 83% less than one micron, with no more than 1 percent greater than 2.0 microns.

EXAMPLE THIRTY FIVE

A sodium silicate solution of composition 4.3% sodium oxide and 10.4% silica was heated to 70 degrees Celsius. Sodium aluminate solution, also at 70 degrees Celsius, of composition 22.5% sodium oxide and 9.3% alumina was added to the sodium silicate so that all of the sodium aluminate solution was acded within thirty seconds. The resulting gel was broken down by agitation until a homogeneous slurry was obtained. The batch was then reacted at 80 degrees Celsius for one hour. the total batch composition had a water to sodium oxide molar ratio of about 20:1, a sodium oxide to silica molar ratio of about 2.4:1 and a silica to alumina molar ratio of about 2.0:1. The resulting product was zeolite A which exhibited a calcium ion exchange capacity of 293 mg calcium carbonate/g zeolite and a magnesium ion exchange capacity of 125 mg magnesium carbonate/g zeolite. The resulting zeolite particles exhibit a narrow differential weight percent gaussian distribution with an average particle size of 1.7 microns with at least 90% of the weight between 0.1 and 4.0 microns. The cumulative percent population exhibits 46% less than one micron, with no more than 1 percent greater than 2.5 microns.

EXAMPLE THIRTY SIX

A sodium silicate solution of composition 4.5% sodium oxide and 11.0% silica was heated to 90 degrees Celsius. Sodium aluminate solution, also at 90 degrees Celsius, of composition 30.2% sodium oxide and 4.9% alumina was added to the sodium silicate so that all of the sodium aluminate solution was added within thirty seconds. The resulting gel was broken down by agitation until a homogeneous slurry was obtained. The batch was then reacted at 100 degrees Celsius for one hour. The total batch composition had a water to sodium oxide molar ratio of about 20:1, a sodium oxide to silica molar ratio of about 1.8:1 and a silica to alumina molar ratio of about 7.3:1. The resulting product was zeolite A which exhibited a calcium ion exchange capacity of 261 mg calcium carbonate/g zeolite and a magnesium ion exchange capacity of 146 mg magnesium carbonate/g zeolite. The resulting zeolite particles exhibit a narrow differential weight percent gaussian distribution with an average particle size of 0.88 microns with at least 90% of the weight between 0.1 and 2.0 microns. The cumulative percent population exhibits 96% less than one micron, with no more than 1 percent greater than 1.3 microns.

EXAMPLE THIRTY SEVEN

A sodium silicate solution of composition 4.5% sodium oxide and 10.8% silica was heated to 70 degrees Celsius. Sodium aluminate solution, also at 70 degrees Celsius, of composition 23.6% sodium oxide and 8.6% alumina was added to the sodium silicate so that all of the sodium aluminate solution was added within thirty seconds. The resulting gel was broken down by agitation until a homogeneous slurry was obtained. The batch was then reacted at 80 degrees Celsius for one and one half hours. The total batch composition had a water to sodium oxide molar ratio of about 20:1, a sodium oxide to silica molar ratio of about 2.2:1 and a silica to alumina molar ratio of about 2.5:1. The resulting product was zeolite A which exhibited a calcium ion exchange capacity of 289 mg calcium carbonate/g zeolite and a magnesium ion exchange capacity of 152 mg magnesium carbonate/g zeolite. The resulting zeolite particles exhibit a narrow differential weight percent gaussian distribution with an average particle size of 1.4 microns with at least 90% of the weight between 0.1 and 3.2 microns. The cumulative percent population exhibits 73% less than one micron, with no more than 1 percent greater than 2.0 microns.

EXAMPLE THIRTY EIGHT

A sodium silicate solution of composition 4.5% sodium oxide and 10.8% silica was heated to 50 degrees Celsius. Sodium aluminate solution, also at 50 degrees Celsius, of composition 23.6% sodium oxide and 8.6% alumina was added to the sodium silicate so that all of the sodium aluminate solution was added within thirty seconds. The resulting gel was broken down by agitation until a homogeneous slurry was obtained. The batch was then reacted at 60 degrees Celsius for four hours. The total batch composition had a water to sodium oxide molar ratio of about 20:1, a sodium oxide to silica molar ratio of about 2.2:1 and a silica to alumina molar ratio of about 2.5:1. The resulting product was zeolite A which exhibited a calcium ion exchange capacity of 285 mg calcium carbonate/g zeolite and a magnesium ion exchange capacity of 149 mg magnesium carbonate/g zeolite. The resulting zeolite particles exhibit a narrow differential weight percent gaussian distribution with an average particle size of 0.85 microns with at least 90% of the weight between 0.1 and 2.5 microns. The cumulative percent population exhibits 94% less than one micron, with no more than 1 percent greater than 1.6 microns.

EXAMPLE THIRTY NINE

A sodium silicate solution of composition 4.5% sodium oxide and 10.8% silica was heated to 90 degrees Celsius. Sodium aluminate solution, also at 90 degrees Celsius, of composition 23.6% sodium oxide and 8.6% alumina was added to the sodium silicate so that all of the sodium aluminate solution was added within thirty seconds. The resulting gel was broken down by agitation until a homogeneous slurry was obtained. The batch was then reacted at 100 degrees Celsius for one half hour. The total batch composition had a water to sodium oxide molar ratio of about 20:1, a sodium oxide to silica molar ratio of about 2.2:1 and a silica to alumina molar ratio of about 2.5:1. The resulting product was zeolite A which exhibited a calcium ion exchange capacity of 300 mg calcium carbonate/g zeolite and a magnesium ion exchange capacity of 109 mg magnesium carbonate/g zeolite. The resulting zeolite particles exhibit a narrow differential weight percent gaussian distribution with an average particle size of 1.7 microns with at least 90% of the weight between 0.1 and 4.0 microns. The cumulative percent population exhibits 50% less than one micron, with no more than 1 percent greater than 2.5 microns.

EXAMPLE FORTY

A sodium silicate solution of composition 4.6% sodium oxide and 11.1% silica was heated to 90 degrees Celsius. Sodium aluminate solution, also at 90 degrees Celsius, of composition 29.2% sodium oxide and 5.4% alumina was added to the sodium silicate so that all of the sodium aluminate solution was added within thirty seconds. The resulting gel was broken down by agitation until a homogeneous slurry was obtained. The batch was then reacted at 100 degrees Celsius for two hours. The total batch composition had a water to sodium oxide molar ratio of about 20:1, a sodium oxide to silica molar ratio of about 1.8:1 and a silica to alumina molar ratio of about 6.3:1. The resulting product was zeolite A which exhibited a calcium ion exchange capacity of 297 mg calcium carbonate/g zeolite and a magnesium ion exchange capacity of 123 mg magnesium carbonate/g zeolite. The resulting zeolite particles exhibit a narrow differential weight percent gaussian distribution with an average particle size of 0.95 microns with at least 90% of the weight between 0.1 and 2.0 microns. The cumulative percent population exhibits 97% less than one micron, with no more than 1 percent greater than 1.3 microns.

EXAMPLE FORTY ONE

A sodium silicate solution of composition 4.6% sodium oxide and 11.1% silica was heated to 90 degrees Celsius. Sodium aluminate solution, also at 90 degrees Celsius, of composition 25.1% sodium oxide and 7.8% alumina was added to the sodium silicate so that all of the sodium aluminate solution was added within thirty seconds. The resulting gel was broken down by agitation until a homogeneous slurry was obtained. The batch was then reacted at 100 degrees Celsius for two hours. The total batch composition had a water to sodium oxide molar ratio of about 20:1, a sodium oxide to silica molar ratio of about 2.0:1 and a silica to alumina molar ratio of about 3.3:1. The resulting product was zeolite A which exhibited a calcium ion exchange capacity of 292 mg calcium carbonate/g zeolite and a magnesium ion exchange capacity of 136 mg magnesium carbonate/g zeolite. The resulting zeolite particles exhibit a narrow differential weight percent gaussian distribution with an average particle size of 0.94 microns with at least 90% of the weight between 0.1 and 2.0 microns. The cumulative percent population exhibits 94% less than one micron, with no more than 1 percent greater than 1.6 microns.

EXAMPLE FORTY TWO

A sodium silicate solution of composition 4.6% sodium oxide and 11.1% silica was heated to 90 degrees Celsius. Sodium aluminate solution, also at 90 degrees Celsius, of composition 25.1% sodium oxide and 7.8% alumina was added to the sodium silicate so that all of the sodium aluminate solution was added within ten minutes. The resulting gel was broken down by agitation until a homogeneous slurry was obtained. The batch was then reacted at 100 degrees Celsius for two hours. The total batch composition had a water to sodium oxide molar ratio of about 20:1, a sodium oxide to silica molar ratio of about 2.0:1 and a silica to alumina molar ratio of about 3.3:1. The resulting product was zeolite A which exhibited a calcium ion exchange capacity of 251 mg calcium carbonate/g zeolite and a magnesium ion exchange capacity of 126 mg magnesium carbonate/g zeolite. The resulting zeolite particles exhibit a narrow differential weight percent gaussian distribution with an average particle size of 1.1 microns with at least 90% of the weight between 0.1 and 2.0 microns. The cumulative percent population exhibits 82% less than one micron, with no more than 1 percent greater than 1.6 microns.

EXAMPLE FORTY THREE

A sodium silicate solution of composition 4.8% sodium oxide and 11.5% silica was heated to 90 degrees Celsius. Sodium aluminate solution, also at 90 degrees Celsius, of composition 29.7% sodium oxide and 5.2% alumina was added to the sodium silicate so that all of the sodium aluminate solution was added within thirty seconds. The resulting gel was broken down by agitation until a homogeneous slurry was obtained. The batch was then reacted at 100 degrees Celsius for one hour. The total batch composition had a water to sodium oxide molar ratio of about 20:1, a sodium oxide to silica molar ratio of about 1.7:1 and a silica to alumina molar ratio of about 7.3:1. The resulting product was zeolite A which exhibited a calcium ion exchange capacity of 264 mg calcium carbonate/g zeolite and a magnesium ion exchange capacity of 147 mg magnesium carbonate/g zeolite. The resulting zeolite particles exhibit a narrow differential weight percent gaussian distribution with an average particle size of 0.80 microns with at least 90% of the weight between 0.1 and 2.0 microns. The cumulative percent population exhibits 96% less than one micron, with no more than 1 percent greater than 1.3 microns.

EXAMPLE FORTY FOUR

A sodium silicate solution of composition 4.8% sodium oxide and 11.7% silica was heated to 90 degrees Celsius. Sodium aluminate solution, also at 90 degrees Celsius, of composition 26.2% sodium oxide and 7.2% alumina was added to the sodium silicate so that all of the sodium aluminate solution was added within thirty seconds. The resulting gel was broken down by agitation until a homogeneous slurry was obtained. The batch was then reacted at 100 degrees Celsius for two hours. The total batch composition had a water to sodium oxide molar ratio of about 20:1, a sodium oxide to silica molar ratio of about 1.8:1 and a silica to alumina molar ratio of about 4.3:1. The resulting product was zeolite A which exhibited a calcium ion exchange capacity of 286 mg calcium carbonate/g zeolite and a magnesium ion exchange capacity of 99 mg magnesium carbonate/g zeolite. The resulting zeolite particles exhibit a narrow differential weight percent gaussian distribution with an average particle size of 0.9 microns with at least 90% of the weight between 0.1 and 2.0 microns. The cumulative percent population exhibits 97% less than one micron, with no more than 1 percent greater than 1.6 microns.

EXAMPLE FORTY FIVE

A sodium silicate solution of composition 5.1% sodium oxide and 12.3% silica was heated to 50 degrees Celsius. Sodium aluminate solution, also at 50 degrees Celsius, of composition 22.5% sodium oxide and 9.3% alumina was added to the sodium silicate so that all of the sodium aluminate solution was added within thirty seconds. The resulting gel was broken down by agitation until a homogeneous slurry was obtained. The batch was then reacted at 60 degrees Celsius for four hours. The total batch composition had a water to sodium oxide molar ratio of about 20:1, a sodium oxide to silica molar ratio of about 2.0:1 and a silica to alumina molar ratio of about 2.5:1. The resulting product was zeolite A which exhibited a calcium ion exchange capacity of 281 mg calcium carbonate/g zeolite and a magnesium ion exchange capacity of 157 mg magnesium carbonate/g zeolite. The resulting zeolite particles exhibit a narrow differential weight percent gaussian distribution with an average particle size of 1.1 microns with at least 90% of the weight between 0.1 and 3.2 microns. The cumulative percent population exhibits 94% less than one micron, with no more than 1 percent greater than 1.6 microns.

EXAMPLE FORTY SIX

A sodium silicate solution of composition 5.1% sodium oxide and 12.3% silica was heated to 70 degrees Celsius. Sodium aluminate solution, also at 70 degrees Celsius, of composition 22.5% sodium oxide and 9.3% alumina was added to the sodium silicate so that all of the sodium aluminate solution was added within thirty seconds. The resulting gel was broken down by agitation until a homogeneous slurry was obtained. The batch was then reacted at 80 degrees Celsius for three hours. The total batch composition had a water to sodium oxide molar ratio of about 20:1, a sodium oxide to silica molar ratio of about 2.0:1 and a silica to alumina molar ratio of about 2.5:1. The resulting product was zeolite A which exhibited a calcium ion exchange capacity of 290 mg calcium carbonate/g zeolite and magnesium ion exchange capacity of 149 mg magnesium carbonate/g zeolite. The resulting zeolite particles exhibit a narrow differential weight percent gaussian distribution with an average particle size of 1.3 microns with at least 90% of the weight between 0.1 and 3.2 microns. The cumulative percent population exhibits 77% less than one micron, with no more than 1 percent greater than 2.0 microns.

EXAMPLE FORTY SEVEN

A sodium silicate solution of composition 5.1% sodium oxide and 12.3% silica was heated to 50 degrees Celsius. Sodium aluminate solution, also at 50 degrees Celsius, of composition 22.5% sodium oxide and 9.3% alumina was added to the sodium silicate so that all of the sodium aluminate solution was added within thirty seconds. The resulting gel was broken down by agitation until a homogeneous slurry was obtained. The batch was then reacted at 60 degrees Celsius for three and one half hours. The total batch composition had a water to sodium oxide molar ratio of about 20:1, a sodium oxide to silica molar ratio of about 2.0:1 and a silica to alumina molar ratio of about 2.5:1. The resulting product was zeolite A which exhibited a calcium ion exchange capacity of 296 mg calcium carbonate/g zeolite and a magnesium ion exchange capacity of 134 mg magnesium carbonate/g zeolite. The resulting zeolite particles exhibit a narrow differential weight percent gaussian distribution with an average particle size of 0.87 microns with at least 90% of the weight between 0.1 and 2.0 microns. The cumulative percent population exhibits 96% less than one micron, with no more than 1 percent greater than 1.3 microns.

EXAMPLE FORTY EIGHT

A sodium silicate solution of composition 5.1% sodium oxide and 12.3% silica was heated to 90 degrees Celsius. Sodium aluminate solution, also at 90 degrees Celsius, of composition 22.5% sodium oxide and 9.3% alumina was added to the sodium silicate so that all of the sodium aluminate solution was added within thirty seconds. The resulting gel was broken down by agitation until a homogeneous slurry was obtained. The batch was then reacted at 100 degrees Celsius for one half hour. The total batch composition had a water to sodium oxide molar ratio of about 20:1, a sodium oxide to silica molar ratio of about 2.0:1 and a silica to alumina molar ratio of about 2.5:1. The resulting product was zeolite A which exhibited a calcium ion exchange capacity of 283 mg calcium carbonate/g zeolite and a magnesium ion exchange capacity of 124 mg magnesium carbonate/g zeolite. The resulting zeolite particles exhibit a narrow differential weight percent gaussian distribution with an average particle size of 1.7 microns with at least 90% of the weight between 0.1 and 4.0 microns. The cumulative percent population exhibits 54% less than one micron, with no more than 1 percent greater than 2.5 microns.

EXAMPLE FORTY NINE

A sodium silicate solution of composition 5.0% sodium oxide and 12.1% silica was heated to 90 degrees Celsius. Sodium aluminate solution, also at 90 degrees Celsius, of composition 29.2% sodium oxide and 5.5% alumina was added to the sodium silicate so that all of the sodium aluminate solution was added within thirty seconds. The resulting gel was broken down by agitation until a homogeneous slurry was obtained. The batch was then reacted at 100 degrees Celsius for two hours. The total batch composition had a water to sodium oxide molar ratio of about 20:1, a sodium oxide to silica molar ratio of about 1.6:1 and a silica to alumina molar ratio of about 7.3:1. The resulting product was zeolite A which exhibited a calcium ion exchange capacity of 255 mg calcium carbonate/g zeolite and a magnesium ion exchange capacity of 135 mg magnesium carbonate/g zeolite. The resulting zeolite particles exhibit a narrow differential weight percent gaussian distribution with an average particle size of 1.0 microns with at least 90% of the weight between 0.1 and 2.0 microns. The cumulative percent population exhibits 86% less than one micron, with no more than 1 percent greater than 1.6 microns.

EXAMPLE FIFTY

A sodium silicate solution of composition 5.0% sodium oxide ad 12.1% silica was heated to 90 degrees Celsius. Sodium aluminate solution, also at 90 degrees Celsius, of composition 29.2% sodium oxide and 5.5% alumina was added to the sodium silicate so that all of the sodium aluminate solution was added within five minutes. The resulting gel was broken down by agitation until a homogeneous slurry was obtained. The batch was then reacted at 100 degrees Celsius for one and a half hours. The total batch composition had a water to sodium oxide molar ratio of about 20:1, a sodium oxide to silica molar ratio of about 1.6:1 and a silica to alumina molar ratio of about 7.3:1. The resulting product was zeolite A which exhibited a calcium ion exchange capacity of 245 mg calcium carbonate/g zeolite and a magnesium ion exchange capacity of 144 mg magnesium carbonate/g zeolite. The resulting zeolite particles exhibit a narrow differential weight percent gaussian distribution with an average particle size of 1.0 microns with at least 90% of the weight between 0.1 and 1.6 microns. The cumulative percent population exhibits 80% less than one micron, with no more than 1 percent greater than 1.6 microns.

EXAMPLE FIFTY ONE

A sodium silicate solution of composition 5.0% sodium oxide and 12.1% silica was heated to 90 degrees Celsius. Sodium aluminate solution, also at 90 degrees Celsius, of composition 29.2% sodium oxide and 5.5% alumina was added to the sodium silicate so that all of the sodium aluminate solution was added within ten minutes. The resulting gel was broken down by agitation until a homogeneous slurry was obtained. The batch was then reacted at 100 degrees Celsius for two hours. The total batch composition had a water to sodium oxide molar ratio of about 20:1, a sodium oxide to silica molar ratio of about 1.6:1 and a silica to alumina molar ratio of about 7.3:1. The resulting product was zeolite A which exhibited a calcium ion exchange capacity of 259 mg calcium carbonate/g zeolite and a magnesium ion exchange capacity of 149 mg magnesium carbonate/g zeolite. The resulting zeolite particles exhibit a narrow differential weight percent gaussian distribution with an average particle size of 0.90 microns with at least 90% of the weight between 0.1 and 1.6 microns. The cumulative percent population exhibits 90% less than one micron, with no more than 1 percent greater than 1.6 microns.

EXAMPLE FIFTY TWO

A sodium silicate solution of composition 5.0% sodium oxide and 12.1% silica was heated to 90 degrees Celsius. Sodium aluminate solution, also at 90 degrees Celsius, of composition 29.2% sodium oxide and 5.5% alumina was added to the sodium silicate so that all of the sodium aluminate solution was added within twenty minutes. The resulting gel was broken down by agitation until a homogeneous slurry was obtained. The batch was then reacted at 100 degrees Celsius for two hours. The total batch composition had a water to sodium oxide molar ratio of about 20:1, a sodium oxide to silica molar ratio of about 1.6:1 and a silica to alumina molar ratio of about 7.3:1. The resulting product was zeolite A which exhibited a calcium ion exchange capacity of 257 mg calcium carbonate/g zeolite and a magnesium ion exchange capacity of 151 mg magnesium carbonate/g zeolite. The resulting zeolite particles exhibit a narrow differential weight percent gaussian distribution with an average particle size of 0.84 microns with at least 90% of the weight between 0.1 and 1.6 microns. The cumulative percent population exhibits 95% less than one micron, with no more than 1 percent greater than 1.6 microns.

EXAMPLE FIFTY THREE

A sodium silicate solution of composition 5.0% sodium oxide and 12.1% silica was heated to 90 degrees Celsius. Sodium aluminate solution, also at 90 degrees Celsius, of composition 29.2% sodium oxide and 5.5% alumina was added to the sodium silicate so that all of the sodium aluminate solution was added within thirty seconds. The resulting gel was broken down by agitation until a homogeneous slurry was obtained. The batch was then reacted at 100 degrees Celsius for two hours. The total batch composition had a water to sodium oxide molar ratio of about 20:1, a sodium oxide to silica molar ratio of about 1.6:1 and a silica to alumina molar ratio of about 7.3:1. The resulting product was zeolite A which exhibited a calcium ion exchange capacity of 272 mg calcium carbonate/g zeolite and a magnesium ion exchange capacity of 144 mg magnesium carbonate/g zeolite. The resulting zeolite particles exhibit a narrow differential weight percent gaussian distribution with an average particle size of 1.1 microns with at least 90% of the weight between 0.1 and 2.0 microns. The cumulative percent population exhibits 97% less than one micron, with no more than 1 percent greater than 1.6 microns.

EXAMPLE FIFTY FOUR

A sodium silicate solution of composition 5.1% sodium oxide and 12.3% silica was heated to 90 degrees Celsius. Sodium aluminate solution, also at 90 degrees Celsius, of composition 23.9% sodium oxide and 8.5% alumina was added to the sodium silicate so that all of the sodium aluminate solution was added within thirty seconds. The resulting gel was broken down by agitation until a homogeneous slurry was obtained. The batch was then reacted at 100 degrees Celsius for one hour. The total batch composition had a water to sodium oxide molar ratio of about 20:1, a sodium oxide to silica molar ratio of about 1.8:1 and a silica to alumina molar ratio of about 3.3:1. The resulting product was zeolite A which exhibited a calcium ion exchange capacity of 290 mg calcium carbonate/g zeolite and a magnesium ion exchange capacity of 103 mg magnesium carbonate/g zeolite. The resulting zeolite particles exhibit a narrow differential weight percent gaussian distribution with an average particle size of 1.1 microns with at least 90% of the weight between 0.1 and 2.5 microns. The cumulative percent population exhibits 86% less than one micron, with no more than 1 percent greater than 2.0 microns.

EXAMPLE FIFTY FIVE

A sodium silicate solution of composition 5.2% sodium oxide and 12.6% silica was heated to 90 degrees Celsius. Sodium aluminate solution, also at 90 degrees Celsius, of composition 26.7% sodium oxide and 6.9% alumina was added to the sodium silicate so that all of the sodium aluminate solution was added within thirty seconds. The resulting gel was broken down by agitation until a homogeneous slurry was obtained. The batch was then reacted at 100 degrees Celsius for two hours. The total batch composition had a water to sodium oxide molar ratio of about 20:1, a sodium oxide to silica molar ratio of about 1.6:1 and a silica to alumina molar ratio of about 5.3:1. The resulting product was zeolite A which exhibited a calcium ion exchange capacity of 255 mg calcium carbonate/g zeolite and a magnesium ion exchange capacity of 150 mg magnesium carbonate/g zeolite. The resulting zeolite particles exhibit a narrow differential weight percent gaussian distribution with an average particle size of 0.92 microns with at least 90% of the weight between 0.1 and 2.0 microns. The cumulative percent population exhibits 95% less than one micron, with no more than 1 percent greater than 1.6 microns.

EXAMPLE FIFTY SIX

A sodium silicate solution of composition 5.3% sodium oxide and 12.8% silica was heated to 50 degrees Celsius. Sodium aluminate solution, also at 50 degrees Celsius, of composition 20.4% sodium oxide and 10.5% alumina was added to the sodium silicate so that all of the sodium aluminate solution was added within thirty seconds. The resulting gel was broken down by agitation until a homogeneous slurry was obtained. The batch was then reacted at 60 degrees Celsius for four and one half hours. The total batch composition had a water to sodium oxide molar ratio of about 20:1, a sodium oxide to silica molar ratio of about 2.0:1 and a silica to alumina molar ratio of about 2.0:1. The resulting product was zeolite A which exhibited a calcium ion exchange capacity of 297 mg calcium carbonate/g zeolite and a magnesium ion exchange capacity of 140 mg magnesium carbonate/g zeolite. The resulting zeolite particles exhibit a narrow differential weight percent gaussian distribution with an average particle size of 1.3 microns with at least 90% of the weight between 0.1 and 3.2 microns. The cumulative percent population exhibits 71% less than one micron, with no more than 1 percent greater than 2.0 microns.

EXAMPLE FIFTY SEVEN

A sodium silicate solution of composition 5.3% sodium oxide and 12.8% silica was heated to 70 degrees Celsius. Sodium aluminate solution, also at 70 degrees Celsius, of composition 20.4% sodium oxide and 10.5% alumina was added to the sodium silicate so that all of the sodium aluminate solution was added within thirty seconds. The resulting gel was broken down by agitation until a homogeneous slurry was obtained. The batch was then reacted at 80 degrees Celsius for one and one half hours. The total batch composition had a water to sodium oxide molar ratio of about 20:1, a sodium oxide to silica molar ratio of about 2.0:1 and a silica to alumina molar ratio of about 2.0:1. The resulting product was zeolite A which exhibited a calcium ion exchange capacity of 293 mg calcium carbonate/g zeolite and a magnesium ion exchange capacity of 115 mg magnesium carbonate/g zeolite. The resulting zeolite particles exhibit a narrow differential weight percent gaussian distribution with an average particle size of 2.0 microns with at least 90% of the weight between 0.1 and 5.0 microns. The cumulative percent population exhibits 40% less than one micron, with no more than 1 percent greater than 3.2 microns.

EXAMPLE FIFTY EIGHT

A sodium silicate solution of composition 8% sodium oxide and 19% silica was heated to 90 degrees Celsius. Sodium aluminate solution, also at 90 degrees Celsius, of composition 17% sodium oxide and 3.6% alumina was added to the sodium silicate so that all of the sodium aluminate solution was added within thirty seconds. The resulting gel was broken down by agitation until a homogeneous slurry was obtained. The batch was then reacted at 100 degrees Celsius for two hours. The total batch composition had a water to sodium oxide molar ratio of about 20:1, a sodium oxide to silica molar ratio of about 1.5:1 and a silica to alumina molar ratio of about 7.3:1. The resulting product was zeolite A which exhibited a calcium ion exchange capacity of 256 mg calcium carbonate/g zeolite and a magnesium ion exchange capacity of 145 mg magnesium carbonate/g zeolite. The resulting zeolite particles exhibit a narrow differential weight percent gaussian distribution with an average particle size of 0.9 microns with at least 90% of the weight between 0.1 and 2.0 microns. The cumulative percent population exhibits 96% less than one micron, with no more than 1 percent greater than 1.6 microns.

EXAMPLE FIFTY NINE

A sodium silicate solution of composition 8% sodium oxide and 19% silica was heated to 90 degrees Celsius. Sodium aluminate solution, also at 90 degrees Celsius, of composition 17% sodium oxide and 3.6% alumina was added to the sodium silicate so that all of the sodium aluminate solution was added within thirty seconds. The resulting gel was broken down by agitation until a homogeneous slurry was obtained. The batch was then reacted at 100 degrees Celsius for two hours. The total batch composition had a water to sodium oxide molar ratio of about 20:1, a sodium oxide to silica molar ratio of about 1.5:1 and a silica to alumina molar ratio of about 7.3:1. The resulting product was zeolite A which exhibited a calcium ion exchange capacity of 249 mg calcium carbonate/g zeolite and a magnesium ion exchange capacity of 127 mg magnesium carbonate/g zeolite. The resulting zeolite particles exhibit a narrow differential weight percent gaussian distribution with an average particle size of 1.1 microns with at least 90% of the weight between 0.1 and 2.0 microns. The cumulative percent population exhibits 96% less than one micron, with no more than 1 percent greater than 1.6 microns.

EXAMPLE SIXTY

A sodium silicate solution of composition 5.5% sodium oxide and 13.3% silica was heated to 90 degrees Celsius. Sodium aluminate solution, also at 90 degrees Celsius, of composition 27.3% sodium oxide and 6.6% alumina was added to the sodium silicate so that all of the sodium aluminate solution was added within thirty seconds. The resulting gel was broken down by agitation until a homogeneous slurry was obtained. The batch was then reacted at 100 degrees Celsius for eight hours. The total batch composition had a water to sodium oxide molar ratio of about 20:1, a sodium oxide to silica molar ratio of about 1.5:1 and a silica to alumina molar ratio of about 6.3:1. The resulting product was zeolite A which exhibited a calcium ion exchange capacity of 273 mg calcium carbonate/g zeolite and a magnesium ion exchange capacity of 127 mg magnesium carbonate/g zeolite. The resulting zeolite particles exhibit a narrow differential weight percent gaussian distribution with an average particle size of 0.95 microns with at least 90% of the weight between 0.1 and 2.5 microns. The cumulative percent population exhibits 95% less than one micron, with no more than 1 percent greater than 1.6 microns.

EXAMPLE SIXTY ONE

A sodium silicate solution of composition 5.5% sodium oxide and 13.3% silica was heated to 90 degrees Celsius. Sodium aluminate solution, also at 90 degrees Celsius, of composition 27.3% sodium oxide and 6.6% alumina was added to the sodium silicate so that all of the sodium aluminate solution was added within thirty seconds. The resulting gel was broken down by agitation until a homogeneous slurry was obtained. The batch was then reacted at 100 degrees Celsius for two hours. The total batch composition had a water to sodium oxide molar ratio of about 20:1, a sodium oxide to silica molar ratio of about 1.5:1 and a silica to alumina molar ratio of about 6.3:1. The resulting product was zeolite A which exhibited a calcium ion exchange capacity of 234 mg calcium carbonate/g zeolite and a magnesium ion exchange capacity of 123 mg magnesium carbonate/g zeolite. The resulting zeolite particles exhibit a narrow differential weight percent gaussian distribution with an average particle size of 1.1 microns with at least 90% of the weight between 0.1 and 2.0 microns. The cumulative percent population exhibits 95% less than one micron, with no more than 1 percent greater than 1.6 microns.

EXAMPLE SIXTY TWO

A sodium silicate solution of composition 5.5% sodium oxide and 13.3% silica was heated to 70 degrees Celsius. Sodium aluminate solution, also at 70 degrees Celsius, of composition 21.3% sodium oxide and 10.0% alumina was added to the sodium silicate so that all of the sodium aluminate solution was added within thirty seconds. The resulting gel was broken down by agitation until a homogeneous slurry was obtained. The batch was then reacted at 80 degrees Celsius for one and one half hours. The total batch composition had a water to sodium oxide molar ratio of about 20:1, a sodium oxide to silica molar ratio of about 1.8:1 and a silica to alumina molar ratio of about 2.5:1. The resulting product was zeolite A which exhibited a calcium ion exchange capacity of 287 mg calcium carbonate/g zeolite and a magnesium ion exchange capacity of 157 mg magnesium carbonate/g zeolite. The resulting zeolite particles exhibit a narrow differential weight percent gaussian distribution with an average particle size of 1.2 microns with at least 90% of the weight between 0.1 and 3.2 microns. The cumulative percent population exhibits 80% less than one micron, with no more than 1 percent greater than 2.0 microns.

EXAMPLE SIXTY THREE

A sodium silicate solution of composition 5.5% sodium oxide and 13.3% silica was heated to 50 degrees Celsius. Sodium aluminate solution, also at 50 degrees Celsius, of composition 21.3% sodium oxide and 10.0% alumina was added to the sodium silicate so that all of the sodium aluminate solution was added within thirty seconds. The resulting gel was broken down by agitation until a homogeneous slurry was obtained. The batch was then reacted at 60 degrees Celsius for four hours. The total batch composition had a water to sodium oxide molar ratio of about 20:1, a sodium oxide to silica molar ratio of about 1.8:1 and a silica to alumina molar ratio of about 2.5:1. The resulting product was zeolite A which exhibited a calcium ion exchange capacity of 281 mg calcium carbonate/g zeolite and a magnesium ion exchange capacity of 149 mg magnesium carbonate/g zeolite. The resulting zeolite particles exhibit a narrow differential weight percent gaussian distribution with an average particle size of 1.0 microns with at least 90% of the weight between 0.1 and 2.5 microns. The cumulative percent population exhibits 92% less than one micron, with no more than 1 percent greater than 1.6 microns.

EXAMPLE SIXTY FOUR

A sodium silicate solution of composition 5.5% sodium oxide and 13.3% silicate was heated to 90 degrees Celsius. Sodium aluminate solution, also at 90 degrees Celsius, of composition 21.3% sodium oxide and 10.0% alumina was added to the sodium silicate so that all of the sodium aluminate solution was added within thirty seconds. The resulting gel was broken down by agitation until a homogeneous slurry was obtained. The batch was then reacted at 100 degrees Celsius for one-half hour. The total batch composition had a water to sodium oxide molar ratio of about 20:1, a sodium oxide to silica molar ratio of about 1.8:1 and a silica to alumina molar ratio of about 2.5:1. The resulting product was zeolite A which exhibited a calcium ion exchange capacity of 281 mg calcium carbonate/g zeolite and a magnesium ion exchange capacity of 113 mg magnesium carbonate/g zeolite. The resulting zeolite particles exhibit a narrow differential weight percent gaussian distribution with an average particle size of 1.7 microns with at least 90% of the weight between 0.1 and 4.0 microns. The cumulative percent population exhibits 56% less than one micron, with no more than 1 percent greater than 2.5 microns.

EXAMPLE SIXTY FIVE

A sodium silicate solution of composition 5.5% sodium oxide and 13.3% silica was heated to 90 degrees Celsius. Sodium aluminate solution, also at 90 degrees Celsius, of composition 25.9% sodium oxide and 7.3% alumina was added to the sodium silicate so that all of the sodium aluminate solution was added within thirty seconds. The resulting gel was broken down by agitation until a homogeneous slurry was obtained. The batch was then reacted at 100 degrees Celsius for two hours. The total batch composition had a water to sodium oxide molar ratio of about 20:1, a sodium oxide to silica molar ratio of about 1.5:1 and a silica to alumina molar ratio of about 5.3:1. The resulting product was zeolite A which exhibited a calcium ion exchange capacity of 250 mg calcium carbonate/g zeolite and a magnesium ion exchange capacity of 118 mg magnesium carbonate/g zeolite. The resulting zeolite particles exhibit a narrow differential weight percent gaussian distribution with an average particle size of 1.1 microns with at least 90% of the weight between 0.1 and 2.0 microns. The cumulative percent population exhibits 95% less than one micron, with no more than 1 percent greater than 1.6 microns.

EXAMPLE SIXTY SIX

A sodium silicate solution of composition 5.6% sodium oxide and 13.6% silica was heated to 90 degrees Celsius. Sodium aluminate solution, also at 90 degrees Celsius, of composition 27.8% sodium oxide and 6.3% alumina was added to the sodium silicate so that all of the sodium aluminate solution was added within thirty seconds. The resulting gel was broken down by agitation until a homogeneous slurry was obtained. The batch was then reacted at 100 degrees Celsius for four hours. The total batch composition had a water to sodium oxide molar ratio of about 20:1, a sodium oxide to silica molar ratio of about 1.4:1 and a silica to alumina molar ratio of about 7.3:1. The resulting product was zeolite A which exhibited a calcium ion exchange capacity of 254 mg calcium carbonate/g zeolite and a magnesium ion exchange capacity of 143 mg magnesium carbonate/g zeolite. The resulting zeolite particles exhibit a narrow differential weight percent gaussian distribution with an average particle size of 0.9 microns with at least 90% of the weight between 0.1 and 2.0 microns. The cumulative percent population exhibits 97% less than one micron, with no more than 1 percent greater than 1.6 microns.

EXAMPLE SIXTY SEVEN

A sodium silicate solution of composition 5.7% sodium oxide and 13.7% silica was heated to 90 degrees Celsius. Sodium aluminate solution, also at 90 degrees Celsius, of composition 22.4% sodium oxide and 9.3% alumina was added to the sodium silicate so that all of the sodium aluminate solution was added within thirty seconds. The resulting gel was broken down by agitation until a homogeneous slurry was obtained. The batch was then reacted at 100 degrees Celsius for one and a half hours. The total batch composition had a water to sodium oxide molar ratio of about 20:1, a sodium oxide to silica molar ratio of about 1.6:1 and a silica to alumina molar ratio of about 3.3:1. The resulting product was zeolite A which exhibited a calcium ion exchange capacity of 265 mg calcium carbonate/g zeolite and a magnesium ion exchange capacity of 145 mg magnesium carbonate/g zeolite. The resulting zeolite particles exhibit a narrow differential weight percent gaussian distribution with an average particle size of 1.2 microns with at least 90% of the weight between 0.1 and 2.0 microns. The cumulative percent population exhibits 85% less than one micron, with no more than 1 percent greater than 1.6 microns.

EXAMPLE SIXTY EIGHT

A sodium silicate solution of composition 5.7% sodium oxide and 13.7% silica was heated to 90 degrees Celsius. Sodium aluminate solution, also at 90 degrees Celsius, of composition 22.4% sodium oxide and 9.3% alumina was added to the sodium silicate so that all of the sodium aluminate solution was added within thirty seconds. The resulting gel was broken down by agitation until a homogeneous slurry was obtained. The batch was then reacted at 100 degrees Celsius for one and a half hours. The total batch composition had a water to sodium oxide molar ratio of about 20:1, a sodium oxide to silica molar ratio of about 1.6:1 and a silica to alumina molar ratio of about 3.3:1. The resulting product was zeolite A which exhibited a calcium ion exchange capacity of 248 mg calcium carbonate/g zeolite and a magnesium ion exchange capacity of 136 mg magnesium carbonate/g zeolite. The resulting zeolite particles exhibit a narrow differential weight percent gaussian distribution with an average particle size of 1.5 microns with at least 90% of the weight between 0.1 and 3.2 microns. The cumulative percent population exhibits 53% less than one micron, with no more than 1 percent greater than 2.5 microns.

EXAMPLE SIXTY NINE

A sodium silicate solution of composition 5.7% sodium oxide and 13.7% silica was heated to 90 degrees Celsius. Sodium aluminate solution, also at 90 degrees Celsius, of composition 22.4% sodium oxide and 9.3% alumina was added to the sodium silicate so that all of the sodium aluminate solution was added within five minutes. The resulting gel was broken down by agitation until a homogeneous slurry was obtained. The batch was then reacted at 100 degrees Celsius for one and a half hours. The total batch composition had a water to sodium oxide molar ratio of about 20:1, a sodium oxide to silica molar ratio of about 1.6:1 and a silica to alumina molar ratio of about 3.3:1. The resulting product was zeolite A which exhibited a calcium ion exchange capacity of 264 mg calcium carbonate/g zeolite and a magnesium ion exchange capacity of 128 mg magnesium carbonate/g zeolite. The resulting zeolite particles exhibit a narrow differential weight percent gaussian distribution with an average particle size of 1.4 microns with at least 90% of the weight between 0.1 and 3.2 microns. The cumulative percent population exhibits 51% less than one micron, with no more than 5 percent greater than 2.0 microns.

EXAMPLE SEVENTY

A sodium silicate solution of composition 5.7% sodium oxide and 13.7% silica was heated to 90 degrees Celsius. Sodium aluminate solution, also at 90 degrees Celsius, of composition 22.4% sodium oxide and 9.3% alumina was added to the sodium silicate so that all of the sodium aluminate solution was added within ten minutes. The resulting gel was broken down by agitation until a homogeneous slurry was obtained. The batch was then reacted at 100 degrees Celsius for one and a half hours. The total batch composition had a water to sodium oxide molar ratio of about 20:1, a sodium oxide to silica molar ratio of about 1.6:1 and a silica to alumina molar ratio of about 3.3:1. The resulting product was zeolite A which exhibited a calcium ion exchange capacity of 254 mg calcium carbonate/g zeolite and a magnesium ion exchange capacity of 127 mg magnesium carbonate/g zeolite. The resulting zeolite particles exhibit a narrow differential weight percent gaussian distribution with an average particle size of 1.4 microns with at least 90% of the weight between 0.1 and 3.2 microns. The cumulative percent population exhibits 54% less than one micron, with no more than 4 percent greater than 2.0 microns.

EXAMPLE SEVENTY ONE

A sodium silicate solution of composition 5.7% sodium oxide and 13.7% silica was heated to 90 degrees Celsius. Sodium aluminate solution, also at 90 degrees Celsius, of composition 22.4% sodium oxide and 9.3% alumina was added to the sodium silicate so that all of the sodium aluminate solution was added within twenty minutes. The resulting gel was broken down by agitation until a homogeneous slurry was obtained. The batch was then reacted at 100 degrees Celsius for one and a half hours. The total batch composition had a water to sodium oxide molar ratio of about 20:1, a sodium oxide to silica molar ratio of about 1.6:1 and a silica to alumina molar ratio of about 3.3:1. The resulting product was zeolite A which exhibited a calcium ion exchange capacity of 239 mg calcium carbonate/g zeolite and a magnesium ion exchange capacity of 92 mg magnesium carbonate/g zeolite. The resulting zeolite particles exhibit a narrow differential weight percent gaussian distribution with an average particle size of 1.7 microns with at least 90% of the weight between 0.1 and 4.0 microns. The cumulative percent population exhibits 62% less than one micron, with no more than 2 percent greater than 2.5 microns.

EXAMPLE SEVENTY TWO

A sodium silicate solution of compositions 5.7% sodium oxide and 13.8% silica was heated to 90 degrees Celsius. Sodium aluminate solution, also at 90 degrees Celsius, of composition 26.6% sodium oxide and 6.9% alumina was added to the sodium silicate so that all of the sodium aluminate solution was added within thirty seconds. The resulting gel was broken down by agitation until a homogeneous slurry was obtained. The batch was then reacted at 100 degrees Celsius for three hours. The total batch composition had a water to sodium oxide molar ratio of about 20:1, a sodium oxide to silica molar ratio of about 1.4:1 and a silica to alumina molar ratio of about 6.3:1. The resulting product was zeolite A which exhibited a calcium ion exchange capacity of 307 mg calcium carbonate/g zeolite and a magnesium ion exhange capacity of 145 mg magnesium carbonate/g zeolite. The resulting zeolite particles exhibit a narrow differential weight percent gaussian distribution with an average particle size of 1.1 microns with at least 90% of the weight between 0.1 and 3.2 microns. The cumulative percent population exhibits 91% less than one micron, with no more than 1 percent greater than 2.0 microns.

EXAMPLE SEVENTY THREE

A sodium silicate solution of composition 5.8% sodium oxide and 14.2% silica was heated to 70 degrees Celsius. Sodium aluminate solution, also at 70 degrees Celsius, of composition 21.5% sodium oxide and 9.8% alumina was added to the sodium silicate so that all of the sodium aluminate solution was added within thirty seconds. The resulting gel was broken down by agitation until a homogeneous slurry was obtained. The batch was then reacted at 80 degrees Celsius for three hours. The total batch composition had a water to sodium oxide molar ratio of about 20:1, a sodium oxide to silica molar ratio of about 1.6:1 and a silica to alumina molar ratio of about 3.0:1. The resulting product was zeolite A which exhibited a calcium ion exchange capacity of 292 mg calcium carbonate/g zeolite and a magnesium ion exchange capacity of 135 mg magnesium carbonate/g zeolite. The resulting zeolite particles exhibit a narow differential weight percent gaussian distribution with an average particle size of 0.95 microns with at least 90% of the weight between 0.1 and 2.0 microns. The cumulative percent population exhibits 95% less than one micron, with no more than 1 percent greater than 1.6 microns.

EXAMPLE SEVENTY FOUR

A sodium silicate solution of composition 5.8% sodium oxide and 14.2% silica was heated to 90 degrees Celsius. Sodium aluminate solution, also at 90 degrees Celsius, of composition 25.1% sodium oxide and 7.8% alumina was added to the sodium silicate so that all of the sodium aluminate solution was added within thirty seconds. The resulting gel was broken down by agitation until a homogeneous slurry was obtained. The batch was then reacted at 100 degrees Celsius for three hours. The total batch composition had a water to sodium oxide molar ratio of about 20:1, a sodium oxide to silica molar ratio of about 1.4:1 and a silica to alumina molar ratio of about 5.3:1. The resulting product was zeolite A which exhibited a calcium ion exchange capacity of 278 mg calcium carbonate/g zeolite and a magnesium ion exchange capacity of 148 mg magnesium carbonate/g zeolite. The resulting zeolite particles exhibit a narrow differential weight percent gaussian distribution with an average particle size of 1.4 microns with at least 90% of the weight between 0.1 and 3.2 microns. The cumulative percent population exhibits 95% less than one micron, with no more than 1 percent greater than 1.6 microns.

EXAMPLE SEVENTY FIVE

A sodium silicate solution of composition 6.2% sodium oxide and 15.0% silica was heated to 70 degrees Celsius. Sodium aluminate solution, also at 70 degrees Celsius, of composition 19.8% sodium oxide and 10.8% alumina was added to the sodium silicate so that all of the sodium aluminate solution was added within thirty seconds. The resulting gel was broken down by agitation until a homogeneous slurry was obtained. The batch was then reacted at 80 degrees Celsius for three hours. The total batch composition had a water to sodium oxide molar ratio of about 20:1, a sodium oxide to silica molar ratio of about 1.6:1 and a silica to alumina molar ratio of about 2.5:1. The resulting product was zeolite A which exhibited a calcium ion exchange capacity of 288 mg calcium carbonate/g zeolite and a magnesium ion exchange capacity of 160 mg magnesium carbonate/g zeolite. The resulting zeolite particles exhibit a narrow differential weight percent gaussian distribution with an average particle size of 1.2 microns with at least 90% of the weight between 0.1 and 3.2 microns. The cumulative percent population exhibits 80% less than one micron, with no more than 1 percent greater than 2.0 microns.

EXAMPLE SEVENTY SIX

A sodium silicate solution of composition 6.2% sodium oxide and 15.0% silica was heated to 90 degrees Celsius. Sodium aluminate solution, also at 90 degrees Celsius, of composition 19.8% sodium oxide and 10.8% alumina was added to the sodium silicate so that all of the sodium aluminate solution was added within thirty seconds. The resulting gel was broken down by agitation until a homogeneous slurry was obtained. The batch was then reacted at 100 degrees Celsius for one hour. The total batch composition had a water to sodium oxide molar ratio of about 20:1, a sodium oxide to silica molar ratio of about 1.6:1 and a silica to alumina molar ratio of about 2.5:1. The resulting product was zeolite A which exhibited a calcium ion exchange capacity of 278 mg calcium carbonate/g zeolite and a magnesium ion exchange capacity of 86 mg magnesium carbonate/g zeolite. The resulting zeolite particles exhibit a narrow differential weight percent gaussian distribution with an average particle size of 2.0 microns with at least 90% of the weight between 0.1 and 5.0 microns. The cumulative percent population exhibits 48% less than one micron, with no more than 1 percent greater than 3.2 microns.

EXAMPLE SEVENTY SEVEN

A sodium silicate solution of composition 6.5% sodium oxide and 15.7% silica was heated to 90 degrees Celsius. Sodium aluminate solution, also at 90 degrees Celsius, of composition 20.7% sodium oxide and 10.3% alumina was added to the sodium silicate so that all of the sodium aluminate solution was added within thirty seconds. The resulting gel was broken down by agitation until a homogeneous slurry was obtained. The batch was then reacted at 100 degrees Celsius for one hour. The total batch composition had a water to sodium oxide molar ratio of about 20:1, a sodium oxide to silica molar ratio of about 1.4:1 and a silica to alumina molar ratio of about 3.3:1. The resulting product was zeolite A which exhibited a calcium ion exchange capacity of 272 mg calcium carbonate/g zeolite and a magnesium ion exchange capacity of 121 mg magnesium carbonate/g zeolite. The resulting zeolite particles exhibit a narrow differential weight percent gaussian distribution with an average particle size of 1.3 microns with at least 90% of the weight between 0.1 and 3.2 microns. The cumulative percent population exhibits 76% less than one micron, with no more than 1 percent greater than 2.0 microns.

EXAMPLE SEVENTY EIGHT

A sodium silicate solution of composition 6.8% sodium oxide and 16.5% silica was heated to 50 degrees Celsius. Sodium aluminate solution, also at 50 degrees Celsius, of composition 17.6% sodium oxide and 12.1% alumina was added to the sodium silicate so that all of the sodium aluminate solution was added within thirty seconds. The resulting gel was broken down by agitation until a homogeneous slurry was obtained. The batch was then reacted at 60 degrees Celsius for four hours. The total batch composition had a water to sodium oxide molar ratio of about 20:1, a sodium oxide to silica molar ratio of about 1.6:1 and a silica to alumina molar ratio of about 2.0:1. The resulting product was zeolite A which exhibited a calcium ion exchange capacity of 311 mg calcium carbonate/g zeolite and a magnesium ion exchange capacity of 118 mg magnesium carbonate/g zeolite. The resulting zeolite particles exhibit a narrow differential weight percent gaussian distribution with an average particle size of 1.2 microns with at least 90% of the weight between 0.1 and 3.2 microns. The cumulative percent population exhibits 76% less than one micron, with no more than 1 percent greater than 2.0 microns.

EXAMPLE SEVENTY NINE

A sodium silicate solution of composition 6.8% sodium oxide and 16.5% silica was heated to 70 degrees Celsius. Sodium aluminate solution, also at 70 degrees Celsius, of composition 17.6% sodium oxide and 12.1% alumina was added to the sodium silicate so that all of the sodium aluminate solution was added within thirty seconds. The resulting gel was broken down by agitation until a homogeneous slurry was obtained. The batch was then reacted at 80 degrees Celsius for 2.3 hours. The total batch composition had a water to sodium oxide molar ratio of about 20:1, a sodium oxide to silica molar ratio of about 1.6:1 and a silica to alumina molar ratio of about 2.0:1. The resulting product was zeolite A which exhibited a calcium ion exchange capacity of 300 mg calcium carbonate/g zeolite and a magnesium ion exchange capacity of 119 mg magnesium carbonate/g zeolite. The resulting zeolite particles exhibit a narrow differential weight percent gaussian distribution with an average particle size of 2.2 microns with at least 90% of the weight between 0.1 and 5.0 microns. The cumulative percent population exhibits 34% less than one micron, with no more than 1 percent greater than 3.2 microns.

EXAMPLE EIGHTY

A sodium silicate solution of composition 10.2% sodium oxide and 23.2% silica was heated to 90 degrees Celsius. Sodium aluminate solution, also at 90 degrees Celsius, of composition 25.9% sodium oxide and 7.3% alumina was added to the sodium silicate so that all of the sodium aluminate solution was added within thirty seconds. The resulting gel was broken down by agitation until a homogeneous slurry was obtained. The batch was then reacted at 100 degrees Celsius for three hours. The total batch composition had a water to sodium oxide molar ratio of about 20:1, a sodium oxide to silica molar ratio of about 1.2:1 and a silica to alumina molar ratio of about 7.3:1. The resulting product was zeolite A which exhibited a calcium ion exchange capacity of 241 mg calcium carbonate/g zeolite and a magnesium ion exchange capacity of 144 mg magnesium carbonate/g zeolite. The resulting zeolite particles exhibit a narrow differential weight percent gaussian distribution with an average particle size of 1.6 microns with at least 90% of the weight between 0.1 and 4.0 microns. The cumulative percent population exhibits 80% less than one micron, with no more than 5 percent greater than 1.6 microns.

EXAMPLE EIGHTY ONE

A sodium silicate solution of composition 6.5% sodium oxide and 15.7% silica was heated to 90 degrees Celsius. Sodium aluminate solution, also at 90 degrees Celsius, of composition 24.6% sodium oxide and 8.0% alumina was added to the sodium silicate so that all of the sodium aluminate solution was added within thirty seconds. The resulting gel was broken down by agitation until a homogeneous slurry was obtained. The batch was then reacted at 100 degrees Celsius for three hours. The total batch composition had a water to sodium oxide molar ratio of about 20:1, a sodium oxide to silica molar ratio of about 1.2:1 and a silica to alumina molar ratio of about 6.3:1. The resulting product was zeolite A which exhibited a calcium ion exchange capacity of 330 mg calcium carbonate/g zeolite and a magnesium ion exchange capacity of 144 mg magnesium carbonate/g zeolite. The resulting zeolite particles exhibit a narrow differential weight percent gaussian distribution with an average particle size of 1.4 microns with at least 90% of the weight between 0.1 and 4.0 microns. The cumulative percent population exhibits 95% less than one micron, with no more than 1 percent greater than 2.0 microns.

EXAMPLE EIGHTY TWO

A sodium silicate solution of composition 7.1% sodium oxide and 17.3% silica was heated to 70 degrees Celsius. Sodium aluminate solution, also at 70 degrees Celsius, of composition 18.0% sodium oxide and 11.8% alumina was added to the sodium silicate so that all of the sodium aluminate solution was added within thirty seconds. The resulting gel was broken down by agitation until a homogeneous slurry was obtained. The batch was then reacted at 80 degrees Celsius for three hours. The total batch composition had a water to sodium oxide molar ratio of about 20:1, a sodium oxide to silica molar ratio of about 1.4:1 and a silica to alumina molar ratio of about 2.5:1. The resulting product was zeolite A which exhibited a calcium ion exchange capacity of 286 mg calcium carbonate/g zeolite and a magnesium ion exchange capacity of 145 mg magnesium carbonate/g zeolite. The resulting zeolite particles exhibit a narrow differential weight percent gaussian distribution with an average particle size of 1.3 microns with at least 90% of the weight between 0.1 and 3.2 microns. The cumulative percent population exhibits 79% less than one micron, with no more than 1 percent greater than 2.0 microns.

EXAMPLE EIGHTY THREE

A sodium silicate solution of composition 7.1% sodium oxide and 17.3% silica was heated to 90 degrees Celsius. Sodium aluminate solution, also at 90 degrees Celsius, of composition 18.0% sodium oxide and 11.8% alumina was added to the sodium silicate so that all of the sodium aluminate solution was added within thirty seconds. The resulting gel was broken down by agitation until a homogeneous slurry was obtained. The batch was then reacted at 100 degrees Celsius for two hours. The total batch composition had a water to sodium oxide molar ratio of about 20:1, a sodium oxide to silica molar ratio of about 1.4:1 and a silica to alumina molar ratio of about 2.5:1. The resulting product was zeolite A which exhibited a calcium ion exchange capacity of 288 mg calcium carbonate/g zeolite and a magnesium ion exchange capacity of 112 mg magnesium carbonate/g zeolite. The resulting zeolite particles exhibit a narrow differential weight percent gaussian distribution with an average particle size of 1.9 microns with at least 90% of the weight between 0.1 and 5.0 microns. The cumulative percent population exhibits 57% less than one micron, with no more than 1 percent greater than 3.2 microns.

EXAMPLE EIGHTY FOUR

A sodium silicate solution of composition 7.0% sodium oxide and 16.9% silica was heated to 90 degrees Celsius. Sodium aluminate solution, also at 90 degrees Celsius, of composition 21.1% sodium oxide and 10.1% alumina was added to the sodium slicate so that all of the sodium aluminate solution was added within thirty seconds. The resulting gel was broken down by agitation until a homogeneous slurry was obtained. The batch was then reacted at 100 degrees Celsius for two hours. The total batch composition had a water to sodium oxide molar ratio of about 20:1, a sodium oxide to silica molar ratio of about 1.2:1 and a silica to alumina molar ratio of about 4.3:1. The resulting product was zeolite A which exhibited a calcium ion exchange capacity of 290 mg calcium carbonate/g zeolite and a magnesium ion exchange capacity of 148 mg magnesium carbonate/g zeolite. The resulting zeolite particles exhibit a narrow differential weight percent gaussian distribution with an average particle size of 1.2 microns with at least 90% of the weight between 0.1 and 3.2 microns. The cumulative percent population exhibits 86% less than one micron, with no more than 1 percent greater than 2.0 microns.

EXAMPLE EIGHTY FIVE

A sodium silicate solution of composition 7.5% sodium oxide and 18.2% silica was heated to 90 degrees Celsius. Sodium aluminate solution, also at 90 degrees Celsius, of composition 18.5% sodium oxide and 11.5% alumina was added to the sodium silicate so that all of the sodium aluminate solution was added within thirty seconds. The resulting gel was broken down by agitation until a homogenous slurry was obtained. The batch was then reacted at 100 degrees Celsius for two hours. The total batch composition had a water to sodium oxide molar ratio of about 20:1, a sodium oxide to silica molar ratio of about 1.2:1 and a silica to alumina molar ratio of about 3.4:1. The resulting product was zeolite A which exhibited a calcium ion exchange capacity of 274 mg calcium carbonate/g zeolite and a magnesium ion exchange capacity of 153 mg magnesium carbonate/g zeolite. The resulting zeolite particles exhibit a narrow differential weight percent gaussian distribution with an average particle size of 1.6 microns with at least 90% of the weight between 0.1 and 4.0 microns. The cumulative percent population exhibits 80% less than one micron, with no more than 1 percent greater than 2.0 microns.

EXAMPLE EIGHTY SIX

A sodium silicate solution of composition 6.3% sodium oxide and 15.2% silica was heated to 50 degrees Celsius. Sodium aluminate solution, also at 50 degrees Celsius, of composition 24.6% sodium oxide and 8.1% alumina was added to the sodium silicate so that all of the sodium aluminate solution was added within thirty seconds. The resulting gel was broken down by agitation until a homogeneous slurry was obtained. The batch was then reacted at 60 degrees Celsius for three and one half hours. The total batch composition had a water to sodium oxide molar ratio of about 15:1, a sodium oxide to silica molar ratio of about 2.4:1 and a silica to alumina molar ratio of about 2.5:1. The resulting product was zeolite A which exhibited a calcium ion exchange capacity of 315 mg calcium carbonate/g zeolite and a magnesium ion exchange capacity of 157 mg magnesium carbonate/g zeolite. The resulting zeolite particles exhibit a narrow differential weight percent gaussian distribution with an average particle size of 0.92 microns with at least 90% of the weight between 0.1 and 2.0 microns. The cumulative percent population exhibits 98% less than one micron, with no more than 1 percent greater than 1.25 microns.

EXAMPLE EIGHTY SEVEN

A sodium silicate solution of composition 6.9% sodium oxide and 16.8% silica was heated to 50 degrees Celsius. Sodium aluminate solution, also at 50 degrees Celsius, of composition 22.5% sodium oxide and 9.3% alumina was added to the sodium silicate so that all of the sodium aluminate solution was added within thirty seconds. The resulting gel was broken down by agitation until a homogeneous slurry was obtained. The batch was then reacted at 60 degrees Celsius for three and one half hours. The total batch composition had a water to sodium oxide molar ratio of about 15:1, a sodium oxide to silica molar ratio of about 2.4:1 and a silica to alumina molar ratio of about 2.0:1. The resulting product was zeolite A which exhibited a calcium ion exchange capacity of 289 mg calcium carbonate/g zeolite and a magnesium ion exchange capacity of 140 mg magnesium carbonate/g zeolite. The resulting zeolite particles exhibit a narrow differential weight percent gaussian distribution with an average particle size of 1.4 microns with at least 90% of the weight between 0.1 and 3.2 microns. The cumulative percent population exhibits 77% less than one micron, with no more than 1 percent greater than 2.0 microns.

EXAMPLE EIGHTY EIGHT

A sodium silicate solution of composition 8.4% sodium oxide and 20.3% silica was heated to 70 degrees Celsius. Sodium aluminate solution, also at 70 degrees Celsius, of composition 15.9% sodium oxide and 13.1% alumina was added to the sodium silicate so that all of the sodium aluminate solution was added within thirty seconds. The resulting gel was broken down by agitation until a homogeneous slurry was obtained. The batch was then reacted at 80 degrees Celsius for three hours. The total batch composition had a water to sodium oxide molar ratio of about 20:1, a sodium oxide to silica molar ratio of about 1.2:1 and a silica to alumina molar ratio of about 2.5:1. The resulting product was zeolite A which exhibited a calcium ion exchange capacity of 273 mg calcium carbonate/g zeolite and a magnesium ion exchange capacity of 134 mg magnesium carbonate/g zeolite. The resulting zeolite particles exhibit a narrow differential weight percent gaussian distribution with an average particle size of 1.6 microns with at least 90% of the weight between 0.1 and 4.0 microns. The cumulative percent population exhibits 71% less than one micron, with no more than 1 percent greater than 2.5 microns.

EXAMPLE EIGHTY NINE

A sodium silicate solution of composition 8.6% sodium oxide and 20.8% silica was heated to 50 degrees Celsius. Sodium aluminate solution, also at 50 degrees Celsius, of composition 20.4% sodium oxide and 10.5% alumina was added to the sodium silicate so that all of the sodium aluminate solution was added within thirty seconds. The resulting gel was broken down by agitation until a homogeneous slurry was obtained. The batch was then reacted at 60 degrees Celsius for two hours. The total batch composition had a water to sodium oxide molar ratio of about 15:1, a sodium oxide to silica molar ratio of about 2.0:1 and a silica to alumina molar ratio of about 2.0:1. The resulting product was zeolite A which exhibited a calcium ion exchange capacity of 275 mg calcium carbonate/g zeolite and a magnesium ion exchange capacity of 145 mg magnesium carbonate/g zeolite. The resulting zeolite particles exhibit a narrow differential weight percent gaussian distribution with an average particle size of 0.97 microns with at least 90% of the weight between 0.1 and 2.5 microns. The cumulative percent population exhibits 91% less than one micron, with no more than 1 percent greater than 1.6 microns.

EXAMPLE NINETY

A sodium silicate solution of composition 9.7% sodium oxide and 23.4% silica was heated to 70 degrees Celsius. Sodium aluminate solution, also at 70 degrees Celsius, of composition 19.8% sodium oxide and 10.8% alumina was added to the sodium silicate so that all of the sodium aluminate solution was added within thirty seconds. The resulting gel was broken down by agitation until a homogeneous slurry was obtained. The batch was then reacted at 80 degrees Celsius for one hour. The total batch composition had a water to sodium oxide molar ratio of about 15:1, a sodium oxide to silica molar ratio of about 1.6:1 and a silica to alumina molar ratio of about 2.5:1. The resulting product was zeolite A which exhibited a calcium ion exchange capacity of 274 mg calcium carbonate/g zeolite and a magnesium ion exchange capacity of 129 mg magnesium carbonate/g zeolite. The resulting zeolite particles exhibit a narrow differential weight percent gaussian distribution with an average particle size of 1.2 microns with at least 90% of the weight between 0.1 and 3.2 microns. The cumulative percent population exhibits 95% less than one micron, with no more than 1 percent greater than 1.6 microns.

EXAMPLE NINETY ONE

A sodium silicate solution of composition 10.8% sodium oxide and 26.2% silica was heated to 50 degrees Celsius. Sodium aluminate solution, also at 50 degrees Celsius, of composition 18.0% sodium oxide and 12.3% alumina was added to the sodium silicate so that all of the sodium aluminate solution was added within thirty seconds. The resulting gel was broken down by agitation until a homogeneous slurry was obtained. The batch was then reacted at 60 degrees Celsius for three and one half hours. The total batch composition had a water to sodium oxide molar ratio of about 15:1, a sodium oxide to silica molar ratio of about 1.6:1 and a silica to alumina molar ratio of about 2.0:1. The resulting product was zeolite A which exhibited a calcium ion exchange capacity of 312 mg calcium carbonate/g zeolite and a magnesium ion exchange capacity of 143 mg magnesium carbonate/g zeolite. The resulting zeolite particles exhibit a narrow differential weight percent gaussian distribution with an average particle size of 1.4 microns with at least 90% of the weight between 0.1 and 3.2 microns. The cumulative percent population exhibits 67% less than one micron, with no more than 1 percent greater than 2.5 microns.

EXAMPLE NINETY TWO

A sodium silicate solution of composition 10.8% sodium oxide and 26.2% silica was heated to 70 degrees Celsius. Sodium aluminate solution, also at 70 degrees Celsius, of composition 18.0% sodium oxide and 12.3% alumina was added to the sodium silicate so that all of the sodium aluminate solution was added within thirty seconds. The resulting gel was broken down by agitation until a homogeneous slurry was obtained. The batch was then reacted at 80 degrees Celsius for one hour. The total batch composition had a water to sodium oxide molar ratio of about 15:1, a sodium oxide to silica molar ratio of about 1.6:1 and a silica to alumina molar ratio of about 2.0:1. The resulting product was zeolite A which exhibited a calcium ion exchange capacity of 279 mg calcium carbonate/g zeolite and a magnesium ion exchange capacity of 155 mg magnesium carbonate/g zeolite. The resulting zeolite particles exhibit a narrow differential weight percent gaussian distribution with an average particle size of 1.8 microns with at least 90% of the weight between 0.1 and 4.0 microns. The cumulative percent population exhibits 53% less than one micron, with no more than 1 percent greater than 2.5 microns.

The compositions of the reaction mixtures used to prepare zeolite A are given in Table IV.

TABLE IV
COMPOSITION OF REACTION MIXTURE FOR THE PREPARATION OF ZEOLITE A

| Example | Water/Sodium Oxide | Sodium Oxide/Silica | Silica/Alumina | % Water | % Sodium Oxide | % Silica | % Alumina |
|---|---|---|---|---|---|---|---|
| 1 | 30 | 3.0 | 2.5 | 95.34 | 3.18 | 1.06 | 0.42 |
| 2 | 25 | 2.4 | 3.0 | 94.14 | 3.77 | 1.57 | 0.52 |
| 3 | 25 | 2.4 | 3.0 | 94.14 | 3.77 | 1.57 | 0.52 |
| 4 | 25 | 2.4 | 2.5 | 94.04 | 3.76 | 1.57 | 0.63 |
| 5 | 25 | 2.4 | 2.0 | 93.90 | 3.76 | 1.57 | 0.78 |
| 6 | 25 | 2.4 | 2.0 | 93.90 | 3.76 | 1.57 | 0.78 |
| 7 | 25 | 2.0 | 2.5 | 93.63 | 3.75 | 1.87 | 0.75 |
| 8 | 25 | 2.0 | 2.0 | 93.46 | 3.74 | 1.87 | 0.93 |
| 9 | 25 | 2.0 | 2.0 | 93.46 | 3.74 | 1.87 | 0.93 |
| 10 | 20 | 3.0 | 2.5 | 93.17 | 4.66 | 1.55 | 0.62 |
| 11 | 20 | 3.0 | 2.5 | 93.17 | 4.66 | 1.55 | 0.62 |
| 12 | 20 | 3.0 | 2.5 | 93.17 | 4.66 | 1.55 | 0.62 |
| 13 | 20 | 2.8 | 2.5 | 93.02 | 4.65 | 1.66 | 0.66 |
| 14 | 20 | 2.8 | 2.5 | 93.02 | 4.65 | 1.66 | 0.66 |
| 15 | 20 | 2.8 | 2.5 | 93.02 | 4.65 | 1.66 | 0.66 |
| 16 | 20 | 2.6 | 2.5 | 92.86 | 4.64 | 1.79 | 0.71 |
| 17 | 20 | 2.6 | 2.5 | 92.86 | 4.64 | 1.79 | 0.71 |
| 18 | 20 | 2.6 | 2.5 | 92.86 | 4.64 | 1.79 | 0.71 |
| 19 | 20 | 2.2 | 5.3 | 92.85 | 4.64 | 2.11 | 0.40 |
| 20 | 25 | 1.6 | 2.0 | 92.81 | 3.71 | 2.32 | 1.16 |
| 21 | 20 | 2.4 | 3.0 | 92.78 | 4.64 | 1.93 | 0.65 |
| 22 | 20 | 2.4 | 3.0 | 92.78 | 4.64 | 1.93 | 0.65 |
| 23 | 20 | 2.2 | 4.3 | 92.76 | 4.64 | 2.11 | 0.49 |
| 24 | 20 | 2.0 | 7.3 | 92.73 | 4.64 | 2.32 | 0.32 |
| 25 | 20 | 2.0 | 7.3 | 92.73 | 4.64 | 2.32 | 0.32 |
| 26 | 20 | 2.0 | 6.3 | 92.68 | 4.63 | 2.32 | 0.37 |
| 27 | 20 | 2.4 | 2.5 | 92.66 | 4.63 | 1.93 | 0.77 |
| 28 | 20 | 2.4 | 2.5 | 92.66 | 4.63 | 1.93 | 0.77 |
| 29 | 20 | 2.4 | 2.5 | 92.66 | 4.63 | 1.93 | 0.77 |
| 30 | 20 | 2.4 | 2.5 | 92.66 | 4.63 | 1.93 | 0.77 |
| 31 | 20 | 2.0 | 5.3 | 92.62 | 4.63 | 2.32 | 0.44 |
| 32 | 20 | 1.9 | 7.3 | 92.60 | 4.63 | 2.44 | 0.33 |
| 33 | 20 | 2.0 | 4.3 | 92.52 | 4.63 | 2.31 | 0.54 |
| 34 | 20 | 2.4 | 2.0 | 92.49 | 4.62 | 1.93 | 0.96 |
| 35 | 20 | 2.4 | 2.0 | 92.49 | 4.62 | 1.93 | 0.96 |
| 36 | 20 | 1.8 | 7.3 | 92.46 | 4.62 | 2.57 | 0.35 |
| 37 | 20 | 2.2 | 2.5 | 92.44 | 4.62 | 2.10 | 0.84 |
| 38 | 20 | 2.2 | 2.5 | 92.44 | 4.62 | 2.10 | 0.84 |
| 39 | 20 | 2.2 | 2.5 | 92.44 | 4.62 | 2.10 | 0.84 |
| 40 | 20 | 1.8 | 6.3 | 92.41 | 4.62 | 2.57 | 0.41 |
| 41 | 20 | 2.0 | 3.3 | 92.37 | 4.62 | 2.31 | 0.70 |
| 42 | 20 | 2.0 | 3.3 | 92.37 | 4.62 | 2.31 | 0.70 |
| 43 | 20 | 1.7 | 7.3 | 92.30 | 4.62 | 2.72 | 0.37 |
| 44 | 20 | 1.8 | 4.3 | 92.23 | 4.61 | 2.56 | 0.60 |
| 45 | 20 | 2.0 | 2.5 | 92.17 | 4.61 | 2.30 | 0.92 |
| 46 | 20 | 2.0 | 2.5 | 92.17 | 4.61 | 2.30 | 0.92 |
| 47 | 20 | 2.0 | 2.5 | 92.17 | 4.61 | 2.30 | 0.92 |
| 48 | 20 | 2.0 | 2.5 | 92.17 | 4.61 | 2.30 | 0.92 |
| 49 | 20 | 1.6 | 7.3 | 92.12 | 4.61 | 2.88 | 0.39 |
| 50 | 20 | 1.6 | 7.3 | 92.12 | 4.61 | 2.88 | 0.39 |
| 51 | 20 | 1.6 | 7.3 | 92.12 | 4.61 | 2.88 | 0.39 |
| 52 | 20 | 1.6 | 7.3 | 92.12 | 4.61 | 2.88 | 0.39 |
| 53 | 20 | 1.6 | 7.3 | 92.12 | 4.61 | 2.88 | 0.39 |
| 54 | 20 | 1.8 | 3.3 | 92.06 | 4.60 | 2.56 | 0.77 |
| 55 | 20 | 1.6 | 5.3 | 91.98 | 4.60 | 2.87 | 0.54 |
| 56 | 20 | 2.0 | 2.0 | 91.95 | 4.60 | 2.30 | 1.15 |
| 57 | 20 | 2.0 | 2.0 | 91.95 | 4.60 | 2.30 | 1.15 |
| 58 | 20 | 1.5 | 7.3 | 91.92 | 4.60 | 3.06 | 0.42 |
| 59 | 20 | 1.5 | 7.3 | 91.92 | 4.60 | 3.06 | 0.42 |
| 60 | 20 | 1.5 | 6.3 | 91.86 | 4.59 | 3.06 | 0.49 |
| 61 | 20 | 1.5 | 6.3 | 91.86 | 4.59 | 3.06 | 0.49 |
| 62 | 20 | 1.8 | 2.5 | 91.84 | 4.59 | 2.55 | 1.02 |
| 63 | 20 | 1.8 | 2.5 | 91.84 | 4.59 | 2.55 | 1.02 |
| 64 | 20 | 1.8 | 2.5 | 91.84 | 4.59 | 2.55 | 1.02 |
| 65 | 20 | 1.5 | 5.3 | 91.77 | 4.59 | 3.06 | 0.58 |
| 66 | 20 | 1.4 | 7.3 | 91.69 | 4.59 | 3.28 | 0.45 |
| 67 | 20 | 1.6 | 3.3 | 91.68 | 4.58 | 2.87 | 0.87 |
| 68 | 20 | 1.6 | 3.3 | 91.68 | 4.58 | 2.87 | 0.87 |
| 69 | 20 | 1.6 | 3.3 | 91.68 | 4.58 | 2.87 | 0.87 |
| 70 | 20 | 1.6 | 3.3 | 91.68 | 4.58 | 2.87 | 0.87 |
| 71 | 20 | 1.6 | 3.3 | 91.68 | 4.58 | 2.87 | 0.87 |
| 72 | 20 | 1.4 | 6.3 | 91.63 | 4.58 | 3.27 | 0.52 |
| 73 | 20 | 1.6 | 3.0 | 91.60 | 4.58 | 2.86 | 0.96 |
| 74 | 20 | 1.4 | 5.3 | 91.54 | 4.58 | 3.27 | 0.62 |
| 75 | 20 | 1.6 | 2.5 | 91.43 | 4.57 | 2.86 | 1.14 |
| 76 | 20 | 1.6 | 2.5 | 91.43 | 4.57 | 2.86 | 1.14 |
| 77 | 20 | 1.4 | 3.3 | 91.20 | 4.56 | 3.26 | 0.99 |
| 78 | 20 | 1.6 | 2.0 | 91.17 | 4.56 | 2.85 | 1.42 |
| 79 | 20 | 1.6 | 2.0 | 91.17 | 4.56 | 2.85 | 1.42 |
| 80 | 20 | 1.2 | 7.3 | 91.13 | 5.56 | 3.80 | 0.52 |
| 81 | 20 | 1.2 | 6.3 | 91.05 | 4.55 | 3.79 | 0.60 |
| 82 | 20 | 1.4 | 2.5 | 90.91 | 4.55 | 3.25 | 1.30 |
| 83 | 20 | 1.4 | 2.5 | 90.91 | 4.55 | 3.25 | 1.30 |
| 84 | 20 | 1.2 | 4.3 | 90.80 | 4.54 | 3.78 | 0.88 |
| 85 | 20 | 1.2 | 3.3 | 90.56 | 4.53 | 3.77 | 1.14 |
| 86 | 15 | 2.4 | 2.5 | 90.45 | 6.03 | 2.51 | 1.01 |
| 87 | 15 | 2.4 | 2.0 | 90.23 | 6.02 | 2.51 | 1.25 |
| 88 | 20 | 1.2 | 2.5 | 90.23 | 4.51 | 3.76 | 1.50 |
| 89 | 15 | 2.0 | 2.0 | 89.55 | 5.97 | 2.99 | 1.49 |
| 90 | 15 | 1.6 | 2.5 | 88.89 | 5.93 | 3.70 | 1.48 |
| 91 | 15 | 1.6 | 2.0 | 88.56 | 5.90 | 3.69 | 1.85 |
| 92 | 15 | 1.6 | 2.0 | 88.56 | 5.90 | 3.69 | 1.85 |

The exchange capacities for zeolite A are given in Table V.

TABLE V

EXCHANGE CAPACITY FOR ZEOLITE A

| Example | Silica/Alumina | Sodium Oxide/Alumina | % Alumina | Average Diameter | Calcium Capacity | Magnesium Capacity |
|---|---|---|---|---|---|---|
| 1 | 2.5 | 7.5 | 0.42 | 2.4 | 292 | 62 |
| 2 | 3.0 | 7.2 | 0.52 | 0.9 | 300 | 134 |
| 3 | 3.0 | 7.2 | 0.52 | 1.25 | 274 | 136 |
| 4 | 2.5 | 6.0 | 0.63 | 0.86 | 283 | 145 |
| 5 | 2.0 | 4.8 | 0.78 | 1.4 | 300 | 141 |
| 6 | 2.0 | 4.8 | 0.78 | 2.1 | 273 | 124 |
| 7 | 2.5 | 5.0 | 0.75 | 1.1 | 322 | 133 |
| 8 | 2.0 | 4.0 | 0.93 | 1.5 | 304 | 136 |
| 9 | 2.0 | 4.0 | 0.93 | 2.4 | 278 | 105 |
| 10 | 2.5 | 7.5 | 0.62 | 0.90 | 295 | 162 |
| 11 | 2.5 | 7.5 | 0.62 | 1.3 | 293 | 163 |
| 12 | 2.5 | 7.5 | 0.62 | 1.4 | 295 | 107 |
| 13 | 2.5 | 7.0 | 0.66 | 0.93 | 291 | 158 |
| 14 | 2.5 | 7.0 | 0.66 | 1.2 | 293 | 156 |
| 15 | 2.5 | 7.0 | 0.66 | 1.5 | 287 | 117 |
| 16 | 2.5 | 6.5 | 0.71 | 0.90 | 288 | 154 |
| 17 | 2.5 | 6.5 | 0.71 | 1.4 | 300 | 154 |
| 18 | 2.5 | 6.5 | 0.71 | 1.5 | 278 | 118 |
| 19 | 5.3 | 11.7 | 0.40 | 0.7 | 270 | 163 |
| 20 | 2.0 | 3.2 | 1.16 | 2.0 | 283 | 127 |
| 21 | 3.0 | 7.2 | 0.65 | 1.1 | 280 | 137 |
| 22 | 3.0 | 7.2 | 0.65 | 0.83 | 335 | 131 |
| 23 | 4.3 | 9.5 | 0.49 | 0.84 | 249 | 159 |
| 24 | 7.3 | 14.6 | 0.32 | 0.95 | 273 | 148 |
| 25 | 7.3 | 14.6 | 0.32 | 1.0 | 262 | 147 |
| 26 | 6.3 | 12.6 | 0.37 | 0.7 | 252 | 147 |
| 27 | 2.5 | 6.0 | 0.77 | 0.80 | 282 | 153 |
| 28 | 2.5 | 6.0 | 0.77 | 1.3 | 295 | 150 |
| 29 | 2.5 | 6.0 | 0.77 | 1.0 | 299 | 145 |
| 30 | 2.5 | 6.0 | 0.77 | 1.5 | 284 | 123 |
| 31 | 5.3 | 10.6 | 0.44 | 0.75 | 249 | 145 |
| 32 | 7.3 | 13.9 | 0.33 | 0.86 | 260 | 149 |
| 33 | 4.3 | 8.6 | 0.54 | 0.93 | 290 | 142 |
| 34 | 2.0 | 4.8 | .96 | 1.1 | 327 | 155 |
| 35 | 2.0 | 4.8 | 0.96 | 1.7 | 293 | 125 |
| 36 | 7.3 | 13.1 | 0.35 | 0.88 | 261 | 146 |
| 37 | 2.5 | 5.5 | 0.84 | 1.4 | 289 | 152 |
| 38 | 2.5 | 5.5 | 0.84 | 0.85 | 285 | 149 |
| 39 | 2.5 | 5.5 | 0.84 | 1.7 | 300 | 109 |
| 40 | 6.3 | 11.3 | 0.41 | 0.95 | 297 | 123 |
| 41 | 3.3 | 6.6 | 0.70 | 0.94 | 292 | 136 |
| 42 | 3.3 | 6.6 | 0.70 | 1.1 | 251 | 126 |
| 43 | 7.3 | 12.4 | 0.37 | 0.80 | 264 | 147 |
| 44 | 4.3 | 7.7 | 0.60 | 0.90 | 286 | 99 |
| 45 | 2.5 | 5.0 | 0.92 | 1.1 | 281 | 157 |
| 46 | 2.5 | 5.0 | 0.92 | 1.3 | 290 | 149 |
| 47 | 2.5 | 5.0 | 0.92 | 0.87 | 296 | 134 |
| 48 | 2.5 | 5.0 | 0.92 | 1.7 | 283 | 124 |
| 49 | 7.3 | 11.7 | 0.39 | 1.0 | 255 | 135 |
| 50 | 7.3 | 11.7 | 0.39 | 1.0 | 245 | 144 |
| 51 | 7.3 | 11.7 | 0.39 | 0.90 | 259 | 149 |
| 52 | 7.3 | 11.7 | 0.39 | 0.84 | 257 | 151 |
| 53 | 7.3 | 11.7 | 0.39 | 1.1 | 272 | 144 |
| 54 | 3.3 | 5.9 | 0.77 | 1.1 | 290 | 103 |
| 55 | 5.3 | 8.5 | 0.54 | 0.92 | 255 | 150 |
| 56 | 2.0 | 4.0 | 1.15 | 1.3 | 297 | 140 |
| 57 | 2.0 | 4.0 | 1.15 | 2.0 | 293 | 115 |
| 58 | 7.3 | 11.0 | 0.42 | 0.9 | 256 | 145 |
| 59 | 7.3 | 11.0 | 0.42 | 1.1 | 249 | 127 |
| 60 | 6.3 | 9.5 | 0.49 | 0.95 | 273 | 127 |
| 61 | 6.3 | 9.5 | 0.49 | 1.1 | 234 | 123 |
| 62 | 2.5 | 4.5 | 1.02 | 1.2 | 287 | 157 |
| 63 | 2.5 | 4.5 | 1.02 | 1.0 | 281 | 149 |
| 64 | 2.5 | 4.5 | 1.02 | 1.7 | 281 | 113 |
| 65 | 5.3 | 8.0 | 0.58 | 1.1 | 250 | 118 |
| 66 | 7.3 | 10.2 | 0.45 | 1.5 | 254 | 143 |
| 67 | 3.3 | 5.3 | 0.87 | 1.2 | 265 | 145 |
| 68 | 3.3 | 5.3 | 0.87 | 1.5 | 248 | 136 |
| 69 | 3.3 | 5.3 | 0.87 | 1.4 | 264 | 128 |
| 70 | 3.3 | 5.3 | 0.87 | 1.4 | 254 | 127 |
| 71 | 3.3 | 5.3 | 0.87 | 1.7 | 239 | 92 |
| 72 | 6.3 | 8.8 | 0.52 | 1.6 | 307 | 145 |
| 73 | 3.0 | 4.8 | 0.96 | 0.95 | 292 | 135 |
| 74 | 5.3 | 7.4 | 0.62 | 1.4 | 278 | 148 |
| 75 | 2.5 | 4.0 | 1.14 | 1.2 | 288 | 160 |
| 76 | 2.5 | 4.0 | 1.14 | 2.0 | 278 | 86 |
| 77 | 3.3 | 4.6 | 0.99 | 1.3 | 272 | 121 |
| 78 | 2.0 | 3.2 | 1.42 | 1.2 | 311 | 118 |
| 79 | 2.0 | 3.2 | 1.42 | 2.2 | 300 | 119 |
| 80 | 7.3 | 8.8 | 0.52 | 1.6 | 241 | 144 |
| 81 | 6.3 | 7.6 | 0.60 | 1.4 | 330 | 144 |
| 82 | 2.5 | 3.5 | 1.30 | 1.3 | 286 | 145 |
| 83 | 2.5 | 3.5 | 1.30 | 1.9 | 288 | 112 |
| 84 | 4.3 | 5.2 | 0.88 | 1.2 | 290 | 148 |
| 85 | 3.3 | 4.0 | 1.14 | 1.6 | 274 | 153 |
| 86 | 2.5 | 6.0 | 1.01 | 0.92 | 315 | 157 |
| 87 | 2.0 | 4.8 | 1.25 | 1.4 | 289 | 140 |
| 88 | 2.5 | 3.0 | 1.50 | 1.6 | 273 | 134 |
| 89 | 2.0 | 4.0 | 1.49 | 0.97 | 275 | 145 |
| 90 | 2.5 | 4.0 | 1.48 | 1.2 | 274 | 129 |
| 91 | 1.6 | 3.2 | 1.85 | 1.4 | 312 | 143 |
| 92 | 1.6 | 3.2 | 1.85 | 1.8 | 279 | 155 |

A linear regression analysis was performed upon the above data, with correlation coefficients (r) calculated for certain variables. This analysis showed a definite correlation between magnesium exchange capacity and average particle size (r= −0.581). Based on this sample, there is less than a 1% probability that no correlation exists between these two variables. There is less than a 1% probability that there is no correlation between silica to alumina molar ratio and average particle size (r= −0.405); between sodium oxide to alumina molar ratio and average particle size (r= −0.469); and between alumina concentration and average particle size (r= +0.465). Thus, the average particle size and the magnesium exchange capacity can be controlled by adjusting either the silica to alumina molar ratio or the sodium oxide to alumina molar ratio or the alumina concentration.

Thus, in operation, a zeolite A of small and uniform size having a high magnesium exchange capacity can be formed by forming a sodium aluminate solution and a sodium silicate solution, adding the sodium aluminate solution to the sodium silicate solution to produce a reaction mixture having a water to sodium oxide molar ratio of from 15:1 to 30:1, a sodium oxide to silica molar ratio of from 1.2:1 to 3:1, and a silica to alumina molar ratio of from 2:1 and 8:1, then heating and reacting the mixture until the zeolite A is formed.

PREPARATION OF ZEOLITE X

EXAMPLE NINETY THREE

A sodium silicate solution of composition 3.0% sodium oxide and 7.3% silica was heated to 90 degrees Celsius. Sodium aluminate solution, also at 90 degrees Celsius, of composition 29.7% sodium oxide and 5.2% alumina was added to the sodium silicate so that all of the sodium aluminate solution was added within thirty seconds. The resulting gel was broken down by agitation until a homogeneous slurry was obtained. The batch was then reacted at 100 degrees Celsius for eight hours. The total batch composition had a water to sodium oxide molar ratio of about 30:1, a sodium oxide to silica molar ratio of about 1.7:1 and a silica to alumina molar ratio of about 7.3:1. The resulting product was zeolite X which exhibited a calcium ion exchange capacity of 244 mg calcium carbonate/g zeolite and a magnesium ion exchange capacity of 135 mg magnesium carbonate/g zeolite. The resulting zeolite particles exhibit a narrow differential weight percent gaussian distribution with an average particle size of 2.0 microns with at least 90% of the weight between 0.1 and 5 microns. The cumulative percent population exhibits 48% less than one micron, with no more than 3 percent greater than 2.5 microns.

EXAMPLE NINETY FOUR

A sodium silicate solution of composition 3.2% sodium oxide and 7.7% silica was heated to 90 degrss Celsius. Sodium aluminate solution, also at 90 degrss Celsius, of composition 29% sodium oxide and 5.5% alumina was added to the sodium silicate so that all of the sodium aluminate solution was added within thirty seconds. The resulting gel was broken down by agitation until a homogeneous slurry was obtained. The batch was then reacted at 100 degrees Celsius for six hours. The total batch composition had a water to sodium oxide molar ratio of about 30:1, a sodium oxide to silica molar ratio of about 1.6:1 and a silica to alumina molar ratio of about 7.3:1. The resulting product was zeolite X which exhibited a calcium ion exchange capacity of 227 mg calcium carbonate/g zeolite and a magnesium ion exchange capacity of 140 mg magnesium carbonate/g zeolite. The resulting zeolite particles exhibit a narrow differential weight percent gaussian distribution with an average particle size of 1.7 microns with at least 90% of the weight between 0.1 and 3.2 microns. The cumulative percent population exhibits 49% less than one micron, with no more than 5 percent greater than 2.0 microns.

EXAMPLE NINETY FIVE

A sodium silicate solution of composition 4.2% sodium oxide and 10.2% silica was heated to 90 degrees Celsius. Sodium aluminate solution, also at 90 degrees Celsius, of composition 17% sodium oxide and 3.6% alumina was added to the sodium silicate so that all of the sodium aluminate solution was added within thirty seconds. The resulting gel was broken down by agitation until a homogeneous slurry was obtained. The batch was then reacted at 100 degrees Celsius for eight hours. The total batch composition had a water to sodium oxide molar ratio of about 30:1, a sodium oxide to silica molar ratio of about 1.5:1 and a silica to alumina molar ratio of about 7.3:1. The resulting product was zeolite X which exhibited a calcium ion exchange capacity of 228 mg calcium carbonate/g zeolite and a magnesium ion exchange capacity of 139 mg magnesium carbonate/g zeolite. The resulting zeolite particles exhibit a narrow differential weight percent gaussian distribution with an average particle size of 2.2 microns with at least 90% of the weight between 0.1 and 4.0 microns. The cumulative percent population exhibits 41% less than one micron, with no more than 2 percent greater than 3.2 microns.

EXAMPLE NINETY SIX

A sodium silicate solution of composition 4.2% sodium oxide and 10.2% silica was heated to 90 degrees Celsius. Sodium aluminate solution, also at 90 degrees Celsius, of composition 17% sodium oxide and 3.6% alumina was added to the sodium silicate so that all of the sodium aluminate solution was added within thirty seconds. The resulting gel was broken down by agitation until a homogeneous slurry was obtained. The batch was then reacted at 100 degrees Celsius for eight hours. The total batch composition had a water to sodium oxide molar ratio of about 30:1, a sodium oxide to silica molar ratio of about 1.5:1 and a silica to alumina molar ratio of about 7.3:1. The resulting product was zeolite X which exhibited a calcium ion exchange capacity of 209 mg calcium carbonate/g zeolite and a magnesium ion exchange capacity of 136 mg magnesium carbonate/g zeolite. The resulting zeolite particles exhibit a narrow differential weight percent gaussian distribution with an average particle size of 2.8 microns with at least 90% of the weight between 0.1 and 6 microns. The cumulative percent population exhibits 46% less than one micron, with no more than 3 percent greater than 3.2 microns.

EXAMPLE NINETY SEVEN

A sodium silicate solution of composition 3.4% sodium oxide and 8.3% silica was heated to 90 degrees Celsius. Sodium aluminate solution, also at 90 degrees Celsius, of composition 25.9% sodium oxide and 7.3% alumina was added to the sodium silicate so that all of the sodium aluminate solution was added within thirty seconds. The resulting gel was broken down by agitation until a homogeneous slurry was obtained. The batch was then reacted at 100 degrees Celsius for eight hours. The total batch composition had a water to sodium oxide molar ratio of about 30:1, a sodium oxide to silica molar ratio of about 1.5:1 and a silica to alumina molar ratio of about 5.3:1. The resulting product was zeolite X which exhibited a calcium ion exchange capacity of 225 mg calcium carbonate/g zeolite and a magnesium ion exchange capacity of 140 mg magnesium carbonate/g zeolite. The resulting zeolite particles exhibit a narrow differential weight percent gaussian distribution with an average particle size of 2.2 microns with at least 90% of the weight between 0.1 and 4.0 microns. The cumulative percent population exhibits 45% less than one micron, with no more than 4 percent greater than 2.5 microns.

EXAMPLE NINETY EIGHT

A sodium silicate solution of composition 3.6% sodium oxide and 8.6% silica was heated to 90 degrees Celsius. Sodium aluminate solution, also at 90 degrees Celsius, of composition 27.8% sodium oxide and 6.3% alumina was added to the sodium silicate so that all of the sodium aluminate solution was added within thirty seconds. The resulting gel was broken down by agitation until a homogeneous slurry was obtained. The batch was then reacted at 100 degrees Celsius for eight hours. The total batch composition had a water to sodium oxide molar ratio of about 30:1, a sodium oxide to silica molar ratio of about 1.4:1 and a silica to alumina molar ratio of about 7.3:1. The resulting product was zeolite X which exhibited a calcium ion exchange capacity of 235 mg calcium carbonate/g zeolite and a magnesium ion exchange capacity of 155 mg magnesium carbonate/g zeolite. The resulting zeolite particles exhibit a narrow differential weight percent gaussian distribution with an average particle size of 1.5 microns with at least 90% of the weight between 0.1 and 3.2 microns. The cumulative percent population exhibits 52% less than one micron, with no more than 5 percent greater than 2.0 microns.

The compositions of the reaction mixtures used to prepare zeolite X are given in Table VI.

TABLE VI

COMPOSITION OF REACTION MIXTURE FOR THE PREPARATION OF ZEOLITE X

| Example | Water/ Sodium Oxide | Sodium Oxide/ Silica | Silica/ Alumina | % Water | % Sodium Oxide | % Silica | % Alumina |
|---|---|---|---|---|---|---|---|
| 93 | 30 | 1.7 | 7.3 | 94.73 | 3.16 | 1.86 | 0.25 |
| 94 | 30 | 1.6 | 7.3 | 94.61 | 3.15 | 1.97 | 0.27 |
| 95 | 30 | 1.5 | 7.3 | 94.46 | 3.15 | 2.10 | 0.29 |
| 96 | 30 | 1.5 | 7.3 | 94.46 | 3.15 | 2.10 | 0.29 |
| 97 | 30 | 1.5 | 5.3 | 94.36 | 3.15 | 2.10 | 0.40 |
| 98 | 30 | 1.4 | 7.3 | 94.30 | 3.14 | 2.25 | 0.31 |

The exchange capacities for zeolite X are given in Table VII.

TABLE VII

EXCHANGE CAPACITY FOR ZEOLITE X

| Example | Silica/ Alumina | Sodium Oxide/ Alumina | % Alumina | Average Diameter | Calcium Capacity | Magnesium Capacity |
|---|---|---|---|---|---|---|
| 93 | 7.3 | 12.4 | 0.25 | 2.0 | 244 | 135 |
| 94 | 7.3 | 11.7 | 0.27 | 1.7 | 227 | 140 |
| 95 | 7.3 | 11.0 | 0.29 | 2.2 | 228 | 139 |
| 96 | 7.3 | 11.0 | 0.29 | 2.8 | 209 | 136 |
| 97 | 5.3 | 8.0 | 0.40 | 2.2 | 225 | 140 |
| 98 | 7.3 | 10.2 | 0.31 | 1.5 | 235 | 155 |

Thus, in operation, a zeolite X of small and uniform size having a high magnesium exchange capacity can be formed by forming a sodium aluminate solution and a sodium silicate solution, adding the sodium aluminate solution to the sodium silicate solution to produce a reaction mixture having a water to sodium oxide molar ratio of about 30:1; a sodium oxide to silica molar ratio of between 1.3:1 and 1.8:1; and a silica to alumina molar ratio of between 5:1 and 8:1, then heating and reacting the mixture until zeolite X is formed.

COMBINATION OF ZEOLITES A AND X

EXAMPLE NINETY NINE

A sodium silicate solution of composition 2.6% sodium oxide and 6.3% silica was heated to 90 degrees Celsius. Sodium aluminate solution, also at 90 degrees Celsius, of composition 31.1% sodium oxide and 4.4% alumina was added to the sodium silicate so that all of the sodium aluminate solution was added within thirty seconds. The resulting gel was broken down by agitation until a homogeneous slurry was obtained. The batch was then reacted at 100 degress Celsius for four hours. The total batch composition had a water to sodium oxide molar ratio of about 30:1, a sodium oxide to silica molar ratio of about 2.0:1 and a silica to alumina molar ratio of about 7.3:1. The resulting product was a combination of 60% zeolite A and 40% zeolite X which exhibited a calcium ion exchange capacity of 255 mg calcium carbonate/g zeolite and a magnesium ion exchange capacity of 130 mg magnesium carbonate/g zeolite. The resulting zeolite particles exhibit a narrow differential weight percent gaussian distribution with an average particle size of 2.0 microns with at least 90% of the weight between 0.1 and 4.0 microns. The cumulative percent population exhibits 45% less than one micron, with no more than 3 percent greater than 2.5 microns.

EXAMPLE ONE HUNDRED

A sodium silicate solution of composition 2.7% sodium oxide and 6.6% silica was heated to 90 degrees Celsius. Sodium aluminate solution, also at 90 degrees Celsius, of composition 30.7% sodium oxide and 4.6% alumina was added to the sodium silicate so that all of the sodium aluminate solution was added within thirty seconds. The resulting gel was broken down by agitation until a homogeneous slurry was obtained. The batch was then reacted at 100 degrees Celsius for four hours. The total batch composition had a water to sodium oxide molar ratio of about 30:1, a sodium oxide to silica molar ratio of about 1.9:1 and a silica to alumina molar ratio of about 7.3:1. The resulting product was a combination of 80% zeolite A and 20% zeolite X which exhibited a calcium ion exchange capacity of 240 mg calcium carbonate/g zeolite and a magnesium ion exchange capacity of 135 mg magnesium carbonate/g zeolite. The resulting zeolite particles exhibit a narrow differential weight percent gaussian distribution with an average particle size of 1.7 microns with at least 90% of the weight between 0.1 and 3.2 microns. The cumulative percent population exhibits 48% less than one micron, with no more than 1 percent greater than 2.5 microns.

EXAMPLE ONE HUNDRED ONE

A sodium silicate solution of composition 2.8% sodium oxide and 6.9% silica was heated to 90 degrees Celsius. Sodium aluminate solution, also at 90 degrees Celsius, of composition 30.2% sodium oxide and 4.9% alumina was added to the sodium silicate so that all of the sodium aluminate solution was added within thirty seconds. The resulting gel was broken down by agitation until a homogeneous slurry was obtained. The batch was then reacted at 100 degrees Celsius for four hours. The total batch composition had a water to sodium oxide molar ratio of about 30:1, a sodium oxide to silica molar ratio of about 1.8:1 and a silica to alumina molar ratio of about 7.3:1. The resulting product was a combination of 75% zeolite A and 25% zeolite X which exhibited a calcium ion exchange capacity of 228 mg calcium carbonate/g zeolite and a magnesium ion exchange capacity of 139 mg magnesium carbonate/g zeolite. The resulting zeolite particles exhibit a narrow differential weight percent gaussian distribution with an average particle size of 1.8 microns with at least 90% of the weight between 0.1 and 4.0 microns. The cumulative percent population exhibits 40% less than one micron, with no more than 2 percent greater than 2.5 microns.

EXAMPLE ONE HUNDRED TWO

A sodium silicate solution of composition 3.0% sodium oxide and 7.3% silica was heated to 90 degrees Celsius. Sodium aluminate solution, also at 90 degrees Celsius, of composition 28.7% sodium oxide and 5.8% alumina was added to the sodium silicate so that all of the sodium aluminate solution was added within thirty seconds. The resulting gel was broken down by agitation until a homogeneous slurry was obtained. The batch was then reacted at 100 degrees Celsius for six hours. The total batch composition had a water to sodium oxide molar ratio of about 30:1, a sodium oxide to silica molar ratio of about 1.7:1 and a silica to alumina molar ratio of about 6.3:1. The resulting product was a combination of 50% zeolite A and 50% zeolite X which exhibited a calcium ion exchange capacity of 224 mg calcium carbonate/g zeolite and a magnesium ion exchange capacity of 141 mg magnesium carbonate/g zeolite. The resulting zeolite particles exhibit a narrow differential weight percent gaussian distribution with an average particle size of 1.9 microns with at least 90% of the weight between 0.1 and 3.2 microns. The cumulative percent population exhibits 38% less than one micron, with no more than 2 percent greater than 2.5 microns.

EXAMPLE ONE HUNDRED THREE

A sodium silicate solution of composition 3.1% sodium oxide and 7.4% silica was heated to 90 degrees Celsius. Sodium aluminate solution, also at 90 degrees Celsius, of composition 27.3% sodium oxide and 6.5% alumina was added to the sodium silicate so that all of the sodium aluminate solution was added within thirty seconds. The resulting gel was broken down by agitation until a homogeneous slurry was obtained. The batch was then reacted at 100 degrees Celsius for four hours. The total batch composition had a water to sodium oxide molar ratio of about 30:1, a sodium oxide to silica molar ratio of about 1.7:1 and a silica to alumina molar ratio of about 5.3:1. The resulting product was a combination of 55% zeolite A and 45% zeolite X which exhibited a calcium ion exchange capacity of 229 mg calcium carbonate/g zeolite and a magnesium ion exchange capacity of 138 mg magnesium carbonate/g zeolite. The resulting zeolite particles exhibit a narrow differential weight percent gaussian distribution with an average particle size of 1.9 microns with at least 90% of the weight between 0.1 and 4.0 microns. The cumulative percent population exhibits 41% less than one micron, with no more than 3 percent greater than 2.5 microns.

EXAMPLE ONE HUNDRED FOUR

A sodium silicate solution of composition 3.2% sodium oxide and 7.7% silica was heated to 90 degrees Celsius. Sodium aluminate solution, also at 90 degrees Celsius, of composition 28.1% sodium oxide and 6.1% alumina was added to the sodium silicate so that all of the sodium aluminate solution was added within thirty seconds. The resulting gel was broken down by agitation until a homogeneous slurry was obtained. The batch was then reacted at 100 degrees Celsius for six hours. The total batch composition had a water to sodium oxide molar ratio of about 30:1, a sodium oxide to silica molar ratio of about 1.6:1 and a silica to alumina molar ratio of about 6.3:1. The resulting product was a combination of 25% zeolite A and 75% zeolite X which exhibited a calcium ion exchange capacity of 221 mg calcium carbonate/g zeolite and a magnesium ion exchange capacity of 130 mg magnesium carbonate/g zeolite. The resulting zeolite particles exhibit a narrow differential weight percent gaussian distribution with an average particle size of 2.7 microns with at least 90% of the weight between 0.1 and 5.0 microns. The cumulative percent population exhibits 41% less than one micron, with no more than 3 percent greater than 3.2 microns.

ONE HUNDRED FIVE

A sodium silicate solution of composition 3.2% sodium oxide and 7.8% silica was heated to 90 degrees Celsius. Sodium aluminate solution, also at 90 degrees Celsius, of composition 26.7% sodium oxide and 6.9% alumina was added to the sodium silicate so that all of the sodium aluminate solution was added within thirty seconds. The resulting gel was broken down by agitation until a homogeneous slurry was obtained. The batch was then reacted at 100 degrees Celsius for eight hours. The total batch composition had a water to sodium oxide molar ratio of about 30:1, a sodium oxide to silica molar ratio of about 1.6:1 and a silica to alumina molar ratio of about 5.3:1. The resulting product was a combination of 35% zeolite A and 65% zeolite X which exhibited a calcium ion exchange capacity of 304 mg calcium carbonate/g zeolite and a magnesium ion exchange capacity of 130 mg magnesium carbonate/g zeolite. The resulting zeolite particles exhibit a narrow differential weight percent gaussian distribution with an average particle size of 2.7 microns with at least 90% of the weight between 0.1 and 4.0 microns. The cumulative percent population exhibits 42% less than one micron, with no more than 4 percent greater than 3.2 microns.

EXAMPLE ONE HUNDRED SIX

A sodium silicate solution of composition 3.4% sodium oxide and 8.3% silica was heated to 95 degrees Celsius. A sodium aluminate solution of composition 25.9% sodium oxide and 7.3% alumina was also heated to 95 degrees Celsius. The two solutions were combined simultaneously with agitation over a period of 5 minutes. The resulting gel was broken down by agitation until a homogeneous slurry was obtained. The batch was then reacted at 100 degrees Celsius for five hours. The total batch composition had a water to sodium oxide molar ratio of about 30:1, a sodium oxide to silica molar ratio of about 1.5:1 and a silica to alumina molar ratio of about 5.3:1. The resulting product was a combination of 60% zeolite A and 40% zeolite X which exhibited a calcium ion exchange capacity of 235 mg calcium carbonate/g zeolite and a magnesium ion exchange capacity of 143 mg magnesium carbonate/g zeolite. The resulting zeolite particles exhibit a narrow differential weight percent gaussian distribution with an average particle size of 3.3 microns with at least 90% of the weight between 0.1 and 6.4 microns. The cumulative percent population exhibits 42% less than one micron, with no more than 2 percent greater than 4.0 microns.

EXAMPLE ONE HUNDRED SEVEN

A sodium silicate solution of composition 7.6% sodium oxide and 18.4% silica was heated to 90 degrees Celsius. Sodium aluminate solution, also at 90 degrees Celsius, of composition 21.6% sodium oxide and 9.8% alumina was added to the sodium silicate so that all of the sodium aluminate solution was added within thirty seconds. The resulting gel was broken down by agitation until a homogeneous slurry was obtained. The batch was then reacted at 100 degrees Celsius for four hours. The total batch composition had a water to sodium oxide molar ratio of about 30:1, a sodium oxide to silica molar ratio of about 1.5:1 and a silica to alumina molar ratio of about 3.3:1. The resulting product was a combination of 35% zeolite A and 65% zeolite X which exhibited a calcium ion exchange capacity of 257 mg calcium carbonate/g zeolite and a magnesium ion exchange capacity of 150 mg magnesium carbonate/g zeolite. The resulting zeolite particles exhibit a narrow differential weight percent gaussian distribution with an average particle size of 2.9 microns with at least 90% of the weight between 0.1 and 5.0 microns. The cumulative percent population exhibts 42% less than one micron, with no more than 4 percent greater than 3.2 microns.

EXAMPLE ONE HUNDRED EIGHT

A sodium silicate solution of composition 3.8% sodium oxide and 9.3% silica was heated to 90 degrees Celsius. Sodium aluminate solution, also at 90 degrees Celsius, of composition 18.9% sodium oxide and 11.3% alumina was added to the sodium silicate so that all of the sodium aluminate solution was added within thirty seconds. The resulting gel was broken down by agitation until a homogeneous slurry was obtained. The batch was then reacted at 100 degrees Celsius for four hours. The total batch composition had a water to sodium oxide molar ratio of about 30:1, a sodium oxide to silica molar ratio of about 1.5:1 and a silica to alumina molar ratio of about 2.5:1. The resulting product was a combination of 65% zeolite A and 35% zeolite X which exhibited a calcium ion exchange capacity of 256 mg calcium carbonate/g zeolite and a magnesium ion exchange capacity of 118 mg magnesium carbonate/g zeolite. The resulting zeolite particles exhibit a narrow differential weight percent gaussian distribution with an average particle size of 4.0 microns with at least 90% of the weight between 0.1 and 8.0 microns. The cumulative percent population exhibits 37% less than one micron, with no more than 2 percent greater than 5.0 microns.

EXAMPLE ONE HUNDRED NINE

A sodium silicate solution of composition 3.8% sodium oxide and 9.3% silica was heated to 90 degrees Celsius. Sodium aluminate solution, also at 90 degrees Celsius, of composition 18.9% sodium oxide and 11.3% alumina was added to the sodium silicate so that all of the sodium aluminate solution was added within five minutes. The resulting gel was broken down by agitation until a homogeneous slurry was obtained. The batch was then reacted at 100 degrees Celsius for six hours. The total batch composition had a water to sodium oxide molar ratio of about 30:1, a sodium oxide to silica molar ratio of about 1.5:1 and a silica to alumina molar ratio of about 2.5:1. The resulting product was a combination of 20% zeolite A and 80% zeolite X which exhibited a calcium ion exchange capacity of 303 mg calcium carbonate/g zeolite and a magnesium ion exchange capacity of 129 mg magnesium carbonate/g zeolite. The resulting zeolite particles exhibit a narrow differential weight percent gaussian distribution with an average particle size of 5.4 microns with at least 90% of the weight between 0.1 and 10.0 microns. The cumulative percent population exhibits 44% less than one micron, with no more than 5 percent greater than 5 microns.

The compositions of the reaction mixtures used to prepare the combinations of zeolite A and zeolite X are given in Table VIII.

TABLE VIII

COMPOSITION OF REACTION MIXTURE FOR THE PREPARATION OF ZEOLITE A AND ZEOLITE X

| Example | Water/ Sodium Oxide | Sodium Oxide/ Silica | Silica/ Alumina | % Water | % Sodium Oxide | % Silica | % Alumina |
|---|---|---|---|---|---|---|---|
| 99 | 30 | 2.0 | 7.3 | 95.03 | 3.17 | 1.58 | 0.22 |
| 100 | 30 | 1.9 | 7.3 | 94.94 | 3.17 | 1.67 | 0.23 |
| 101 | 30 | 1.8 | 7.3 | 94.84 | 3.16 | 1.76 | 0.24 |
| 102 | 30 | 1.7 | 6.3 | 94.69 | 3.16 | 1.86 | 0.30 |
| 103 | 30 | 1.7 | 5.3 | 94.64 | 3.16 | 1.86 | 0.35 |
| 104 | 30 | 1.6 | 6.3 | 94.57 | 3.15 | 1.97 | 0.31 |
| 105 | 30 | 1.6 | 5.3 | 94.51 | 3.15 | 1.97 | 0.37 |
| 106 | 30 | 1.5 | 5.3 | 94.36 | 3.15 | 2.10 | 0.40 |
| 107 | 30 | 1.5 | 3.3 | 94.14 | 3.14 | 2.09 | 0.63 |
| 108 | 30 | 1.5 | 2.5 | 93.95 | 3.13 | 2.09 | 0.84 |
| 109 | 30 | 1.5 | 2.5 | 93.95 | 3.13 | 2.09 | 0.84 |

The exchange capacities for the combinations of zeolite A and zeolite X are given in Table IX.

TABLE IX

EXCHANGE CAPACITY FOR A COMBINATION OF ZEOLITE A AND ZEOLITE X

| Example | Silica/ Alumina | Sodium Oxide/ Alumina | % Alumina | Average Diameter | Calcium Capacity | Magnesium Capacity |
|---|---|---|---|---|---|---|
| 99 | 7.3 | 14.6 | 0.22 | 2.0 | 255 | 130 |
| 100 | 7.3 | 13.9 | 0.23 | 1.7 | 240 | 135 |
| 101 | 7.3 | 13.1 | 0.24 | 1.8 | 228 | 139 |
| 102 | 6.3 | 10.7 | 0.34 | 1.9 | 224 | 141 |
| 103 | 5.3 | 9.0 | 0.35 | 1.9 | 229 | 138 |
| 104 | 6.3 | 10.1 | 0.31 | 2.7 | 221 | 130 |
| 105 | 5.3 | 8.5 | 0.37 | 2.7 | 304 | 130 |
| 106 | 5.3 | 8.0 | 0.40 | 3.3 | 235 | 143 |
| 107 | 3.3 | 5.0 | 0.63 | 2.9 | 257 | 150 |
| 108 | 2.5 | 3.8 | 0.84 | 4.0 | 256 | 118 |
| 109 | 2.5 | 3.8 | 0.84 | 5.4 | 303 | 129 |

Thus, in operation, a combination of zeolite A and Zeolite X can be formed by forming a sodium aluminate solution and a sodium silicate solution, adding the sodium aluminate solution to the sodium silicate solution to produce a reaction mixture having a sodium oxide to silica molar ratio of between 1.4:1 and 2.1:1, a silica to alumina molar ratio of between 2:1 and 7.5:1, and a water to sodium oxide molar ratio of about 30:1, then heating and reacting the mixture until the combination of zeolite A and zeolite X is formed.

ACTIVATION WITH ALUMINA

EXAMPLE ONE HUNDRED TEN

A soium silicate solution of composition 3.4% sodium oxide and 8.5% silica was activated with 600 ppm alumina from a sodium aluminate solution. The sodium silicate solution was heated to 70 degrees Celsius. Sodium aluminate solution, also at 70 degrees Celsius, of composition 24.2% sodium oxide and a 8.3% alumina was added to the sodium silicate so that all of the sodium aluminate solution was added within thirty seconds. The resulting gel was broken down by agitation until a homogeneous slurry was obtained. The batch was then reacted at 80 degrees Celsius for two and one half hours. The total batch composition had a water to sodium oxide molar ratio of about 25:1, a sodium oxide to silica molar ratio of about 2:1, and a silica to alumina molar ratio of about 3:1. The resulting product was zeolite A which exhibited good calcium ion and magnesium ion exchange properties. The resulting zeolite particles exhibit a narrow differential weight percent gaussian distribution with an average particle size of 1.1 microns with at least 90% of the weight between 0.1 and 2.0 microns. The cumulative percent population exhibits 78% less than one micron, with no more than 2 percent greater than 1.6 microns.

EXAMPLE ONE HUNDRED ELEVEN

A sodium silicate solution of composition 4.0% sodium oxide and 10.0% silica was activated with 600 ppm alumina from a sodium aluminate solution. The sodium silicate solution was heated to 70 degrees Celsius. Sodium aluminate solution, also at 70 degrees Celsius, of composition 25.6% sodium oxide and 7.5% alumina was added to the sodium silicate so that all of the sodium aluminate solution was added within thirty seconds. The resulting gel was broken down by agitation until a homogeneous slurry was obtained. The batch was then reacted at 80 degrees Celsius for twenty two hours. The total batch composition had a water to sodium oxide molar ratio of about 30:1, a sodium oxide to silica molar ratio of about 1:2, and a silica to alumina molar ratio of about 7:1. The resulting product was zeolite X which exhibited both good calcium ion and magnesium ion exchange capacity. The resulting zeolite particles exhibit a narrow differential weight percent gaussian distribution with an average particle size of 2.0 microns with at least 90% of the weight between 0.1 and 3.2 microns. The cumulative percent population exhibits 52% less than one micron, with no more than 1 percent greater than 4.0 microns.

EXAMPLE ONE HUNDRED TWELVE

A sodium silicate solution of composition 3.6% sodium oxide and 9.0% silica was activated with 600 ppm alumina from a sodium aluminate solution. The sodium silicate was then heated to 70 degrees Celsius for thirty minutes. At that time a sodium aluminate solution, also at 70 degrees Celsius, of composition 29.5% sodium oxide and 5.3% alumina was added to the sodium silicate so that all of the sodium aluminate solution was added within thirty seconds. The resulting gel was broken down by agitation until a homogeneous slurry was obtained. The batch was then reacted at 80 degrees Celsius for six hours. The total batch composition had a water to sodium oxide molar ratio of about 25:1, a sodium oxide to silica molar ratio of about 1.7:1 and a silica to alumina molar ratio of about 7:1. The resulting product was a combination of 40% zeolite X and 60% zeolite A, this product exhibiting both good calcium ion and magnesium ion exchange capacity. The resulting zeolite particles exhibit a narrow differential weight percent gaussian distribution with an average particle size of 0.8 microns with at least 90% of the weight between 0.1 and 3.2 microns. The cumulative percent population exhibits 96% less than one micron, with no more than 1 percent greater than 1.3 microns.

The compositions of the reaction mixtures used to prepare zeolites from sodium silicate solutions activated with alumina are given in Table X.

TABLE X
COMPOSITION OF REACTION MIXTURE FOR THE PREPARATION OF ZEOLITES ACTIVATED WITH ALUMINA

| Example | Water/ Sodium Oxide | Sodium Oxide/ Silica | Silica/ Alumina | % Water | % Sodium Oxide | % Silica | % Alumina |
|---|---|---|---|---|---|---|---|
| 110 | 25 | 2.0 | 3.0 | 80.51 | 11.08 | 5.37 | 3.04 |
| 111 | 30 | 1.2 | 7.0 | 81.31 | 9.33 | 7.53 | 1.83 |
| 112 | 25 | 1.7 | 7.0 | 80.97 | 11.14 | 6.35 | 1.54 |

The exchange capacities for zeolites prepared from sodium silicate solutions activated with alumina are given in Table XI.

TABLE XI
EXCHANGE CAPACITY FOR ZEOLITES ACTIVATED WITH ALUMINA

| Example | Silica/ Alumina | Sodium Oxide/ Alumina | % Alumina | Average Diameter | Calcium Capacity | Magnesium Capacity |
|---|---|---|---|---|---|---|
| 110 | 3.0 | 6.0 | 3.04 | 1.1 | 277 | 175 |
| 111 | 7.0 | 8.4 | 1.83 | 2.0 | 252 | 147 |
| 112 | 7.0 | 11.9 | 1.54 | 0.8 | 284 | 139 |

Thus, in operation, either zeolite X, zeolite A or a combination of the two can be formed by dissolving sand in a sodium hydroxide solution to form a sodium silicate solution, activating it with alumina, forming a sodium aluminate solution, quickly adding the sodium aluminate solution to the activated sodium silicate solution to form a mixture having certain composition, reacting the mixture at a temperature of from 40 to 120 degrees Celsius until a zeolite is formed, then recovering the zeolite. The type of zeolite formed depends on the composition of the reaction mixture.

Water Softening Compositions

A water softening composition can be formed containing a binding agent, a solubilizing agent, water and the zeolites of the present invention. Either zeolite A, zeolite X or a combination of the two can be used. U.S. patent application Ser. No. 050,938, filed June 21, 1979 is incorporated by reference to show a method of forming such a water softening composition.

Sodium silicate is used as the binding agent, with the silica to sodium oxide ratio being between 1:1 and 3.3:1, preferably about 2.5:1 since that is the most common molar ratio found in detergent formulations. At least 1% sodium silicate is required to bind the bead, but more than 20% sodium silicate limits the amount of sodium silicate that can be added to the system without enough improvement in bead strength to justify the lower alumino silicate levels. The most preferred binding agent would be a sodium polysilicate having a silica to sodium oxide ratio of 2.5:1 made by the process described in U.S. Pat. No. 3,838,192 which is incorporated herein by reference to show a method of producing a suitable binding agent for the present invention.

Suitable solubilizing agents include soluble sodium phosphates, carbonates, bicarbonates, tetraborates and sodium sulfate. At least 1% solubilizing agent is required to make the bead soluble in water, but more than 20% solubilizing agent limits the amount of sodium alumino silicate that can be added to the system without any corresponding increase in solubility. The preferred solubilizing agent is sodium sulfate because it is inexpensive and because it is widely used in detergents.

Some water is needed in the water-softening bead, otherwise the ion exchange capacity of the sodium alumino silicate is reduced. This water content should be kept to a minimum so that the sodium alumino silicate content will not be limited.

In a preferred embodiment of the present invention, at least 66% by weight of an anhydrous basis of zeolite of small and uniform size having a high magnesium exchange capacity is added to 1 to 20% by weight of sodium polysilicate having a silica to sodium oxide ratio of 2.5:1 and made by the process of U.S. Pat. No. 3,838,191; 1 to 20% by weight of sodium sulfate and the remainder being water. This slurry is then dried with nozzle atomization in a spray dryer at inlet temperatures of below 540 degrees Celsius to produce beads. If the beads are dried at a temperature of above 540 degrees Celsius some ion exchange capacity can be lost.

Other methods can be used to dry the material. One could use a fluid bed dryer or some other source of pelletizer, such as a drum pelletizer, a disc pelletizer, etc., but the preferred method of drying is with a spray dryer using nozzle atomization. The resulting bead from spray drying with nozzle atomization is a spherical bead having improved flow properties. The spray drying process is also an efficient way to get the desired particle size.

Detergent Compositions

A detergent composition can be formed containing zeolites of small and uniform size having a high magnesium exchange capacity. Either zeolite A, zeolite X or a combination of the two can be used.

In the preferred embodiment of this invention a liquid, non-ionic surfactant is sprayed onto the zeolite of the present invention to form a free-flowing powder or pellets. Care must be taken not to exceed the absorbency limits of the pigment. The powder or pellets are then added to detergent formulations without further drying. The powder or pellets are dry blended into a dry detergent formulation.

The surfactant can be anionic, non-ionic or amphoteric. It can be liquid or a low melting point solid. If the surfactant is a low melting solid, it may need to be heated so as to be applicable to blend with the pigment. The preferred surfactant is a liquid, anionic surfactant.

Anionic surface active compounds can be broadly described as compounds which contain hydrophilic or lyophilic groups in their molecular structure and which ionize in an aqueous medium to give anions containing the lyophilic group. These compounds include the sulfated or sulfonated alkyl, aryl and alkyl aryl hydrocarbons and alkali metal salts thereof, for example, sodium salts of long chain alkyl sulfates, sodium salts of alkyl naphthalene sulfonic acids, sodium salts of sulfonated abietines, sodium salts of alkyl benzene sulfonic acids particularly those in which the alkyl group contains from 8–24 carbon atoms; sodium salts of sulfonated mineral oils and sodium salts of sulfosuccinic acid esters such as sodium dioctyl sulfosuccinate.

Advantageous anionic surfactants include the higher alkyl aryl sulfonic acids and their alkali metal and alkaline earth metal salts such as for example sodium dodecyl benzene sulfonate, sodium tridecyl sulfonate, magnesium dodecyl benzene sulfonate, potassium tetradecyl benzene sulfonate, ammonium dodecyl toluene sulfonate, lithium pentadecyl benzene sulfonate, sodium dioctyl benzene sulfonate, disodium dodecyl benzene disulfonate, disodium diisopropyl naphthalene disulfonate and the like as well as the alkali metal salts of fatty alcohol esters of sulfuric and sulfonic acids, the alkali metal salts of alkyl aryl(sulfothioic acid)esters and the alkyl thiosulfuric acid, etc.

Non-ionic surface active compounds can be broadly described as compounds which do not ionize but usually acquire hydrophilic characteristics from an oxygenated side chain, such as polyoxyethylene, while the lyophilic part of the molecule may come from fatty acids, phenols, alcohols, amides or amines. Examples of non-ionic surfactants include products formed by condensing one or more alkylene oxides of 2 to 4 carbn atoms, such as ethylene oxide or propylene oxide, preferably ethylene oxide alone or with other alkylene oxides, with a relatively hydrophobic compound such as a fatty alcohol, fatty acid, sterol, a fatty glyceride, a fatty amine, an aryl amine, a fatty mercaptan, tall oil, etc. Non-ionic surface active agents also include those products produced by condensing one or more relatively lower alkyl alcohol amines (such as methanolamine, ethanolamine, propanolamine, etc.) with a fatty acid such as lauric acid, cetyl acid, tall oil fatty acid, abietic acid, etc. to produce the corresponding amide.

Particularly advantageous non-ionic surface active agents are condensation products of a hydrophobic compound having at least one active hydrogen atom and a lower alkylene oxide (for example the condensation product of an aliphatic alcohol containing from about 8 to about 18 carbon atoms) and from about 3 to about 30 mols of ethylene oxide per mol of the alcohol, or the condensation product of an alkyl phenol containing from about 8 to about 18 carbon atoms in the alkyl group and from about 3 to about 30 mols of ethylene oxide per mol of alkyl phenol. Other non-ionic detergents include condensation products or ethylene oxide with a hydrophobic compound formed by condensing propylene oxide with propylene glycol.

Amphoteric surface active compounds can be broadly described as compounds which have both anionic and cationic groups in the same molecule. Such compounds may be grouped into classes corresponding to the nature of the anionic-forming group, which is usually carboxy, sulfo and sulfato. Examples of such compounds include sodium N-coco beta amino propionate, sodium N-tallow beta amino dipropionate, sodium N-lauryl beta iminodipropionate and the like.

Other typical examples of these categories of the anionic, non-ionic and/or amphoteric surface active agents are described in Schwartz and Perry "Surface Active Agents," Inter-science Publishers, New York (1949) and the Journal of American Oil Chemists Society, Volume 34, No. 4, pages 170–216 (April 1957) which are incorporated herein by reference.

The surfactant can be added to dry powder by any means such as blending, extruding or spraying the surfactant on the pigment. The preferred method would be spraying the surfactant into a rotating drum containing the sodium alumino silicate powder. Once the powder has absorbed the desired amount of surfactant the powder can be either withdrawn, while it is still in a powdery form, or remain in the drum until it is pelletized. Either way could be used, depending on the desires of the customer.

The absorbency of zeolites can be determined easily by adding surfactants to a pigment until the pigment becomes tacky to the touch.

The use of small particle size Zeolite A was evaluated by substituting it for phosphate in basic detergent formulations. Washing tests were conducted in a terg-o-tometer, Model 7243, machine. Tests were run at 0.15% detergent concentration in 120 and 240 ppm hard water (Ca:Mg=2:1) at 120 degrees F. A wash time of 15 minutes at 125 rpm with two five-minute rinses was used. Detergency was determined on soiled test cloths of cotton, spun dacron, cotton/dacron with permanent press, and cotton shirting wash and wear. The detergency value was determined by using a Gardner Model XL-10 reflectometer to measure reflectance before and after washing. The results on Table XII indicate that small particle size Zeolite A can replace phosphates in detergent formulations and may even improve overall detergency. This is particularly evident in the 240 ppm hardness test. It is believed that the favorable results obtained in these tests can be attributed to the ability of small particle size Zeolite A to remove both calcium and magnesium ions from solution at extremely rapid rates.

is significantly higher than Hydrex, a registered trademark of the J. M. Huber Corporation for an amorphous sodium magnesium alumino silicate. This suggests that the mechanism of zeolite A retention is different and that it is functional to species rather than size. It is rea-

TABLE XII

USE OF SMALL PARTICLE SIZE ZEOLITE A IN DETERGENTS

| | 120 ppm Hardwater | | | | 240 ppm Hardwater | | | |
|---|---|---|---|---|---|---|---|---|
| | #1 | | #2 | | #3 | | #4 | |
| FORMULATION | wt % | gms | wt % | gms | wt % | gms | wt % | gms |
| Sodium Tripolyphosphate | 25 | .375 | — | — | 25 | .375 | — | — |
| Small particle size Zeolite A (Example 35) | — | — | 25 | *.469 | — | — | 25 | *.469 |
| Richonate 45B | 12 | .18 | 12 | .18 | 12 | .18 | 12 | .18 |
| Richonal A | 5 | .075 | 5 | .075 | 5 | .075 | 5 | .075 |
| Condensate Co | 3 | .045 | 3 | .045 | 3 | .045 | 3 | .045 |
| Carboxymethylcellulose | 1 | .015 | 1 | .015 | 1 | .015 | 1 | .015 |
| Sodium Silicate | 15 | .225 | 15 | .225 | 15 | .225 | 15 | .225 |
| Sodium Sulfate | 39 | .585 | 39 | .585 | 39 | .585 | 39 | .585 |

| | 120 ppm Hardwater | | 240 ppm Hardwater | |
|---|---|---|---|---|
| | #1 | #2 | #3 | #4 |
| RESULTS - Test Cloth | % Improvement | % Improvement | % Improvement | % Improvement |
| Cotton | 32.8 | 39.0 | 33.4 | 34.1 |
| Spun Dacron | 3.0 | 15.8 | 10.7 | 42.4 |
| Cotton/Dacron permanent press | 17.8 | 17.2 | 18.8 | 20.2 |
| Cotton shirting wash and wear | 22.8 | 19.9 | 19.7 | 24.8 |
| % Total Detergency | 76.4 | 91.9 | 82.6 | 121.5 |

*Active basis

Paper Compositions

A paper composition can be formed containing zeolites of small and uniform size. Either zeolite A, zeolite X or a combination of the two can be used.

The use of small particle size zeolite A as a filler in fine paper was evaluated by adding it to various types of furnishes. These furnishes included both bleached and sonable to suspect that the retention mechanism is due to a charge effect between the crystalline material and the pulp rather than mechanical effects. Surprisingly, the small particle size zeolite A of the present invention showed markedly better optical effects in both brightness and opacity than commercial zeolite A and was equal to the best known synthetic (Hydrex) used for this application.

TABLE XIII

USE OF SMALL PARTICLE SIZE ZEOLITE A AS A FILLER IN FINE PAPER

| PIGMENT | % FILLER | BASIS WT. 25 × 38 × 500 #/REAM | g/sq m | % PIGMENT RETAINED | TAPPI BRIGHTNESS | TAPPI OPACITY |
|---|---|---|---|---|---|---|
| Unfilled | | 50.9 | 75.3 | | 85.0 | 82.8 |
| Small Particle Size | 3 | 52.1 | 77.1 | 58 | 86.7 | 86.5 |
| Zeolite A | 6 | 50.2 | 74.3 | 55 | 88.2 | 89.0 |
| (Example 10) | 9 | 51.3 | 75.9 | 53 | 89.3 | 90.6 |
| Commercial | 3 | 50.8 | 75.2 | 56 | 85.6 | 84.6 |
| Zeolite A | 6 | 52.2 | 77.3 | 55 | 86.1 | 86.1 |
| | 9 | 53.5 | 79.2 | 56 | 86.5 | 87.2 |
| Unfilled | | 48.9 | 72.4 | | 85.5 | 82.2 |
| Small Particle Size | 3 | 51.5 | 76.2 | 41 | 87.4 | 86.1 |
| Zeolite A | 6 | 51.3 | 75.9 | 38 | 88.8 | 88.5 |
| (Example 10) | 9 | 51.4 | 76.1 | 34 | 89.9 | 90.1 |
| Hydrex* | 3 | 50.1 | 74.1 | 28 | 87.4 | 86.1 |
| | 6 | 50.2 | 74.3 | 30 | 88.7 | 88.2 |
| | 9 | 49.8 | 73.3 | 31 | 89.6 | 89.4 |

*Registered Trademark of J. M. Huber Corporation unbleached pulps. Handsheets of various basis weights and different types of pulp were made using a Noble and Wood Sheet machine. Tests on these handsheets were done according to the following TAPPI (The American Pulp and Paper Institute) standards.

T-425m—Opacity of Paper
T-452m—Brightness of Paper and Paperboard
T-410m—Basis Weight of Paper and Paperboard Table XXIII indicates that single pass retention of zeolite A is not dependent on size, and that it's retention The use of small particle size zeolite A as an extender for titanium dioxide in paper was evaluated by adding it to a bleached pulp paper furnish. The paper furnish was 50% bleached hardwood and 50% bleached softwood Kraft. Handsheets were made and the properties were tested following the previously described procedures. Table XIV shows that single pass retention of zeolite A in combination with titanium dioxide. This data also suggests a different mechanism of retention and confirms the results obtained in a single filler system. Optical properties obtained using small particle size zeolite A were significantly better than larger size material (commercial zeolite A), and equal to Hydrex.

13#/3300 sq ft using a Keegan Laboratory Trailing Blade Coater. All sheets were supercalendered 3 nips at 150 degrees Fahrenheit and 1000 psig. Sheets were then

TABLE XIV

USE OF SMALL PARTICLE SIZE ZEOLITE A AS AN EXTENDER FOR TITANIUM DIOXIDE IN FINE PAPER

| PIGMENT | FILLER | BASIS WT. 85 × 38 × 500 # REAM | g/sq m | RETAINED | BRIGHTNESS | OPACITY |
|---|---|---|---|---|---|---|
| Unfilled | | 50.9 | 75.3 | | 85.0 | 82.8 |
| 50% Small Particle Size | 3 | 50.6 | 74.9 | 61 | 87.8 | 88.4 |
| Zeolite A (Example 10) | 6 | 51.0 | 75.5 | 58 | 89.6 | 91.9 |
| and 50% Titanium Dioxide | 9 | 50.7 | 75.0 | 55 | 90.8 | 93.8 |
| 50% Commercial | 3 | 50.5 | 74.7 | 59 | 87.2 | 87.7 |
| Zeolite A and | 6 | 51.3 | 75.9 | 60 | 88.7 | 91.0 |
| 50% Titanium Dioxide | 9 | 51.4 | 76.1 | 60 | 89.7 | 92.9 |
| Unfilled | | 48.9 | 72.4 | | 85.5 | 82.2 |
| 50% Small Particle Size | 3 | 51.5 | 76.2 | 47 | 88.3 | 88.2 |
| Zeolite A (Example 10) | 6 | 51.0 | 75.5 | 42 | 89.8 | 91.4 |
| and 50% Titanium Dioxide | 9 | 50.3 | 74.4 | 40 | 90.9 | 93.4 |
| 50% Hydrex and | 3 | 50.3 | 74.4 | 24 | 88.3 | 88.5 |
| 50% Titanium Dioxide | 6 | 49.9 | 73.9 | 36 | 89.8 | 91.7 |
| | 9 | 49.5 | 73.3 | 39 | 90.9 | 93.5 |

The use of small particle size zeolite A as a filler in newsprint was evaluated by adding it to a standard newsprint furnish. Newsprint handsheets consisting of 65% groundwood and 35% semi-bleached Kraft paper were made using the Noble and Wood Sheet machine. The sheets were printed at a pick-up of 1.7 and 2.5 g ink/sq. m using a Vandercook Proofing Press with a solid block and a 4 mil. impression pressure. After 24 hours, brightness readings on the reverse side of printed and unprinted sheets were made. These were then plotted and results reported as strike-through values at 20 g ink/sq. m (modified version of the Larocque strike-through test).

The data on Table XV also indicates that the retention mechanism of zeolite A is different than other specialty fillers commonly used for newsprint applications. The results also confirm that small particle size zeolite A is superior to commercial zeolite A and compares favorably with Zeolex 23, a registered trademark of the J. M. Huber Corporation for an amorphous sodium alumno silicate.

checked for gloss, opacity and brightness using the following TAPPI standards.

T-480m Gloss of Paper
T-425m Opacity of Paper
T-452m Brightness of Paper and Paperboard The results on Table XVI show small particle size zeolite A to be superior to commercial zeolite A. This is most obvious in better gloss development, but there is also significant improvement in both brightness and opacity when used as either an extender for titanium dioxide or as a filler. Similar effects were seen in tests on coated board.

TABLE XVI

USE OF SMALL PARTICLE SIZE ZEOLITE A AS A TITANIUM DIOXIDE EXTENDER IN PAPER COATINGS
(87% Hydrasperse Clay - 5% TiO₂ 8% Pigment)

| Pigment | 75 degree Gloss, % | TAPPI Brightness | TAPPI Opacity |
|---|---|---|---|
| Small Particle Size Zeolite A (Example 10) | 64.9 | 71.1 | 90.9 |
| Commercial Zeolite A | 55.0 | 70.4 | 90.3 |

USE OF SMALL PARTICLE SIZE ZEOLITE A AS A PIGMENT IN PAPER COATINGS
(92% Hydrasperse Clay - 8% Pigment)

| Pigment | 75 degree Gloss, % | TAPPI Brightness | TAPPI Opacity |
|---|---|---|---|
| Small Particle | 64.0 | 69.3 | 89.0 |

TABLE XV

USE OF SMALL PARTICLE SIZE ZEOLITE A IN NEWSPRINT

| PIGMENT | % RETENTION | % FILLER | Basis Wt. 24 × 36 × 500 #/REAM | g/sq m | Caliper MILS | MM | TAPPI BRIGHTNESS | TAPPI OPACITY | S/T @ 2 g/2 m INK | S/T REDUCTION |
|---|---|---|---|---|---|---|---|---|---|---|
| Unfilled | | | 28.8 | 46.9 | 3.0 | 0.76 | 59.3 | 83.7 | 17.1 | |
| Small Particle | 37 | 2 | 30.1 | 49.0 | 3.1 | .079 | 61.0 | 86.5 | 13.4 | 22 |
| Size Zeolite A | 35 | 4 | 30.4 | 49.5 | 3.1 | .079 | 62.3 | 88.0 | 10.4 | 39 |
| Zeolex 23 | 29 | 2 | 28.8 | 46.9 | 3.0 | .076 | 60.2 | 84.8 | 13.1 | 23 |
| | 35 | 4 | 29.5 | 48.0 | 3.0 | .076 | 61.1 | 85.7 | 9.8 | 43 |
| Unfilled | | | 29.6 | 48.2 | 3.3 | .084 | 58.6 | 86.4 | 12.3 | |
| Commercial | 38 | 2 | 30.6 | 49.8 | 3.2 | .081 | 59.2 | 87.7 | 11.4 | 7 |
| Zeolite A | 43 | 4 | 31.3 | 50.9 | 3.2 | .081 | 59.6 | 88.8 | 10.6 | 14 |

The use of small particle size zeolite A in paper coatings was tested in various coating formulas. Two of these were as follows:

1. 87% Hydrasperse Clay
   5% Titanium dioxide
   8% Pigment
2. 92% Hydrasperse Clay
   8% Pigment These formulations were prepared at 58% solids using 16 parts per hundred binder level (75% starch-25% Latex) and were ground using a Cowles Dissolver. Paper used was a 32# base stock which was coated TABLE XVI-continued

| Size Zeolite A (Example 10) | | | |
|---|---|---|---|
| Commercial Zeolite A | 55.9 | 68.1 | 88.5 |

Rubber Compositions

A rubber composition can be formed containing zeolites of small and uniform size. Either zeolite A, zeolite X or a combination of the two can be used.

The rubbers (alternatively referred to herein as elastomers which materials are unvulcanized) which can be employed in the invention include both natural and synthetic rubbers. Exemplary of suitable synthetic rubbers are styrene-butadiaene, butyl rubber, nitril rubber, polybutadiene, polyisoprene, ethylene propylene, acrylic, fluorocarbon rubbers, polysulfide rubbers, and silicone rubbers. Mixtures or copolymers of the above synthetic rubbers can be employed alone or in combination with natural rubber. The preferred rubbers are nitrile rubber, styrene-butadiene rubber, natural rubber, polyisoprene, and mixtures thereof because they are most compatible with polyester fibers although minor amounts of other rubbers can be included without adverse effects. U.S. Pat. No. 3,036,980 is incorporated by reference to show the formation of rubber compositions containing zeolites.

Plastics Compositions

A plastic composition can be formed containing zeolites of small and uniform size. Either zeolite A, zeolite X or a combination of the two can be used.

Non-Settling Flatting Pigment

Zeolites of small and uniform size can be used as non-settling flatting pigments. Either zeolite A, zeolite X or a combination of the two can be used.

Small particle size Zeolite A was evaluated as a non-settling, flatting pigment in nitrocellulose lacquer and as a prime pigment extender in flat latex paint systems. Tests in the nitrocellulose lacquer system were conducted by adding the Zeolite to a lacquer conforming to military specification MIL-L-10287A, Amendment 2, Type II of issue Aug. 27, 1959. The amount of Zeolite used was equivalent to 10% by weight of vehicle solids. The lacquer and Zeolite were blended together using a Hamilton-Beach Model 936 blender at 16,000 rpm for four minutes, and the resulting mixture was then strained through a fine mesh paint strainer. Hegman grind was determined in the usual manner and the mixture was then drawn down on Leneta 5c paper panels using a #34 wire wound coatings application rod. The panels were dried at room temperature for 45 minutes under dust-free conditions in a vertical position. A Gardner multi-angle gloss meter was used to determine gloss (60 degree head) and sheen (85 degree head) of the panels. Settling was evaluated using an accelerated test with an arbitrary scale of 0 (fail) to 10 (none) after 7 days at 120 degrees F.

The results on Table XVII show that small particle size Zeolite A was superior to commercial Zeolite A in all categories, and the exceptional clarity of the lacquer containing small particle size Zeolite A would be of significant value in specialty applications.

TABLE XVII
USE OF SMALL PARTICLE SIZE ZEOLITE A AS A NON-SETTLING, FLATTING PIGMENT IN NITROCELLULOSE LACQUER

| Sample | Hegman | 60 degree Gloss | 85 degree Sheen | Settling |
|---|---|---|---|---|
| Small Particle Size Zeolite A (Example 10) | 6.25 | 15 | 27 | 8 |
| Commercial Zeolite A | 6.00 | 33 | 71 | 1 |

The use of small particle size Zeolite A as a prime pigment extender in flat latex paint systems was evaluated as follows:

Part I of the formulation was mixed, Part II of the formulation was then added and the entire mixture was blended for 10 minutes on a Cowles high speed mixer. The Zeolite A was added at this time and dispersed for 5 minutes. The letdown (Part III) was then added to complete the formulation and mixed for an additional 5 minutes. The resulting paint was drawn down on Leneta 1B paper panels using a #34 wire wound coatings application rod. The panels were dried at room temperature under dust-free conditions in a vertical position. A Gardner multi-angle gloss meter was used to determine the gloss and sheen of the panels.

| Formulation | Weight, gms. #1 | Weight, gms #2 |
|---|---|---|
| Part I | | |
| Water | 200 | 200 |
| Cellosize OP-15000 | 0.5 | 0.5 |
| AMP-95 | 2 | 2 |
| Daxad 30 | 8 | 8 |
| Ethylene Glycol | 17 | 17 |
| Super Ad It | 1 | 1 |
| Napco NDW | 1 | 1 |
| Part II | | |
| R-901 | 150 | 150 |
| Huber 70C | 100 | 100 |
| G-White | 150 | 150 |
| Small particle size Zeolite A (Example 10) | 60 | — |
| Commercial Zeolite A | — | 60 |
| Part III | | |
| Water | 183 | 183 |
| QP-15000 | 3 | 3 |
| AMP-95 | 3 | 3 |
| Texanol | 8 | 8 |
| Napco NDW | 2 | 2 |
| Amsco 3011 | 264 | 264 |

TABLE XVIII
USE OF SMALL PARTICLE SIZE ZEOLITE A AS A PRIME PIGMENT EXTENDER IN FLAT LATEX SYSTEMS

| Sample | Brightness, YB | Contrast Ratio | 60 degree Gloss | 85 degree Sheen |
|---|---|---|---|---|
| Small particle size Zeolite A (Example 10) | 89.6 | 0.968 | 3 | 7 |
| Commercial Zeolite A | 87.6 | 0.958 | 3 | 4 |

The results on Table XVIII indicate that small particle size Zeolite A performs better than commercial Zeolite A as a prime pigment spacer in this paint system.

This is evident by the brightness and contrast ratio which indicate that the small particle size Zeolite A is significantly more efficient and better performing in optical properties.

Thus, in operation, a zeolite of small and uniform size having a high magnesium exchange capacity can be formed which is useful as an ion exchange material in water softening compositions and detergents, as a filler in paper, rubber and plastics, and as a non-settling flatting pigment.

While the present invention has been described with reference to specific embodiments, this application is intended to cover those various changes and substitutions which may be made by those skilled in the art without departing from the spirit and scope of the appended claims.

I claim:

1. A method for the preparation of a sodium silicate solution which comprises dissolving sand in a sodium hydroxide solution at a pressure of at least 100 psig and a temperature of at least 130 degrees Celsius to produce a sodium silicate solution having a silica to sodium oxide molar ratio of between 2.4:1 and 2.8:1, and activating said sodium silicate solution by reaction with from about 50 to 2000 ppm of alumina.

2. A method according to claim 1 wherein the silica to sodium oxide molar ratio of the sodium silicate solution is about 2.4:1.

3. A method according to claim 1 wherein the pressure is about 140 psig.

4. A method according to claim 1 wherein the sodium silicate solution is activated at a temperature of 15 to 100 degrees Celsius for at least 10 minutes.

5. A method according to claim 1 wherein the alumina concentration is between 400 and 600 ppm and the activation occurs at room temperature.

6. A method according to claim 1 wherein the alumina used to activate the sodium silicate solution is provided by an aluminum compound selected from the group consisting of sodium aluminate and aluminum salts.

* * * * *